(12) United States Patent
Koga et al.

(10) Patent No.: US 10,947,066 B2
(45) Date of Patent: Mar. 16, 2021

(54) CONVEYING SYSTEM AND METHOD FOR CONTROLLING CONVEYING SYSTEM

(71) Applicant: KABUSHIKI KAISHA YASKAWA DENKI, Kitakyushu (JP)

(72) Inventors: Minoru Koga, Fukuoka (JP); Hiromitsu Akae, Fukuoka (JP); Yuki Honda, Fukuoka (JP); Mina Orii, Fukuoka (JP); Go Yamaguchi, Fukuoka (JP); Sohei Oga, Fukuoka (JP); Hidenori Hara, Fukuoka (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/455,747

(22) Filed: Jun. 28, 2019

(65) Prior Publication Data
US 2019/0315580 A1    Oct. 17, 2019

Related U.S. Application Data

(63) Continuation of application No. 15/823,573, filed on Nov. 28, 2017, now Pat. No. 10,336,559, which is a
(Continued)

(30) Foreign Application Priority Data

May 29, 2015 (JP) .................................. 2015-110344
May 29, 2015 (JP) .................................. 2015-110535
(Continued)

(51) Int. Cl.
*B65G 54/02* (2006.01)
*B61B 13/00* (2006.01)
(Continued)

(52) U.S. Cl.
CPC .............. *B65G 54/02* (2013.01); *B60L 13/00* (2013.01); *B61B 13/00* (2013.01); *B65G 35/06* (2013.01); *Y02P 90/60* (2015.11)

(58) Field of Classification Search
CPC ........ B65G 35/06; B65G 51/34; B65G 51/36; B65G 51/38; B65G 51/40; B65G 51/42;
(Continued)

(56) References Cited

U.S. PATENT DOCUMENTS 3,610,161 A   10/1971   Wishart et al.
3,702,099 A   11/1972   Ricaud et al.
(Continued)

FOREIGN PATENT DOCUMENTS

CN       203278404 U     11/2013
DE       102010027925    10/2011
(Continued)

OTHER PUBLICATIONS

Chinese Office Action for corresponding CN Application No. 201680031086.1, dated Sep. 26, 2019.
(Continued)

*Primary Examiner* — Joseph A Dillon, Jr.
(74) *Attorney, Agent, or Firm* — Mori & Ward, LLP

(57) ABSTRACT

A conveying system includes a plurality of carriers and circuitry. The plurality of carriers has a power source generating thrust in accordance with supply of power and moves along a conveying path. The circuitry is configured to execute detection of a collision between the carriers based on an increase in the thrust in the carriers.

14 Claims, 44 Drawing Sheets

Related U.S. Application Data continuation of application No. PCT/JP2016/065792, filed on May 27, 2016.

(30) Foreign Application Priority Data

| | | | |
|---|---|---|---|
| May 29, 2015 | (JP) | ................................ | 2015-110542 |
| May 29, 2015 | (JP) | ................................ | 2015-110547 |
| May 29, 2015 | (JP) | ................................ | 2015-110549 |
| Nov. 27, 2015 | (JP) | ................................ | 2015-232380 |
| Nov. 27, 2015 | (JP) | ................................ | 2015-232382 |
| Nov. 27, 2015 | (JP) | ................................ | 2015-232384 |
| Nov. 27, 2015 | (JP) | ................................ | 2015-232390 |
| Nov. 27, 2015 | (JP) | ................................ | 2015-232393 |
| Nov. 27, 2015 | (JP) | ................................ | 2015-232400 |

(51) Int. Cl.
    *B60L 13/00*     (2006.01)
    *B65G 35/06*     (2006.01)

(58) Field of Classification Search
    CPC ........ B65G 51/44; B65G 54/02; B65G 43/08; B65G 43/10; B65G 2203/0266; B65G 2203/0275; B65G 2203/0283; B65G 2203/0291; G05B 19/4189; Y02P 90/28
    USPC ... 198/357, 464.1, 464.3, 464.4, 465.2, 619, 198/805, 617; 406/36; 700/228, 229, 700/230
See application file for complete search history.

(56) References Cited

U.S. PATENT DOCUMENTS

| | | | | |
|---|---|---|---|---|
| 4,712,484 | A | | 12/1987 | Sticht |
| 4,766,993 | A | | 8/1988 | Kita et al. |
| 4,825,111 | A | * | 4/1989 | Hommes ............... B60L 15/005 310/12.15 |
| 4,825,773 | A | | 5/1989 | Morishita et al. |
| 4,987,834 | A | * | 1/1991 | Peck, Jr. .............. B23Q 7/1436 104/128 |
| 5,051,225 | A | | 9/1991 | Hommes et al. |
| 5,069,326 | A | | 12/1991 | Sakamoto et al. |
| 5,211,115 | A | * | 5/1993 | Maier .................. B23Q 7/1436 104/249 |
| 5,492,066 | A | | 2/1996 | Nozaki et al. |
| 6,123,028 | A | | 9/2000 | Bellezza |
| 6,876,896 | B1 | | 4/2005 | Ortiz et al. |
| 9,359,143 | B2 | | 6/2016 | Ishii et al. |
| 10,287,111 | B2 | * | 5/2019 | Gysen ...................... H02K 3/28 |
| 10,364,103 | B2 | * | 7/2019 | Tsai ....................... B65G 54/02 |
| 10,601,295 | B2 | * | 3/2020 | Tsai ....................... H02K 11/33 |
| 2005/0256774 | A1 | | 11/2005 | Clothier et al. |
| 2007/0013642 | A1 | | 1/2007 | Yoon et al. |
| 2008/0236996 | A1 | | 10/2008 | Bausenwein et al. |
| 2010/0207555 | A1 | | 8/2010 | Ide et al. |
| 2013/0026011 | A1 | | 1/2013 | van de Loecht |
| 2013/0152516 | A1 | | 6/2013 | Sammons et al. |
| 2013/0313070 | A1 | | 11/2013 | Ogawa et al. |
| 2014/0244028 | A1 | * | 8/2014 | Giloh .................... B65G 54/02 700/230 |
| 2016/0011224 | A1 | * | 1/2016 | Pollack ............ G01N 35/00732 700/230 |
| 2016/0159508 | A1 | | 6/2016 | Jacobs et al. |
| 2016/0229630 | A1 | * | 8/2016 | Gebhardt ............. B65G 1/0492 |
| 2017/0368941 | A1 | * | 12/2017 | Chow ..................... H02M 7/44 |
| 2018/0086565 | A1 | | 3/2018 | Grosskreuz et al. |

FOREIGN PATENT DOCUMENTS

| | | |
|---|---|---|
| EP | 0597416 | 5/1994 |
| JP | 61-015559 | 1/1986 |
| JP | 61-250512 | 11/1986 |
| JP | 10-315960 | 12/1998 |
| JP | 10-098813 | 4/1999 |
| JP | 2003-117879 | 4/2003 |
| JP | 2005-289536 | 10/2005 |
| JP | 2010-172080 | 8/2010 |
| JP | 2012-010444 | 1/2012 |
| JP | 2013-176214 | 9/2013 |
| KR | 1020120094250 | 8/2012 |

OTHER PUBLICATIONS

International Search Report for corresponding International Application No. PCT/JP2016/065792, dated Aug. 23, 2016.

International Preliminary Report on Patentability with Translation of Written Opinion of the International Searching Authority for corresponding International Application No. PCT/JP2016/065792, dated Dec. 14, 2017.

Japanese Office Action for corresponding JP Application No. 2017-521918, dated Oct. 2, 2018.

Extended European Search Report for corresponding EP Application No. 16803276.1-1017, dated Jan. 7, 2019.

Office Action with Form PTO-892 Notice of References Cited issued by the U.S. Patent and Trademark Office for the parent U.S. Appl. No. 15/823,573, dated Aug. 24, 2018.

Notice of Allowance issued by the United States Patent and Trademark Office for the parent U.S. Appl. No. 15/823,573, dated Feb. 25, 2019.

Japanese Office Action for corresponding JP Application No. 2019-131338, dated Aug. 4, 2020.

\* cited by examiner

CONVEYING SYSTEM AND METHOD FOR CONTROLLING CONVEYING SYSTEM

CROSS-REFERENCE TO RELATED APPLICATION

The present application is a continuation application of the U.S. patent application Ser. No. 15/823,573, filed Nov. 28, 2017, which is a continuation application of PCT Application No. PCT/JP2016/065792, filed May 27, 2016, which claims priority under 35 U.S.C. § 119 to Japanese Patent Application No. 2015-110344, filed May 29, 2015, Japanese Patent Application No. 2015-110535, filed May 29, 2015, Japanese Patent Application No. 2015-110542, filed May 29, 2015, Japanese Patent Application No. 2015-110547, filed May 29, 2015, Japanese Patent Application No. 2015-110549, filed May 29, 2015, Japanese Patent Application No. 2015-232380, filed Nov. 27, 2015, Japanese Patent Application No. 2015-232382, filed Nov. 27, 2015, Japanese Patent Application No. 2015-232384, filed Nov. 27, 2015, Japanese Patent Application No. 2015-232390, filed Nov. 27, 2015, Japanese Patent Application No. 2015-232393, filed Nov. 27, 2015, and Japanese Patent Application No. 2015-232400, filed Nov. 27, 2015. The contents of these applications are incorporated herein by reference in their entirety.

BACKGROUND

1. Field

The present disclosure relates to a conveying system and a method for controlling a conveying system.

2. Description of the Related Art

Japanese Unexamined Patent Publication No. 2013-176214 discloses a linear conveying apparatus using a linear motor. The linear conveying apparatus includes a platform having a linear drive section and a slider that moves along the linear drive section. The slider includes a plurality of permanent magnets. The linear drive section includes a coil that generates a magnetic flux in accordance with supply of current, and causes the magnetic flux from the coil to act on the permanent magnet of the slider to move the slider.

SUMMARY

According to one aspect of the present disclosure, a conveying system includes a plurality of carriers and circuitry. The plurality of carriers has a power source generating thrust in accordance with supply of power and moves along a conveying path. The circuitry is configured to execute detection of a collision between the carriers based on an increase in the thrust in the carriers.

According to another aspect of the present disclosure, a method for controlling a conveying system which includes a plurality of carriers having a power source generating thrust in accordance with supply of power includes controlling the plurality of carriers so as to move along a conveying path, and detecting a collision between the carriers based on an increase in the thrust in the carriers.

DESCRIPTION OF EMBODIMENTS

Figure 1:
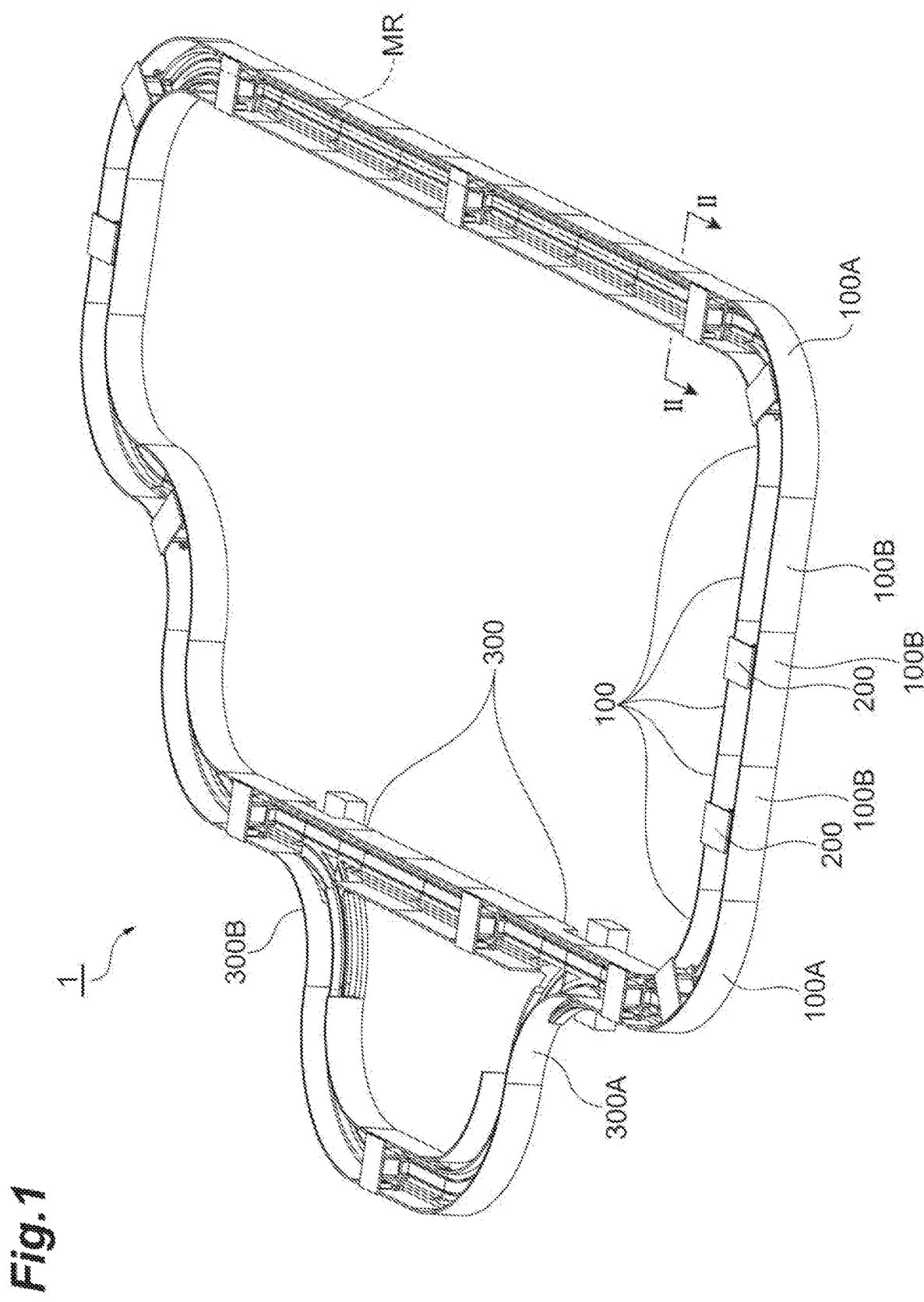
FIG. 1 is a perspective view illustrating a schematic configuration of a conveying system according to a first embodiment.

Hereinafter, embodiments will be described in detail with reference to the drawings. In the description, same reference numerals will be used for same elements or elements having a same function, and redundant description will be omitted.

1. First Embodiment

A conveying system 1 according to the present embodiment conveys an object such as a component and an assembly, for example, in production equipment. As illustrated in FIG. 1, the conveying system 1 includes at least one guide unit 100 and a carrier 200. The conveying system 1 may include a plurality of guide units 100 and a plurality of carriers 200. The guide unit 100 constitutes a conveying path MR. In a case where the conveying system 1 includes a plurality of guide units 100, the plurality of guide units 100 are connected to each other to form a series of conveying paths MR. The carrier 200 supports an object such as a component and an assembly, and moves along the conveying path MR.

(Guide Unit)

Figure 2:
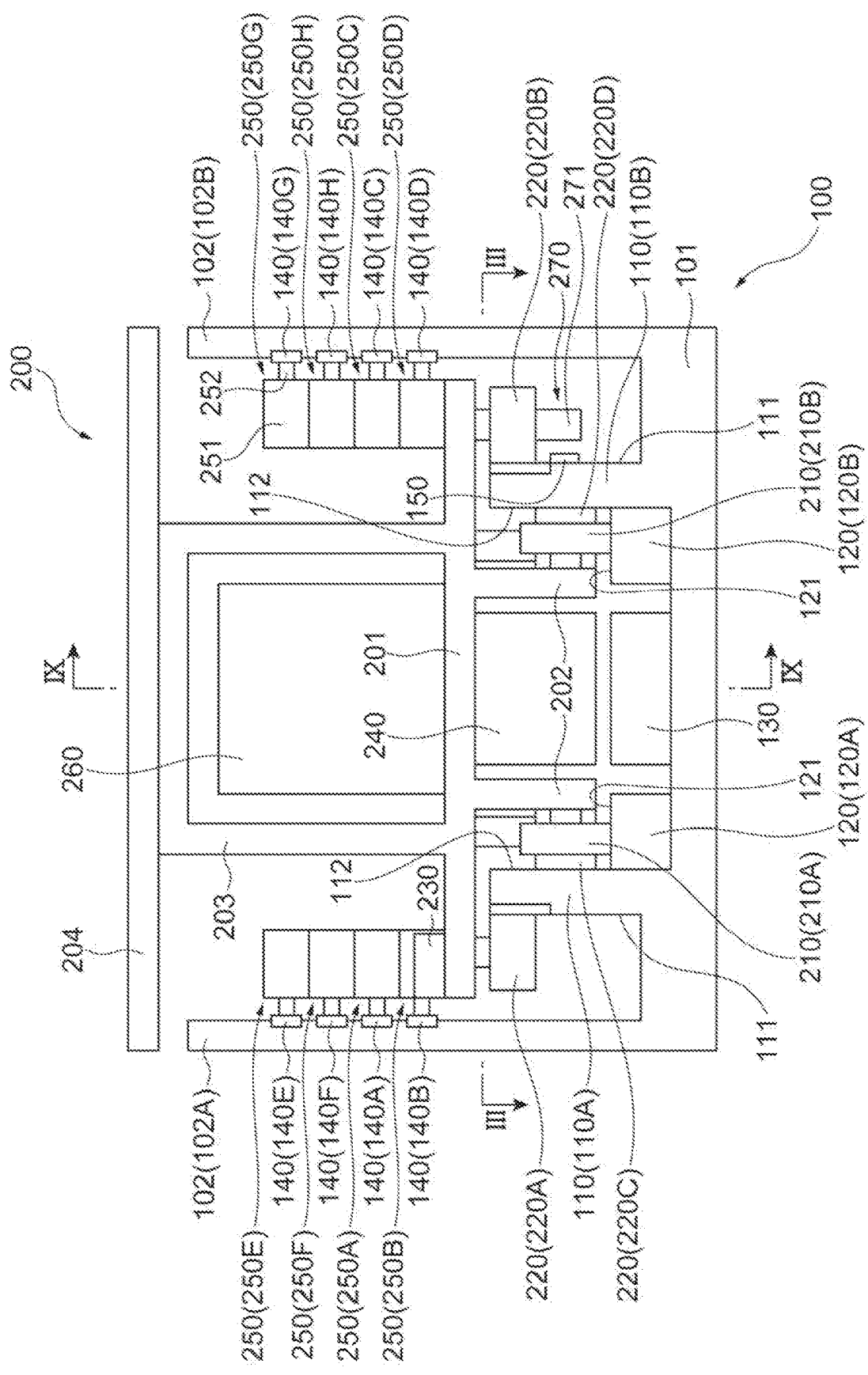
FIG. 2 is a cross-sectional view taken along line II-II in FIG. 1.
Figure 3:
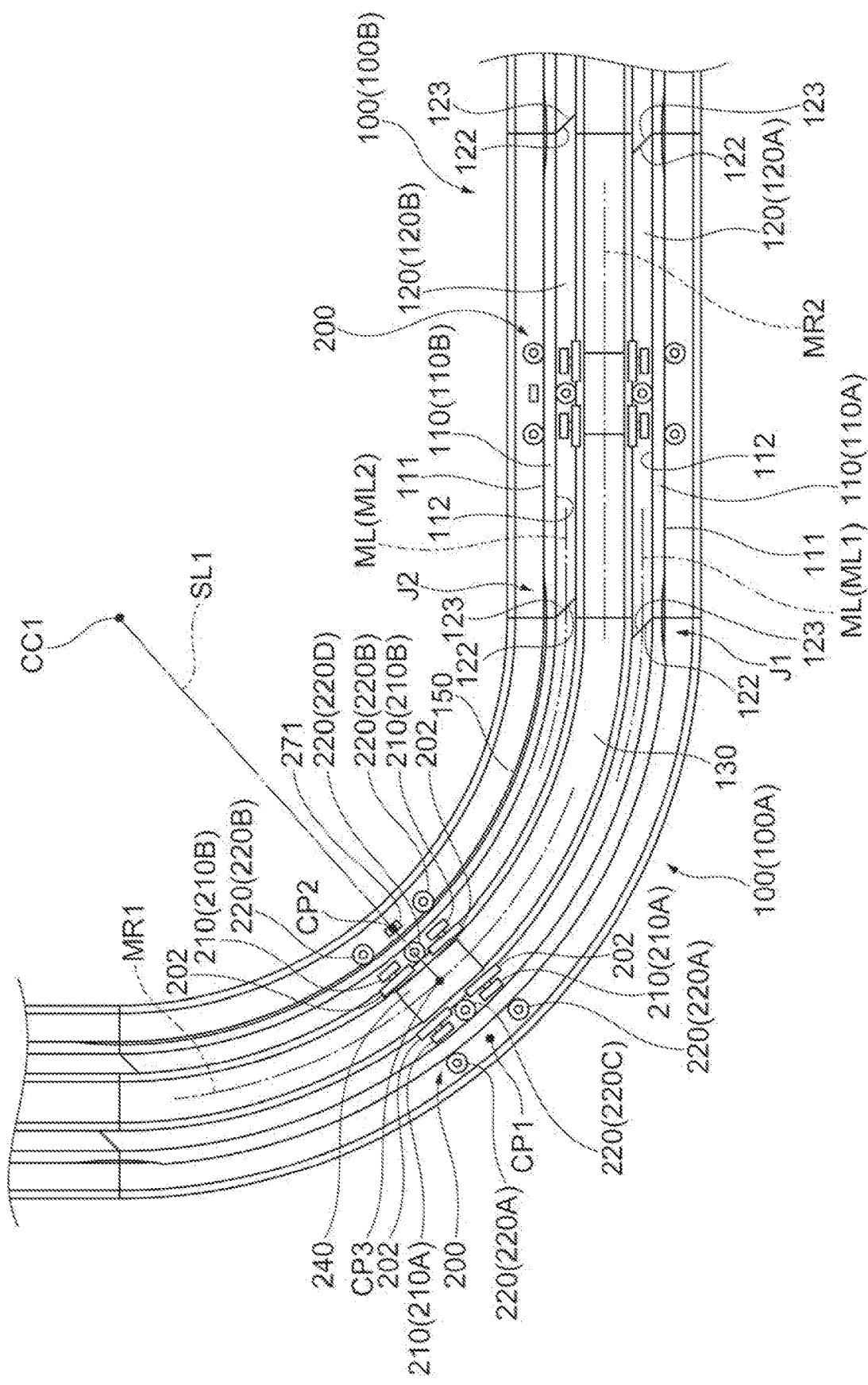
FIG. 3 is a cross-sectional view taken along line in FIG. 2.

As illustrated in FIGS. 2 and 3, the guide unit 100 includes at least one guide rail 110 provided along the conveying path MR and a stator 130. The guide unit 100 may further include a traveling surface 121 of a wheel 210 described below and the guide rail 110 may protrude from a plane including the traveling surface 121.

As a more specific example, the guide unit 100 includes a platform 101, a traveling surface 121, two guide rails 110, a stator 130, and two side walls 102. The platform 101 extends along the conveying path MR and has its width in a direction orthogonal to the conveying path MR in a horizontal plane.

The stator 130 extends along the conveying path MR at a center portion on the platform 101 and is fixed to the platform 101 by bolt fastening, for example. When the guide units 100 are coupled to each other, the stators 130 are coupled to each other.

The traveling surface 121 is provided on two traveling lines ML on the platform 101. The two traveling lines ML sandwich the stator 130 in a direction orthogonal to the conveying path MR, each being arranged along the conveying path MR.

The guide unit 100 may further include two support rails 120 for constituting the traveling surface 121. The two support rails 120 are each provided along the two traveling lines ML on the platform 101 and are fixed to the platform 101 by bolt fastening, for example. The traveling surface 121 is formed on the support rail 120. Hereinafter, one of the two support rails 120 (for example, the support rail 120 on a left side in FIG. 2) will be defined as a support rail 120A, and the other will be defined as a support rail 120B to distinguish between them. Correspondingly, one of the two traveling lines ML will be defined as a traveling line ML1, and the other will be defined as a traveling line ML2 to distinguish between them. When the guide units 100 are coupled to each other, the support rails 120A are coupled to each other, while the support rails 120B are coupled to each other, leading to coupling of the traveling surfaces 121 to each other.

Joints J1 and J2 between the traveling surfaces 121 may be inclined with respect to the conveying path MR in plan view. In addition, the positions of the two joints J1 and J2 respectively formed on the traveling lines ML1 and ML2 may be shifted from each other in a direction along the conveying path MR. The "plan view" means viewing from a direction orthogonal to the traveling surface 121 (for example, vertically above). This also applies to the following description.

The joints J1 and J2 are configured as follows, for example. On one end side of the guide unit 100, an end surface 122 of the support rail 120A protrudes from an end surface of the platform 101. The end surface 122 of the support rail 120B is recessed from the end surface of the platform 101. Each of the end surfaces 122 is inclined with respect to the conveying path MR in plan view. The direction in which the end surface 122 of the support rail 120A is inclined and the direction in which the end surface 122 of the support rail 120B is inclined may be the same or different.

On the other end side of the guide unit 100, an end surface 123 of the support rail 120A is recessed from the end surface of the platform 101. The end surface 123 of the support rail 120B protrudes from the end surface of the platform 101. Any of the end surfaces 123 is inclined with respect to the conveying path MR in plan view. In each of the support rails 120A and 120B, the direction in which the end surface 123 is inclined matches the direction in which the end surface 122 is inclined.

When the guide units 100 are coupled to each other, the protruding end portions of both of the support rails 120A and 120B are fitted into the recessed end portion, and the end surface 122 and the end surface 123 come close to each other. This arrangement forms the above-described joints J1 and J2 on the support rails 120A and 120B. Since the end surfaces 122 and 123 are inclined with respect to the conveying path MR, the joints J1 and J2 are also inclined with respect to the conveying path MR. The end surface 122 protrudes and the end surface 123 is recessed on the support rail 120A side; the end surface 122 is recessed and the end surface 123 protrudes on the support rail 120B side, shifting mutual positions of the joints J1 and J2. In each of the support rails 120, the protruding end portions are fitted into the recessed end portions, thereby facilitating positioning of the guide units 100 with each other.

The two guide rails 110 are aligned in a direction orthogonal to the conveying path MR on the platform 101, each being arranged along the conveying path MR. The two guide rails 110 are arranged outside the two support rails 120 and fixed to the platform 101. Note that an "inside" of the two members facing each other represents a side of a region between the above-described two members among the three regions partitioned by the above-described two members. The "outside" of the above-described two members represents a side of a region other than the region between the above-described two members, among the above-described three regions.

Hereinafter, one of the two guide rails 110 (for example, the guide rail 110 on a left side in FIG. 2) will be defined as a guide rail 110A, and the other will be defined as a guide rail 110B to distinguish between them. When the guide units 100 are coupled to each other, the guide rails 110A are coupled to each other, while the guide rails 110B are coupled to each other.

The two side walls 102 are provided on the platform 101 along the conveying path MR and face to each other. The two side walls 102 are arranged outside the two guide rails 110 and fixed to the platform 101. Hereinafter, one of the two side walls 102 (for example, the side wall 102 on the left side in FIG. 2) will be defined as a side wall 102A, and the other will be defined as a side wall 102B to distinguish between them. When the guide units 100 are coupled to each other, the side walls 102A are coupled to each other while the side walls 102B are coupled to each other.

While the material constituting the guide unit 100 is not particularly limited, a relatively lightweight metal material such as an aluminum based alloy can be an exemplary constituent material of each of the members.

(Carrier)

As illustrated in FIGS. 2 and 3, the carrier 200 includes at least one roller 220 coming in contact with the guide rail 110 from a side direction, and a mover 240. The carrier 200 may further include at least one wheel 210 coming in contact with the traveling surface 121. Here, "coming in contact" is not intended to mean strict constant contact and is not intended to exclude temporary release within a range not substantially impairing guidance or support functions.

As a more specific example, the carrier 200 includes a chassis 201, four wheels 210, six rollers 220, and the mover 240. A housing 203 capable of housing a driver circuit 260, or the like, described below is formed in a center portion of the chassis 201. It is possible to mount a tray 204 for supporting an object to be conveyed, on the housing 203. Under the chassis 201, two pairs of axle holding walls 202 are formed. The two pairs of axle holding walls 202 are arranged along the conveying path MR. Individual pairs of axle holding walls 202 face each other across a center portion of the chassis 201 in a direction orthogonal to the conveying path MR.

The mover 240 is arranged so as to overlap with the stator 130 in plan view. For example, the mover 240 is provided on the stator 130 side of the chassis 201. More specifically, the mover 240 is fixed to a lower portion of the chassis 201 between the axle holding walls 202 by bolt fastening, or the like. Note that the mover 240 may be fixed to an upper portion of the chassis 201.

The wheel 210 is attached to the axle holding wall 202 so as to be rotatable around a horizontal axis. The four wheels 210 are dispersedly arranged so as to sandwich the mover 240 in a direction orthogonal to the conveying path MR and to correspond to the two traveling lines ML1 and ML2. For example, the two wheels 210 are arranged so as to come in contact with the support rail 120A corresponding to the traveling line ML1, and the other two wheels 210 are arranged so as to come in contact with the support rail 120B corresponding to the traveling line ML2. Hereinafter, two wheels coming in contact with the support rail 120A will be defined as wheels 210A, and two wheels coining in contact with the support rail 120B will be defined as wheels 210B to distinguish between them.

The two wheels 210A are aligned below the chassis 201 along the conveying path MR, and are attached to the two axle holding walls 202 on the support rail 120A side. The two wheels 210B are aligned below the chassis 201 along the conveying path MR, and are attached to the two axle holding walls 202 on the support rail 120B side.

The roller 220 is attached to a lower portion of the chassis 201 so as to be rotatable around a vertical axis. The six rollers 220 include two rollers 220A, two rollers 220B, a roller 220C, and a roller 220D.

The two rollers 220A are in contact with one side surface of the guide rail 110A and are aligned along the conveying path MR. The two rollers 220B come into contact with the side surface oriented opposite to the side surface of the above-described one of the two side surfaces of the guide rail 110B, and are aligned along the conveying path MR. The roller 220C is positioned between the two rollers 220A in the direction along the conveying path MR and is in contact with the side surface of the guide rail 110A on the opposite side of the roller 220A. The roller 220D is positioned between the two rollers 220B in the direction along the conveying path MR and is in contact with the side surface of the guide rail 110B on the opposite side of the roller 220B.

As an example, the roller 220A comes in contact with an outer side surface 111 (side surface on the opposite side of the guide rail 110B) of the guide rail 110A and the roller 220B comes in contact with the outer side surface 111 (side surface on the opposite side of the guide rail 110A) of the guide rail 110B. The roller 220C comes in contact with the inner side surface 112 (side surface on the guide rail 110B side) of the guide rail 110A, and the roller 220D comes in contact with the inner side surface 112 (side surface on the guide rail 110A side) of the guide rail 110B. At least one of the rollers 220C and 220D may be positioned between the wheels 210. As an example, the roller 220C is positioned between the wheels 210A, and the roller 220D is positioned between the wheels 210B.

The heights of the six rollers 220 may be the same or different. For example, the rollers 220C and 220D positioned between the guide rails 110A and 110B, respectively, may be arranged at lower positions than the rollers 220A and 220B positioned outside the guide rails 110A and 110B, respectively.

An intermediate position CP1 of the two rollers 220A, an intermediate position CP2 of the two rollers 220B, and a center CP3 of the mover 240 may match with each other in the direction along the conveying path MR. Note that the intermediate position CP1 of the two rollers 220A represents a position bisecting a line segment connecting the centers of the rollers 220A in plan view. The intermediate position CP2 of the two rollers 220B represents a position bisecting a line segment connecting the centers of the rollers 220B in plan view.

Figure 4:
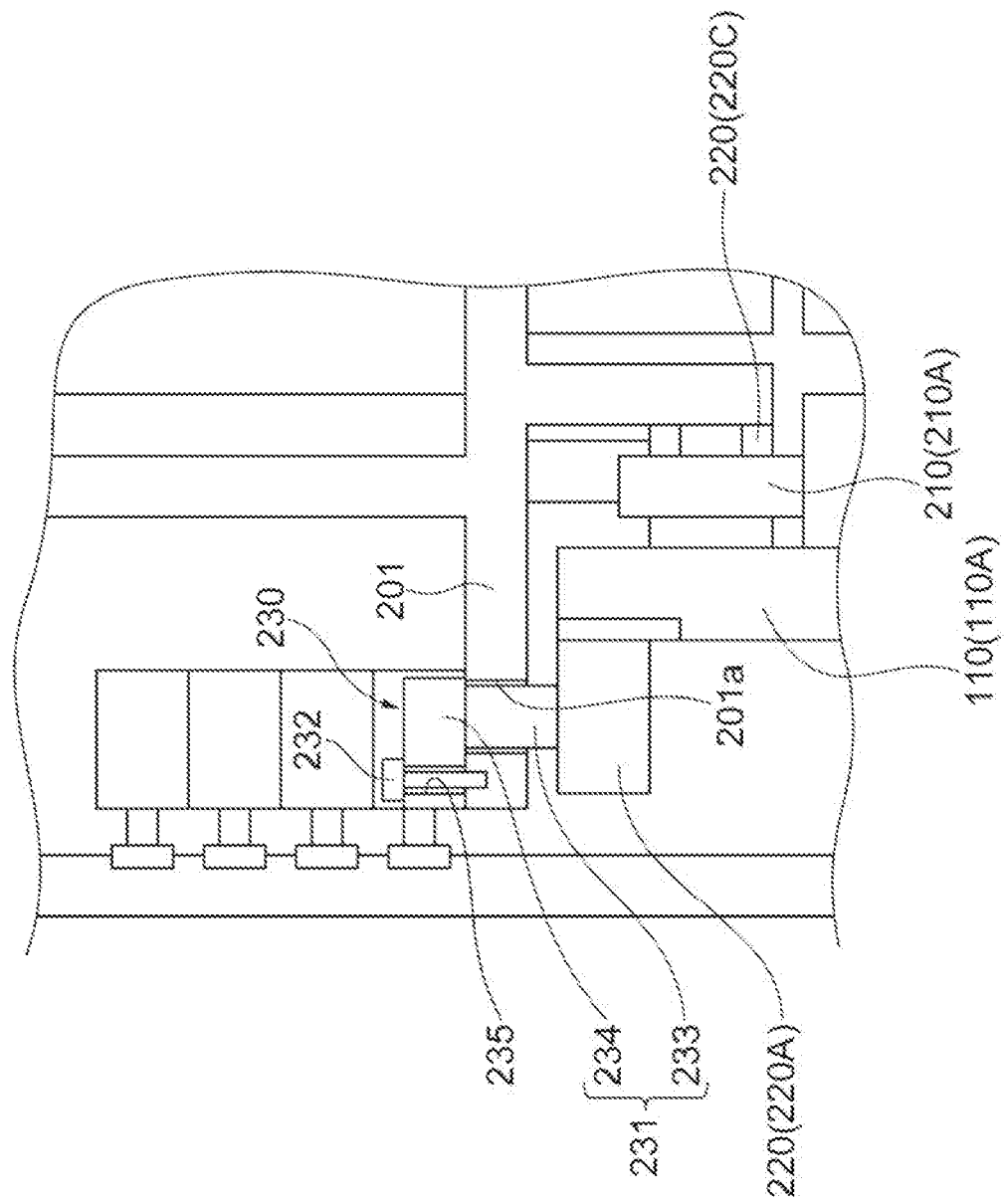
FIG. 4 is a cross-sectional view of a position adjustment mechanism.

At least any of the six rollers 220 may be attached to the chassis 201 via a position adjustment mechanism 230. For example, the two rollers 220A may be attached to the chassis 201 via the position adjustment mechanism 230. As illustrated in FIG. 4, the position adjustment mechanism 230 includes a roller holder 231 and at least one fixing bolt 232. The roller holder 231 includes a shaft 233 extending downward and a bracket 234 provided on an upper portion of the shaft 233. The chassis 201 includes a hole 201a to allow the shaft 233 to pass through. The inner diameter of the hole 201a is greater than the outer diameter of the shaft 233. The bracket 234 includes a hole 235 to allow the fixing bolt 232 to pass through. The inner diameter of the hole 235 is greater than the outer diameter of the fixing bolt 232.

The shaft 233 of the roller holder 231 passes through the hole 201a from above and the bracket 234 abuts an upper surface of the chassis 201. In this state, the fixing bolt 232 passes through the hole 235 from above and is screwed into the chassis 201. As a result, the roller holder 231 is fastened to the chassis 201. The roller 220A is attached to an end portion of the shaft 233 passing below the chassis 201. Since the inner diameter of the hole 201a is greater than the outer diameter of the shaft 233 and the inner diameter of the hole 235 is greater than the outer diameter of the fixing bolt 232, the position of the roller holder 231 can be shifted by loosening the fixing bolt 232. As a result, the position of the roller 220A can be adjusted. Therefore, the positional relationship between the guide rail 110 and the roller 220 can be adjusted in accordance with a manufacturing error, for example.

Note that the hole 201a and the hole 235 may be elongated holes so as to increase an adjustment margin in a predetermined direction. For example, the hole 201a and the hole 235 may be elongated holes expanding in a direction orthogonal to the conveying path MR. In this case, the adjustment margin of the position of the roller 220A increases in the direction orthogonal to the conveying path MR.

While the material constituting the carrier 200 is not particularly limited, a relatively lightweight metal material such as an aluminum based alloy can be a constituent material of each of the members. Moreover, the position adjustment mechanism 230 may be formed of a material having higher hardness than the chassis 201. For example, in a case where the chassis 201 is formed of an aluminum based alloy, the roller holder 231 may be formed of a high hardness steel material. In this case, irregularities may be formed on a lower surface of the bracket 234. Since irregularities bite into the surface of the chassis 201, positional deviation after adjustment can be more reliably prevented.

While the aluminum based alloy, or the like, is mentioned as the constituent material of the guide unit 100, the support rail 120 of the guide unit 100 may be formed of a material having higher hardness than the wheel 210. Furthermore, the guide rail 110 of the guide unit 100 may be formed of a material having higher hardness than the roller 220. For example, in a case where the wheel 210 and the roller 220 are formed of an aluminum based alloy, the support rail 120 may be formed of steel, stainless steel, or the like, and the guide rail 110 may be formed of steel, stainless steel, or the like.

By forming the support rail 120 with a material having higher hardness than the wheel 210, it is possible to suppress wear of the support rail 120. As a result, the replacement frequency of the guide unit 100 can be reduced as compared with the replacement frequency of the carrier 200. By forming the guide rail 110 with a material having higher hardness than the roller 220, it is possible to suppress wear of the guide rail 110. This further reduces the replacement frequency of the guide unit 100. By reducing the replacement frequency of the guide unit 100 that cannot be easily replaced as compared with the carrier 200, it is possible to enhance maintainability of the conveying equipment. In the present embodiment, the support rail 120 and the guide rail 110 are separate from the platform 101. Therefore, by forming the support rail 120 and the guide rail 110 with a relatively high hardness material (for example, steel, stainless steel, or the like), and forming the platform 101 with a relatively lightweight material (for example, an aluminum based alloy), it is also possible to suppress the weight increase in the whole guide unit 100.

According to the configuration exemplified above, the movement of the carrier 200 in a direction in which the stator 130 is positioned is restricted by the contact of the wheel 210 (rolling member) with the traveling surface 121. Moreover, the movement of the carrier 200 to the side of the stator 130 is restricted by the contact of the roller 220 (rolling member) with the guide rail 110. That is, the wheel 210/the traveling surface 121 and the roller 220/the guide rail 110 function as means for restricting the movement in at least one direction (three directions) orthogonal to the conveying path MR by the rolling member.

(Curve-Type Guide Unit and Linear-Type Guide Unit)

As illustrated in FIGS. 1 and 3, in a case where the conveying system 1 includes a plurality of guide units 100, the plurality of guide units 100 may include a curve-type guide unit 100A and a linear-type guide unit 100B. The curve-type guide unit 100A constitutes a conveying path MR1 curved in plan view. The linear-type guide unit 100B constitutes a conveying path MR2 that is straight in plan view.

The side surface of the curve-type guide unit 100A with which the roller 220A or the roller 220B come in contact from the outer circumferential side of the conveying path MR1 may bulge more toward the outer circumferential side of the conveying path MR1 as compared with an arc continuous to the side surface of the linear-type guide unit 100B corresponding to the side surface. Hereinafter, the bulging state will be referred to as "convex". The side surface of the curve-type guide unit 100A with which the roller 220A or the roller 220B come in contact from the inner circumferential side of the conveying path MR1 may be recessed more toward the outer circumferential side of the conveying path MR1 as compared with an arc continuous to the side surface of the linear-type guide unit 100B corresponding to the side surface. Hereinafter, such recessed state is referred to as "concave". The "inner circumferential side" represents a curvature center CC1 side of the conveying path MR1, and the "outer circumferential side" represents the opposite side of the curvature center CC1.

Figure 5:
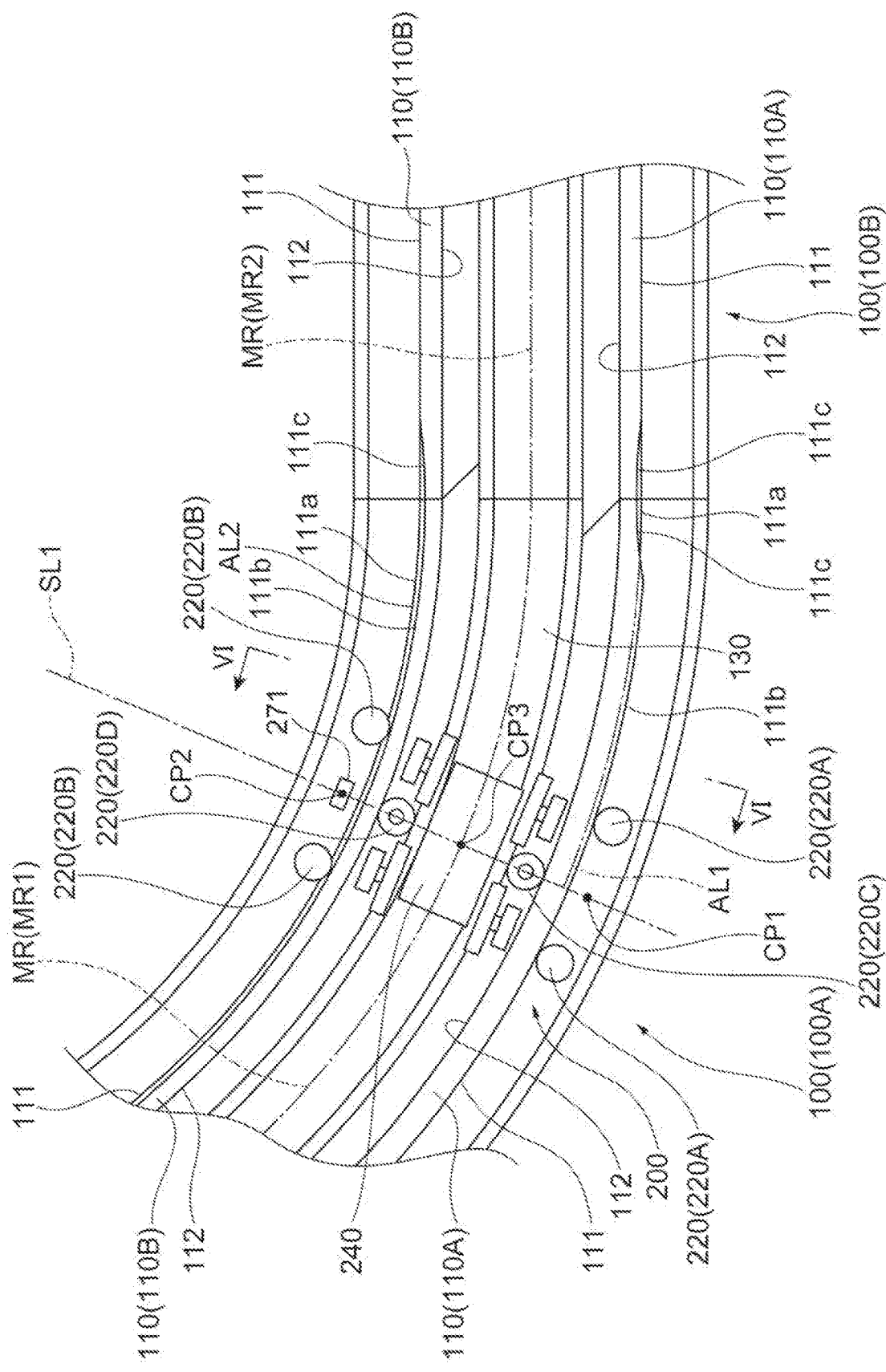
FIG. 5 is an enlarged plan view illustrating a connecting portion of a linear-type guide unit and a curve-type guide unit.
Figure 6:
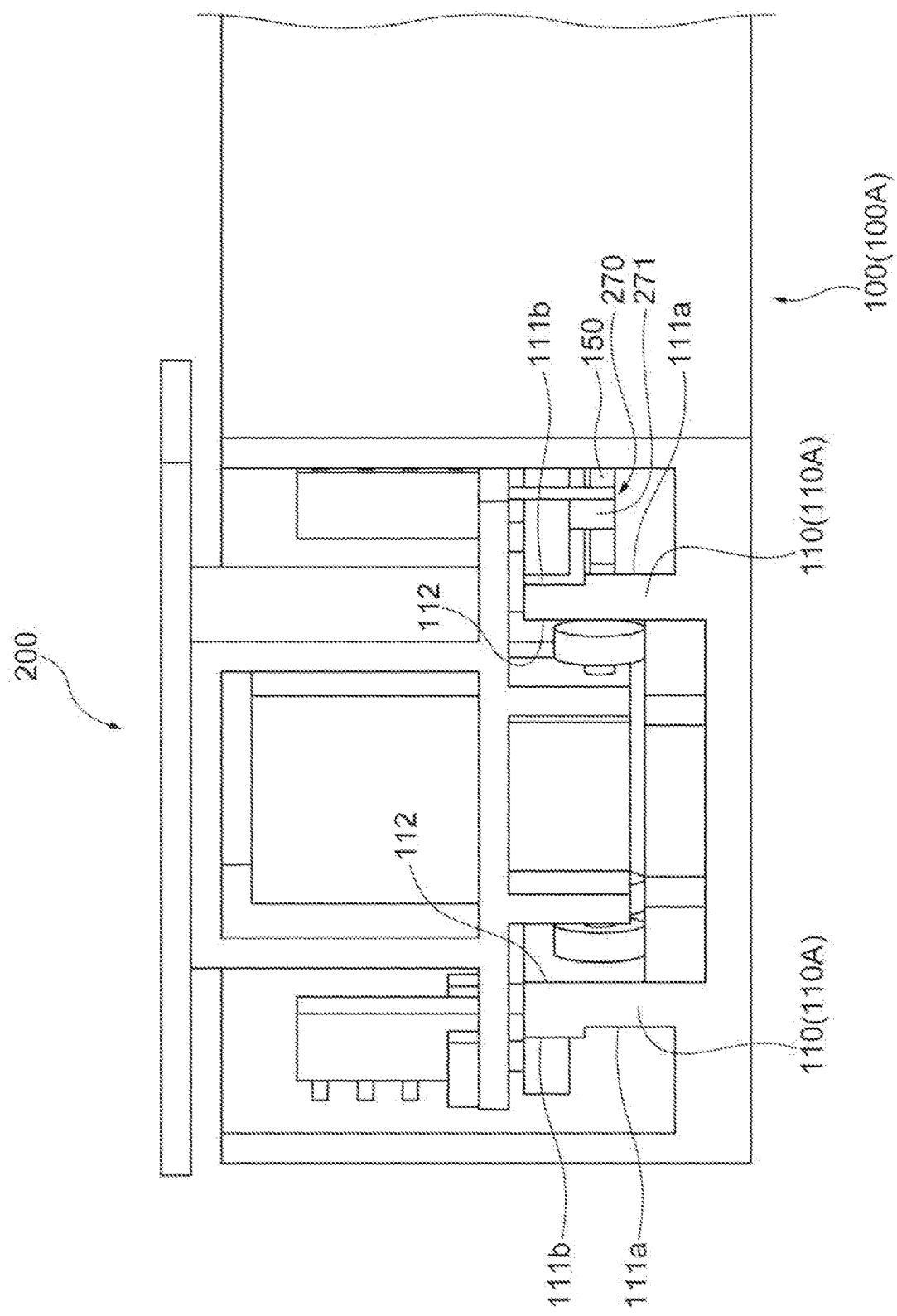
FIG. 6 is a cross-sectional view taken along line VI-VI in FIG. 5.

Each of FIGS. 5 and 6 exemplifies a case where the guide rail 110A of the curve-type guide unit 100A is positioned on the outer circumferential side of the conveying path MR1. The roller 220A comes in contact with an outer side surface 111b of the upper portion of the guide rail 110A from the outer circumferential side of the conveying path MR1. The roller 220B comes in contact with the outer side surface 111b of the upper portion of the guide rail 110B from the inner circumferential side of the conveying path MR1.

The outer side surface 111b of the guide rail 110A bulges more toward the outer circumferential side of the conveying path MR1 as compared with an arc AL1 continuous to the outer side surface 111 of the guide rail 110A of the linear-type guide unit 100B. Hereinafter, this outer side surface 111b will be referred to as the "convex outer side surface 111b". The outer side surface 111b of the guide rail 110B is recessed more toward the outer circumferential side of the conveying path MR1 as compared with an arc AL2 continuous to the outer side surface 111 of the guide rail 110B of the linear-type guide unit 100B. Hereinafter, this outer side surface 111b will be referred to as "concave outer side surface 111b". An outer side surfaces 111a of the lower portions of the guide rails 110A and 110B match the arcs AL1 and AL2, respectively.

The amount of bulge (hereinafter referred to as a "bulging amount") of the convex outer side surface 111b as compared with the arc AL1 and the amount of recess (hereinafter referred to as an "recessed amount") of the concave outer side surface 111b as compared with the arc AL2 are set as follows, for example. That is, the bulging amount is set such that the convex outer side surface 111b matches the circular arc that comes in contact with the two rollers 220A from the inner side of the circular arc in a state where the center of the carrier 200 is positioned at an equal distance from the arcs AL1 and AL2. The recessed amount is set such that the concave outer side surface 111b matches the circular arc that comes in contact with the two rollers 220B from the outer side of the circular arc in a state where the center of the carrier 200 is positioned at an equal distance from the arcs AL1 and AL2. Note that the "center of the carrier 200" means a position bisecting a line segment connecting the intermediate position CP1 of the rollers 220A with the intermediate position CP2 of the rollers 220B. "Matching" means substantial coincidence, including a deviation in a manufacturing error range.

When the carrier 200 moves along the straight conveying path MR2, tracks of the two rollers 220A match the track of their intermediate position CP1. The tracks of the two rollers 220B match the track of their intermediate position CP2. When the carrier 200 moves along the curved conveying path MR1, the track of the roller 220A is shifted to the outer circumferential side of the conveying path MR1 with respect to the track of the intermediate position CP1, and the track of the roller 220B is also shifted to the outer circumferential side of the conveying path MR1 with respect to the track of the intermediate position CP2. Therefore, in a case where the concave outer side surface 111b and the convex outer side surface 111b are not provided in a configuration without the rollers 220C and 220D, deviation would occur between the track of the carrier 200 in the curve-type guide unit 100A and the track of the carrier 200 in the linear-type guide unit 100B.

In contrast, in a case where the concave outer side surface 111b and the convex outer side surface 111b are provided, the deviation between the track of the carrier 200 in the curve-type guide unit 100A and the track of the carrier 200 in the linear-type guide unit 100B is decreased. In this manner, each of the concave outer side surface 111b and the convex outer side surface 111b functions as a means for adjusting the track of the carrier 200 so as to decrease the deviation between the track of the carrier 200 in the curve-type guide unit 100A and the track of the carrier 200 in the linear-type guide unit 100B. The "track of carrier 200" is the track of the center of the carrier 200.

In a case where the concave outer side surface 111b and the convex outer side surface 111b are not provided in a configuration having the rollers 220C and 220D, the guide rail 110 and the roller 220 would interfere with each other in the curve-type guide unit 100A, disabling the movement of the carrier 200 on the curve-type guide unit 100A.

In the linear-type guide unit 100B, recessed portions continuous to the above-described concave outer side surface 111b may be formed on both end portions of the side surface with which the roller 220A comes in contact and the side surface with which the roller 220B comes in contact. For example, in the configuration in which the rollers 220A and 220B come in contact with the outer side surface 111, the above-described recessed portion (a recessed portion 111c illustrated in the drawing) is formed at both end portions of the outer side surface 111.

It is preferred that the recessed portion 111c is formed so as to gently connect the outer side surface 111 of the guide rail 110B and the concave outer side surface 111b of the guide rail 110A. As an example, the recessed portion 111c is formed in an arc shape in plan view. In FIG. 5, the outer side surface 111 of the guide rail 110B of the linear-type guide unit 100B is gently connected with the concave outer side surface 111b of the curve-type guide unit 100A via the recessed portion 111c.

Figure 7:
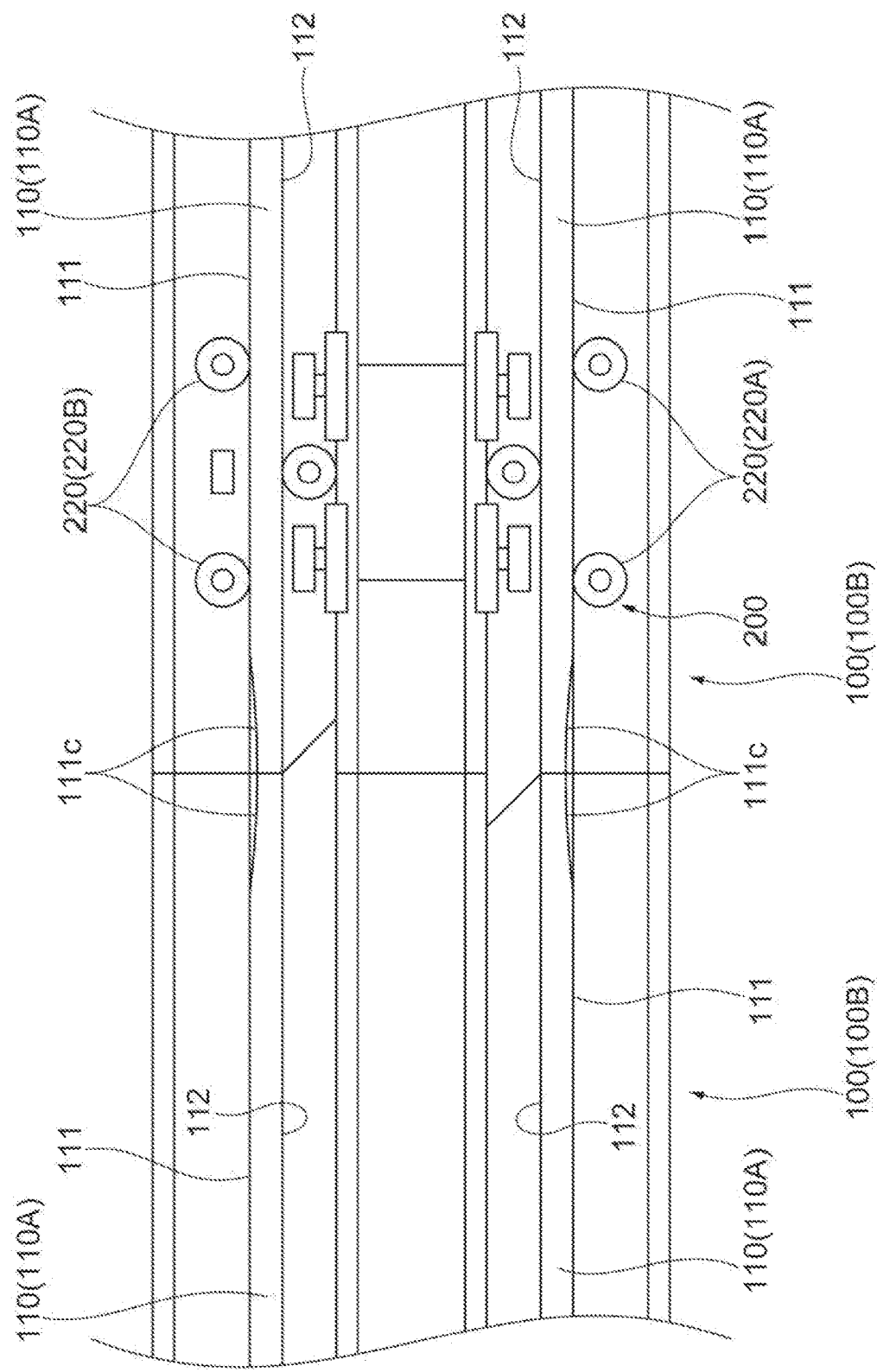
FIG. 7 is an enlarged plan view illustrating a connecting portion between the linear-type guide units.

As illustrated in FIG. 7, in a case where the linear-type guide units 100B are connected to each other, the recessed portions 111c are continuous with each other in each of the guide rails 110A and 110B. As a result, the outer side surfaces 111 are gently connected to each other at each of the guide rails 110A and 110B.

Figure 8:
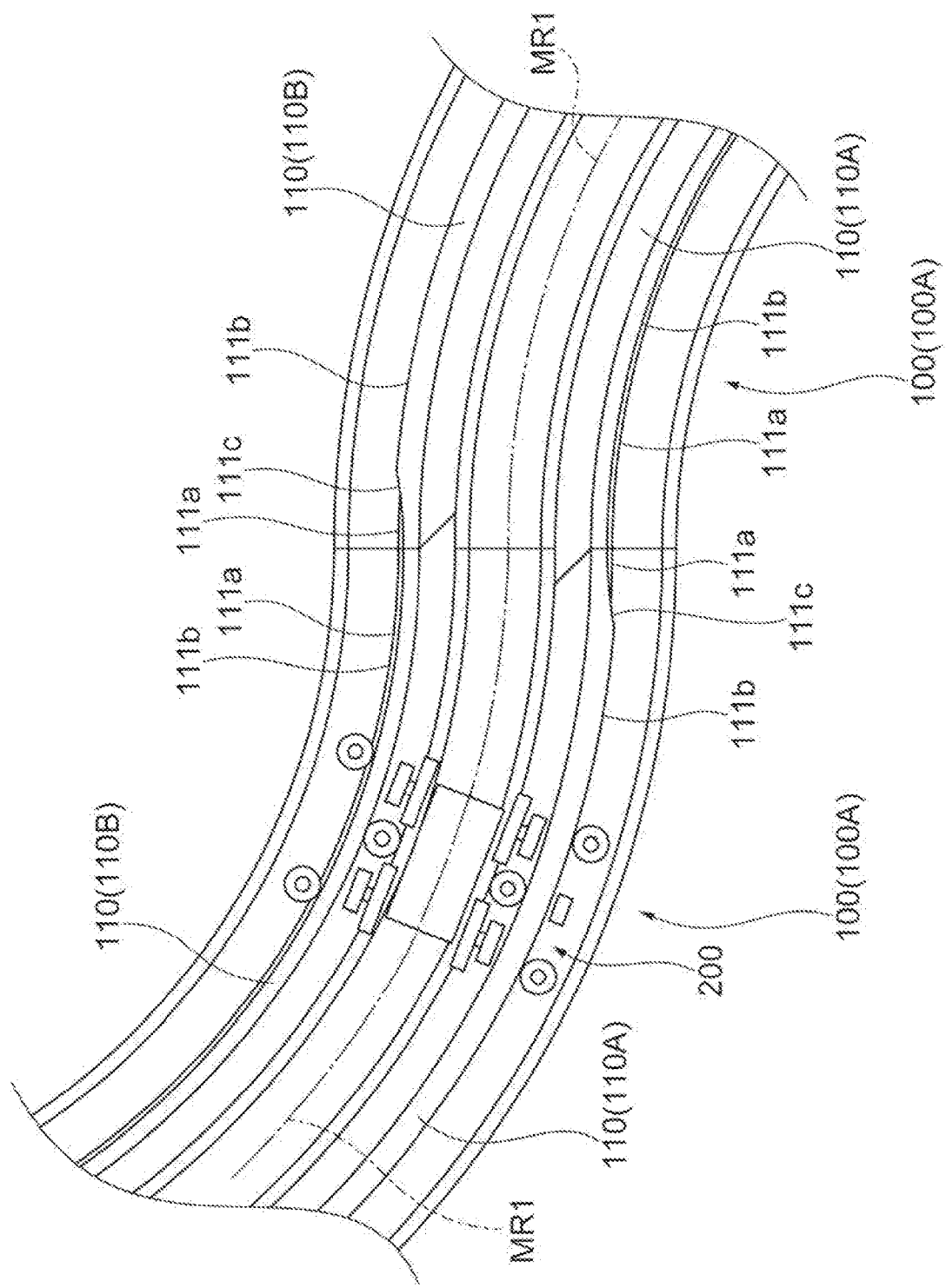
FIG. 8 is an enlarged plan view illustrating a connecting portion between the curve-type guide units.

The recessed portion 111c continuous to the concave outer side surface 111b of another curve-type guide unit 100A may be formed at both end portions of the convex outer side surface 111b of the curved type guide unit 100A. FIG. 8 exemplifies a joint in which the curve-type guide units 100A are continuous to each other in opposite orientations. In the curve-type guide unit 100A on the left side in the drawing, the guide rail 110A is positioned on the outer circumferential side of the conveying path MR1, and the recessed portion 111c is formed at both end portions of the outer side surface 111b of the guide rail 110A. The convex outer side surface 111b on the left side in the drawing and the concave outer side surface 111b on the right side in the drawing are gently connected via the recessed portion 111c.

In the curve-type guide unit 100A on the right side in the drawing, the guide rail 110B is positioned on the outer circumferential side of the conveying path MR1, and the recessed portion 111c is formed at both end portions of the outer side surface 111b of the guide rail 110B. The concave outer side surface 111b on the left side in the drawing and the convex outer side surface 111b on the right side in the drawing are gently connected via the recessed portion 111c.

The recessed portion 111c of the curve-type guide unit 100A and the recessed portion 111c of the linear-type guide unit 100B allow the convex outer side surface 111b of the curve-type guide unit 100A and the outer side surface 111 of the linear-type guide unit 100B to be gently connected with each other (refer to FIG. 5).

(Stator and Mover)

The stator 130 of the guide unit 100 and the mover 240 of the carrier 200 generate thrust along the conveying path MR in cooperation with each other. As an example, the stator 130 includes a magnetic member, and the mover 240 includes a plurality of coils configured to generate thrust along the conveying path MR by generating a moving magnetic field acting on the magnetic member in accordance with the supply of power. That is, the stator 130 and the mover 240 constitute a moving coil (MC) type linear motor.

In addition to the thrust along the conveying path MR, the plurality of coils of the mover 240 may generate attraction toward the magnetic material of the stator 130. In this case, the movement of the carrier 200 to the opposite side of the stator 130 is restricted by the attraction generated between the mover 240 and the stator 130. As described above, in the configuration having a means for restricting the movement of the carrier 200 in one direction orthogonal to the conveying path MR by the rolling member, each of the mover 240 and the stator 130 functions as a means for contactlessly restricting the movement of the carrier 200 in the other direction orthogonal to the conveying path MR.

Figure 9:
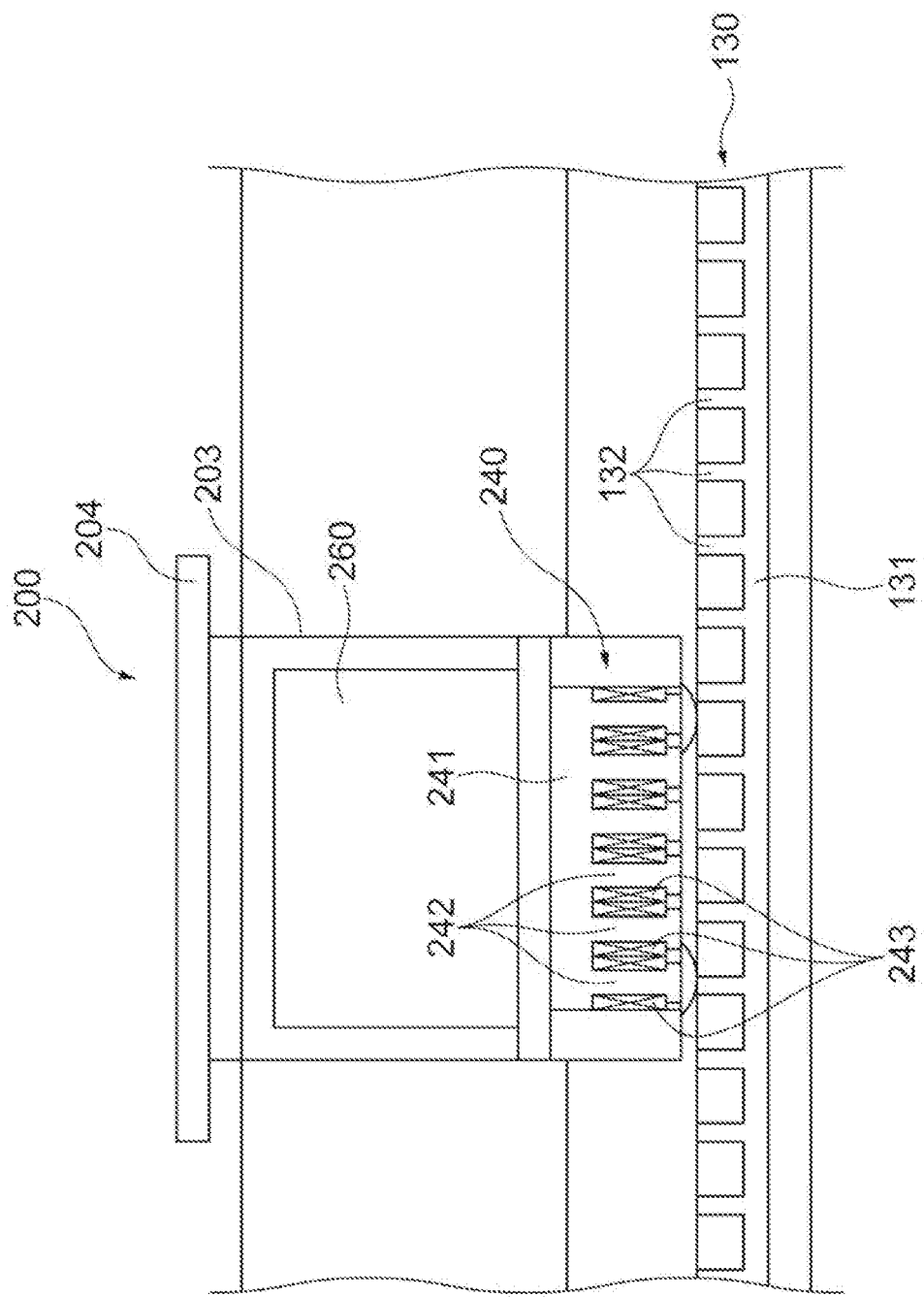
FIG. 9 is a cross-sectional view taken along line IX-IX in FIG. 2.

Hereinafter, a specific configuration example of the stator 130 and the mover 240 will be described with reference to FIG. 9. The stator 130 includes a magnetic member 131 formed of a soft magnetic material. Examples of the soft magnetic material include an iron-based metallic material. The magnetic member 131 includes a plurality of salient poles 132. Each of the plurality of salient poles 132 is aligned along the conveying path MR, and protrudes toward the mover 240 side.

The magnetic member 131 may be embedded between the traveling lines ML1 and ML2 so as to decrease a height difference between the protruding end portion of the salient pole 132 and the traveling surface 121. For example, the magnetic member 131 may be fitted between the support rails 120A and 120B. With this configuration, the height difference between the protruding end portion of the salient pole 132 and the traveling surface 121 may be zero.

The mover 240 includes a core 241 and a plurality of coils 243. The core 241 includes teeth 242 aligned along the conveying path MR. The plurality of coils 243 is wound to surround the each of the teeth 242, and overlaps with the magnetic member 131 in plan view. AC power having a different phase is supplied to each of the plurality of coils 243. With this configuration, the mover 240 generates a moving magnetic field along the conveying path MR. Action of the moving magnetic field on the salient pole 132 of the magnetic member 131 generates thrust along the conveying path MR and attraction toward the magnetic member 131.

The configurations of the stator 130 and the mover 240 are not limited to those exemplified here. The stator 130 and the mover 240 may be configured in any way as long as it is possible to generate thrust along the conveying path MR in accordance with the supply of power. For example, the magnetic member 131 may be formed of a permanent magnet. A permanent magnet may be added to the mover 240.

Furthermore, the mover 240 may include the magnetic member 131, and the stator 130 may include the core 241 and the coil 243. That is, the stator 130 and the mover 240 may constitute a moving magnet (MM) type linear motor.

(Conductive Line and Brush)

In a case where the stator 130 and the mover 240 constitute the MC type linear motor, the guide unit 100 may further include at least four conductive lines 140 as illustrated in FIG. 2 in order to perform power supply and communication to the carrier 200. The carrier 200 may further include at least four brushes 250 and at least one driver circuit 260.

At least four conductive lines 140 include two power supply lines and two communication lines. The two power supply lines supply power (for example, DC power) to the driver circuit 260. The two communication lines transmit electric signals for information communication to the carrier 200. The conductive lines 140 are provided along the conveying path MR, and when the guide units 100 are coupled to each other, the conductive lines 140 are also coupled to each other.

The at least four brushes 250 include two power supply brushes and two communication brushes. Two power supply brushes are provided so as to come in contact with the above-described two power supply lines, respectively, and relay power to the carrier 200. Two communication brushes are provided so as to come in contact with the above-described two communication lines, respectively, and relay the above-described electric signal.

At least four pairs of conductive lines 140 and brushes 250 may be dispersedly arranged in equal number on both sides of the mover 240 in a direction orthogonal to the conveying path MR.

As exemplified in FIG. 2, the guide unit 100 may include eight conductive lines 140 including four power supply lines 140A to 140D and four communication lines 140E to 140H. Correspondingly, the carrier 200 may include four power supply brushes 250A to 250D and four communication brushes 250E to 250H. This enables power supply in two systems of the power supply lines 140A and 140B and the power supply lines 140C and 140D, and enables information communication in two systems of the communication lines 140E and 140F and the communication lines 140G and 140H.

Each of the brushes 250 includes a holder 251 and a contact terminal 252. The holder 251 is fixed to the chassis 201 and holds the contact terminal 252. The holder 251 incorporates an elastic member for pressing the contact terminal 252 against the conductive line 140.

Eight pairs of conductive lines 140 and brushes 250 are dispersedly arranged in equal number on both sides of the mover 240 in a direction orthogonal to the conveying path MR. For example, the power supply lines 140A and 140B and the communication lines 140E and 140F are provided on the inner side surface of one side wall 102A (side surface on the side wall 102B side), while the power supply lines 140C and 140D and the communication lines 140G and 140H are provided on the inner side surface of the other side wall 102B (side surface on the side wall 102A side). While there is no limitation on the arrangement of the power supply lines 140A and 140B and the communication lines 140E and 140F in the side wall 102A and the arrangement of the power supply lines 140C and 140D and the communication lines 140G and 140H in the side wall 102B, the power supply lines 140A to 140D may be positioned on the traveling surface 121 side with respect to the communication lines 140E to 140H.

The power supply brushes 250A and 250B and the communication brushes 250E and 250F are arranged between the side wall 102A and the mover 240 in a direction orthogonal to the conveying path MR, so as to be fixed on the chassis 201 in a state of being overlapped with each other. The power supply brushes 250A and 250B and the communication brushes 250E and 250F are individually arranged such that the contact terminals 252 face the side wall 102A. The contact terminals 252 of the power supply brushes 250A and 250B and the communication brushes 250E and 250F are pressed against the power supply lines 140A and 140B and the communication lines 140E and 140F, respectively, by elastic members incorporated in the holder 251.

The power supply brushes 250C and 250D and the communication brushes 250G and 250H are arranged between the side wall 102B and the mover 240 in a direction orthogonal to the conveying path MR and are fixed on the chassis 201 in a state of being overlapped with each other. The power supply brushes 250C and 250D and the communication brushes 250G and 250H are arranged such that the contact terminals 252 face the side wall 102B. The contact terminals 252 of the power supply brushes 250C and 250D and the communication brushes 250G and 250H are pressed against the power supply lines 140C and 140D and the communication lines 140G and 140H, respectively, by elastic members incorporated in the holder 251.

As described above, the brush 250 functions as a means for relaying the power from the power supply lines 140A to 140D to the carrier 200 and the electric signal between the communication lines 140E to 140H and the carrier 200. Moreover, the brushes 250 function as means for canceling the moment around the axis along the conveying path by being dispersedly arranged in equal number on both sides of the mover 240.

The driver circuit 260 converts the power supplied from the brush 250 into power for drive and outputs it to the mover 240. The driver circuit 260 is provided between the brushes 250 so as to sandwich the chassis 201 between oneself and the mover 240. In a case where the mover 240 is provided below the chassis 201 as described above, the driver circuit 260 is provided above the chassis 201. For example, the driver circuit 260 is provided in the housing 203 on the chassis 201.

Figure 10:
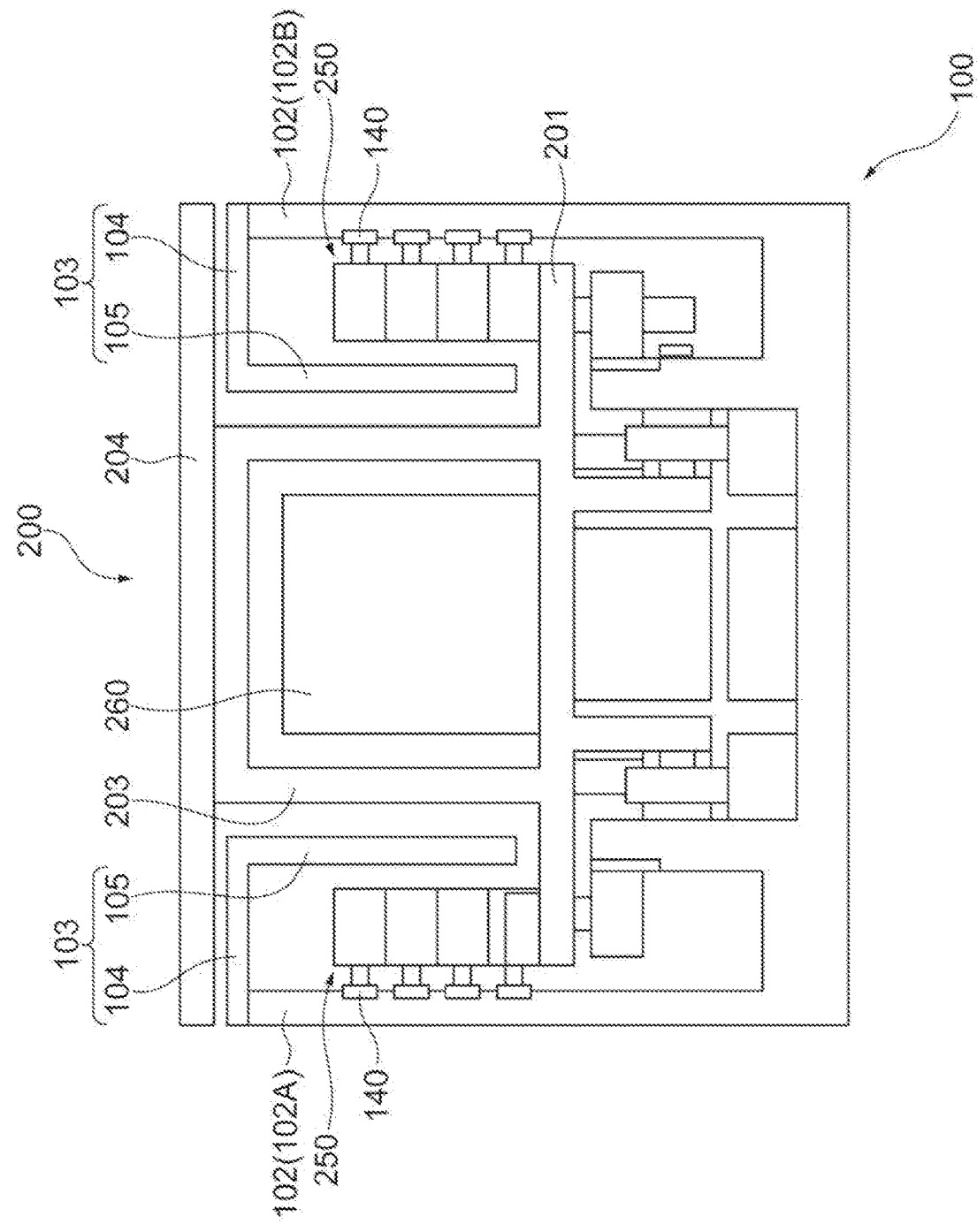
FIG. 10 is a cross-sectional view illustrating an example in which a cover is attached to the guide unit in FIG. 2.

As illustrated in FIG. 10, the guide unit 100 may include a cover 103 covering the conductive line 140 and the brush 250. For example, the cover 103 includes an upper plate 104 protruding from the upper end portion of the side wall 102 so as to come over the brush 250, and includes a side plate 105 extending downward in the vertical direction from an edge portion of the upper plate 104 so as to enter between the housing 203 and the brush 250. With this configuration, it is possible to firmly protect the connecting portion of the conductive line 140 and the brush 250.

Figure 11:
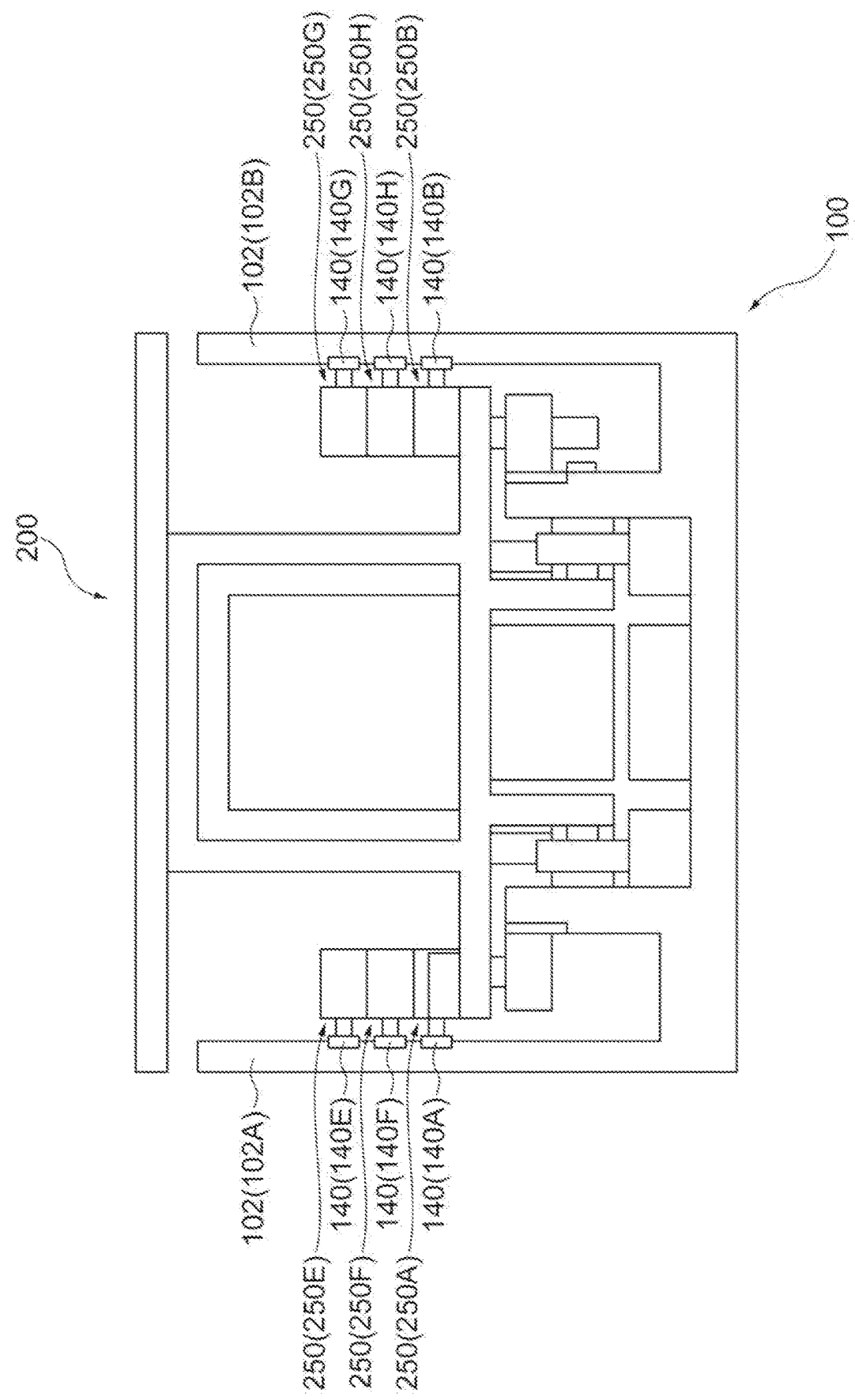
FIG. 11 is a cross-sectional view illustrating another arrangement example of a conductive line and a brush.

The number of the conductive lines 140 and the number of the brushes 250 can be appropriately changed. For example, as illustrated in FIG. 11, the guide unit 100 may include three conductive lines 140 including two communication lines and a single power supply line on each of both sides of the mover 240. For example, the guide unit 100 may include two communication lines 140E and 140F and one power supply line 140A on the side wall 102A side, and may include two communication lines 140G and 140H and one power supply line 140B on the side wall 102B side.

Correspondingly, the carrier 200 may include three brushes 250 including two communication brushes and one power supply brush on each of both sides of the mover 240. For example, the carrier 200 may include two communication brushes 250E and 250F and one power supply brush 250A on the side wall 102A side, and two communication brushes 250G and 250H and one power supply brush 250B on the side wall 102B side. Even in this case, the power supply lines 140A and 140B may be positioned on the traveling surface 121 side with respect to the communication lines 140E to 140H.

Figure 12:
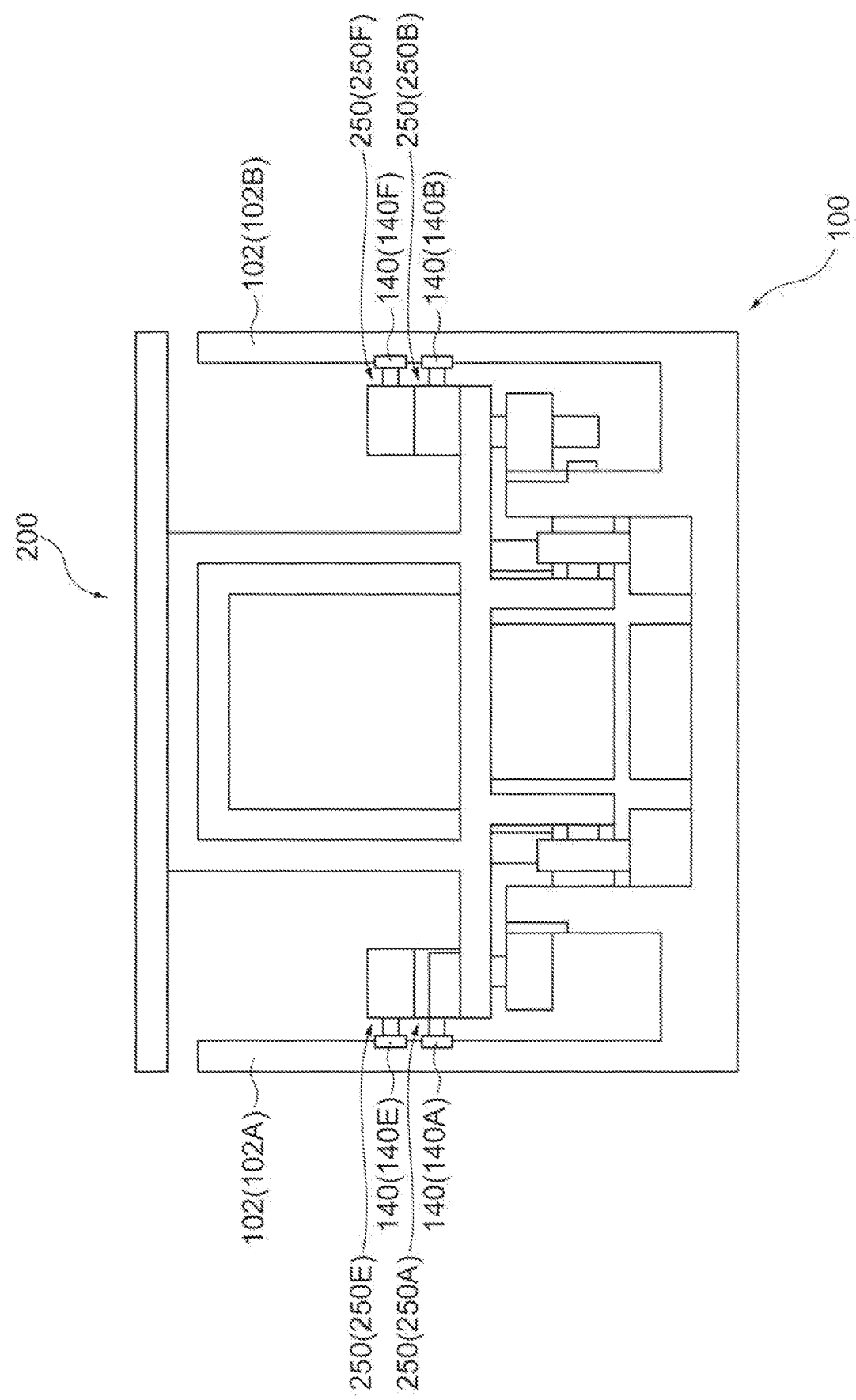
FIG. 12 is a cross-sectional view illustrating yet another arrangement example of the conductive line and the brush.

Moreover, as illustrated in FIG. 12, the guide unit 100 may include two conductive lines 140 including one communication line and one power supply line on each of both sides of the mover 240. For example, the guide unit 100 may include one communication line 140E and one power supply line 140A on the side wall 102A side and one communication line 140F and one power supply line 140B on the side wall 102B side.

Correspondingly, the carrier 200 may include two brushes 250 including one communication brush and one power supply brush, on each of both sides of the mover 240. For example, the carrier 200 may include one communication brush 250E and one power supply brush 250A on the side wall 102A side and may include one communication brush 250F and one power supply brush 250B on the side wall 102B side. Even in this case, the power supply lines 140A and 140B may be positioned on the traveling surface 121 side with respect to the communication lines 140E and 140F.

Figure 13:
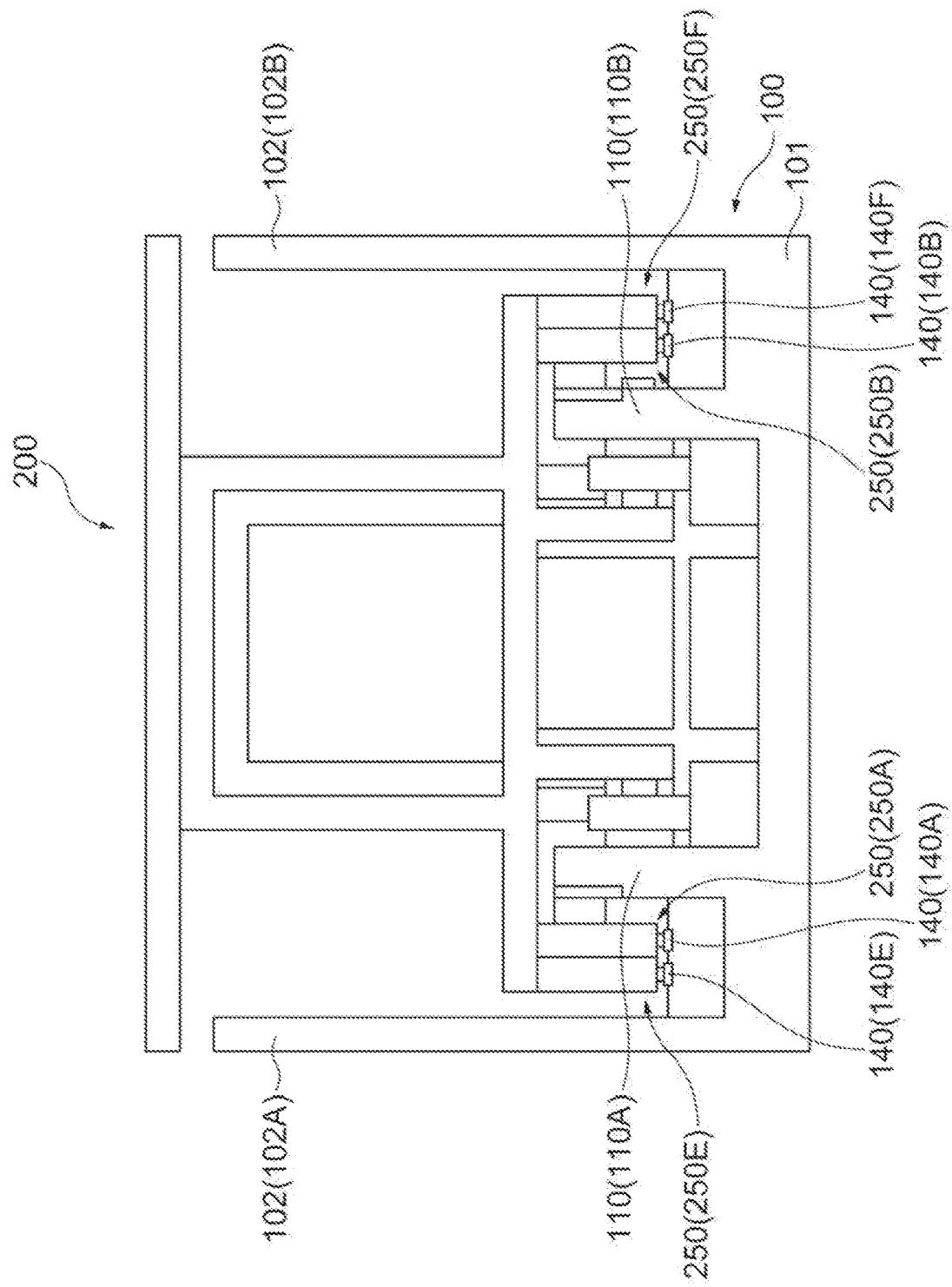
FIG. 13 is a cross-sectional view illustrating yet another arrangement example of the conductive line and the brush.

The conductive line 140 need not necessarily be provided on the side of the carrier 200. For example, as illustrated in FIG. 13, the conductive line 140 may be provided below the carrier 200. Even in this case, at least the four pairs of the conductive lines 140 and the brushes 250 may be dispersedly arranged on both sides of the mover 240 in the direction orthogonal to the conveying path MR.

As an example, in FIG. 13, the power supply line 140A and the communication line 140E are arranged upward on a floor surface between the guide rail 110A and the side wall 102A. The power supply line 140B and the communication line 140F are arranged upward on a floor surface between the guide rail 110B and the support rail 120B. Correspondingly, the power supply brush 250A and the communication brush 250E are fixed below the chassis 201 on the side wall 102A side, and the power supply brush 250B and the communication brush 250F are fixed below the chassis 201 on the side wall 102B side. Each of the power supply brushes 250A and 250B and the communication brushes 250E and 250F is arranged such that the contact terminal 252 faces downward. The contact terminals 252 of the power supply brushes 250A and 250B and the communication brushes 250E and 250F are pressed against the power supply lines 140A and 140B and the communication lines 140E and 140F, respectively, by elastic members incorporated in the holder 251.

(Indicator Section and Position Sensor)

Returning to FIG. 2, the guide unit 100 and the carrier 200 may include an indicator section 150 and a position sensor 270, respectively. The indicator section 150 indicates information related to positions in the conveying path MR. The indicator section 150 may be provided on at least one of the outer side surface 111 and the inner side surface 112 of the guide rail 110. The indicator section 150 is a scale for a linear encoder, for example, and is provided along the conveying path MR. In this case, the indicator section 150 has a graduation pattern for reading aligned along the conveying path MR. The indicator section 150 may be provided in advance on the single guide unit 100 before connection or after the plurality of guide units 100 is connected to each other.

The position sensor 270 includes an information acquisition section 271. The information acquisition section 271 acquires information indicated by the indicator section 150. The position sensor 270 detects position information of the carrier 200 on the basis of the information acquired by the information acquisition section 271. The position sensor 270 is, for example, an optical sensor capable of reading a graduation pattern of the indicator section 150, and receives reflected light from the graduation pattern at the information acquisition section 271. Information detected by the position sensor 270 can be output via the above-described communication lines 140E, 140F, 140G, and 140H, for example.

As illustrated in FIG. 3, the information acquisition section 271 may be positioned on a first straight line SL1 orthogonal to the conveying path MR1 and passing through the curvature center CC1 of the conveying path MR1 (refer to FIG. 5). Note that "positioned on the first straight line SL1" means that it is substantially positioned on the first straight line SL1 and includes a deviation in a manufacturing error range.

In a case where the information acquisition section 271 is arranged on the first straight line SL1 in a configuration including no deviation between the track of the carrier 200 in the curve-type guide unit 100A and the track of the carrier 200 in the linear-type guide unit 100B, the distance between the indicator section 150 and the position sensor 270 is equal in the curve-type guide unit 100A and the linear-type guide unit 100B. Here, "equal" means substantially equal, and it includes slight differences due to the manufacturing error range. In this manner, the configuration in which the information acquisition section 271 is arranged on the first straight line SL1 functions as a means for suppressing a variation in the positional relationship between the position sensor 270 and the indicator section 150.

Note that the indicator section 150 is not limited to the scale of the linear encoder and may be anything as long as it indicates information related to the position in the conveying path MR. For example, the indicator section 150 may be a marker indicating a reference position such as an initial position. In this case, the position sensor 270 obtains information indicating that the carrier 200 is at the initial position or the reference position as the position information of the carrier 200.

The center CP3 of the mover 240 may be positioned on the first straight line SL1 together with the information acquisition section 271. The carrier 200 may include rollers (for example, rollers 220C and 220D) positioned on the first straight line SL1 and coming in contact with the side surface of the guide rail 110.

The carrier 200 may further include two rollers (for example, two rollers 220A and two rollers 220B) being arranged so as to sandwich the rollers on the first straight line SL1 in the direction along the conveying path MR and coming in contact with the side surface of the guide rail 110 from the opposite side of the roller on the first straight line SL1. In this case, the indicator section 150 may be provided on the two rollers side. Furthermore, the side surfaces with which the two rollers come in contact in the curve-type guide unit 100A may be shifted to the outer circumferential side of the conveying path MR1 with respect to the side surface on which the indicator section 150 is provided. For example, as illustrated in FIG. 6, the indicator section 150 may be provided on the outer side surface 111a of the lower portion of the guide rail 110. In this case, the outer side surface 111b with which the rollers 220A and 220B come in contact is in a state of being shifted to the outer circumferential side of the conveying path MR1 with respect to the outer side surface 111a on which the indicator section 150 is provided.

(Branch Unit)

Returning to FIG. 1, the conveying system 1 may further include branch units 300A and 300B. The branch units 300A and 300B are interposed between one guide unit 100 (hereinafter referred to as a "first guide unit 100") and two guide units 100 (hereinafter, referred to as a "second guide unit 100" and a "third guide unit 100").

Hereinafter, the branch unit 300A will be described. Since the branch unit 300B has a mirror image symmetrical structure with the branch unit 300A, a description of the branch unit 300B will be omitted.

The branch unit 300A switches between a first state in which the first guide unit 100 is connected to the second guide unit 100 and a second state in which the first guide unit 100 is connected to the third guide unit 100.

Figure 14:
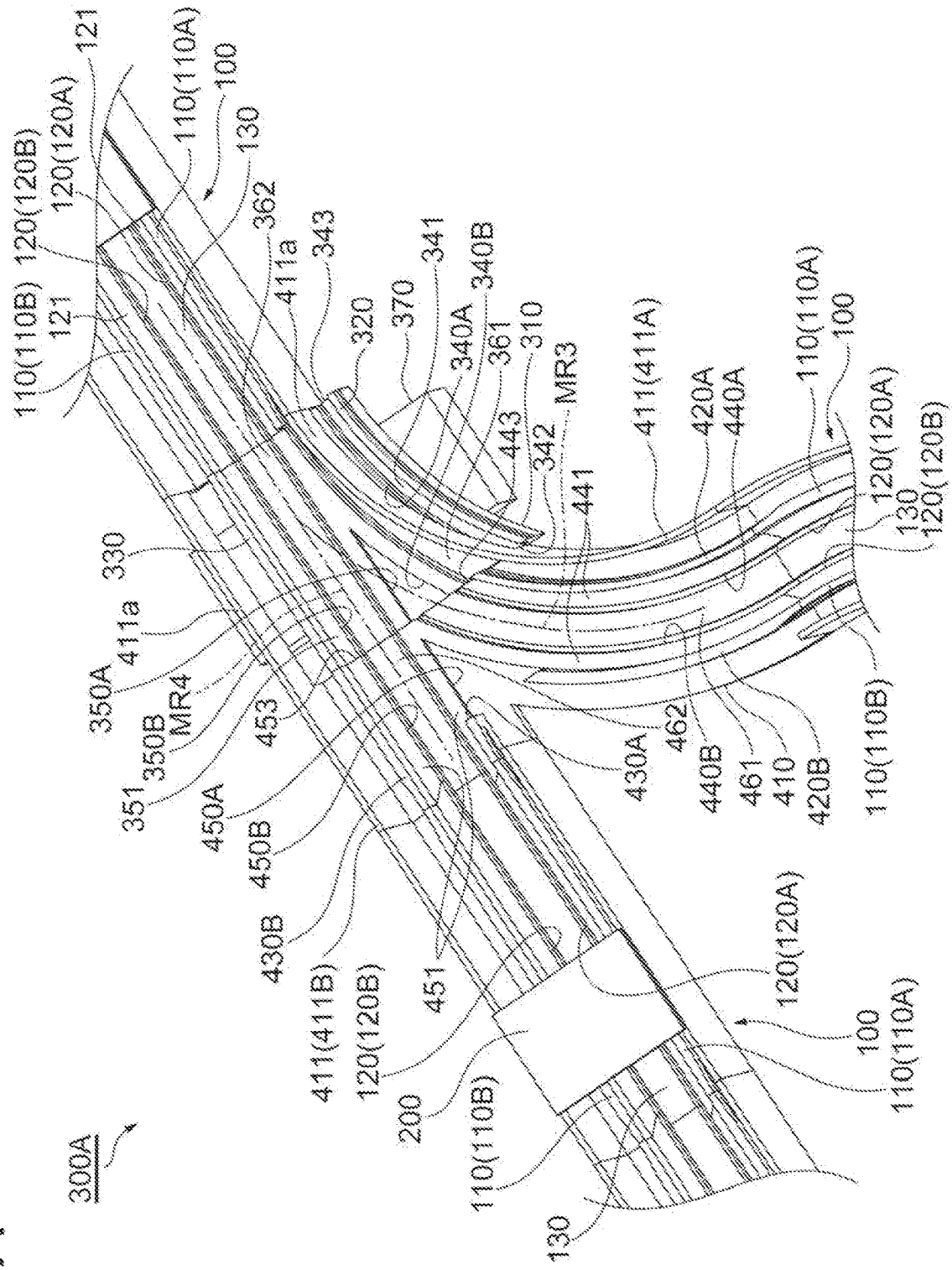
FIG. 14 is a perspective view of a branch unit.
Figure 15:
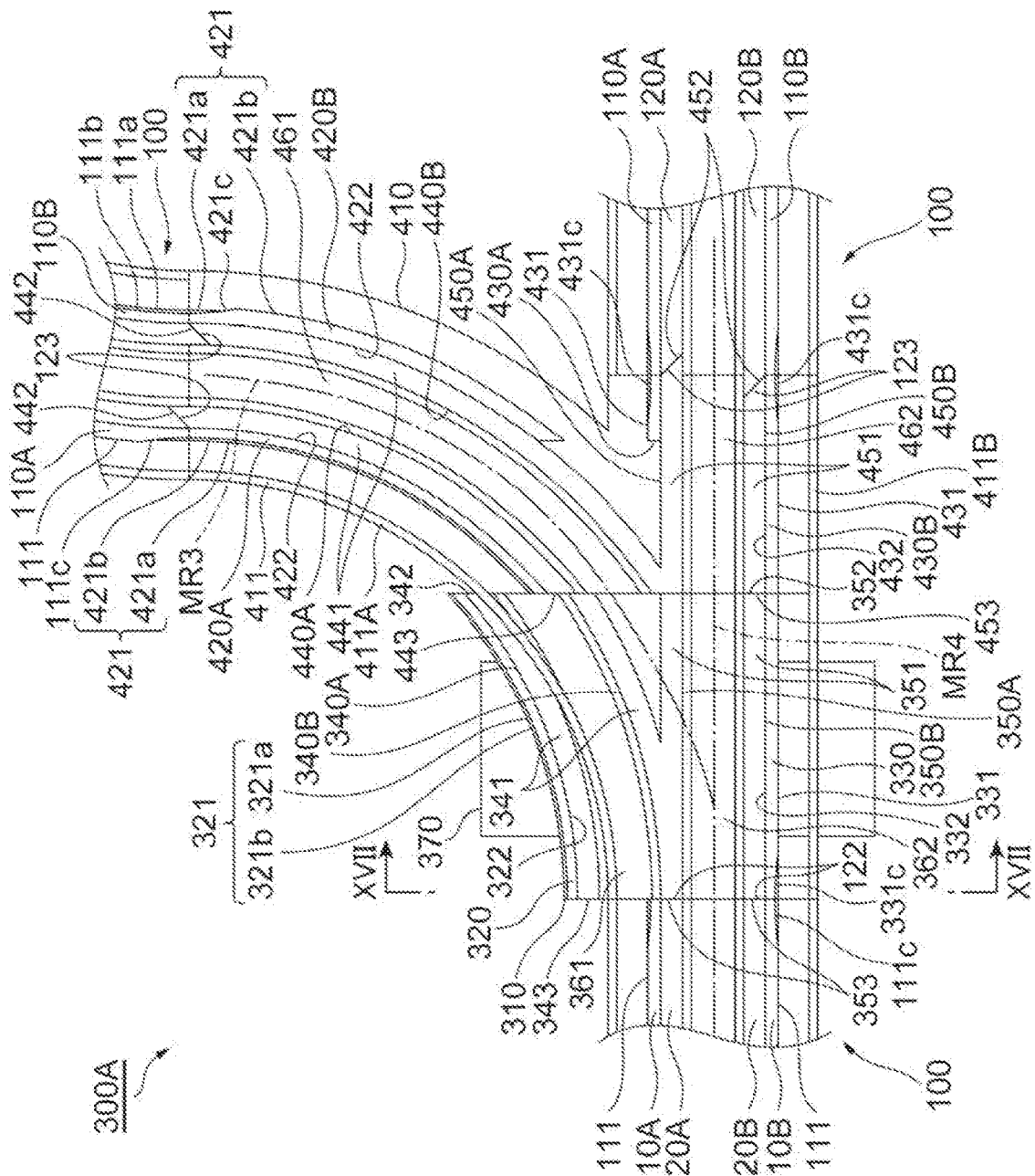
FIG. 15 is a plan view of the branch unit in a second state.
Figure 16:
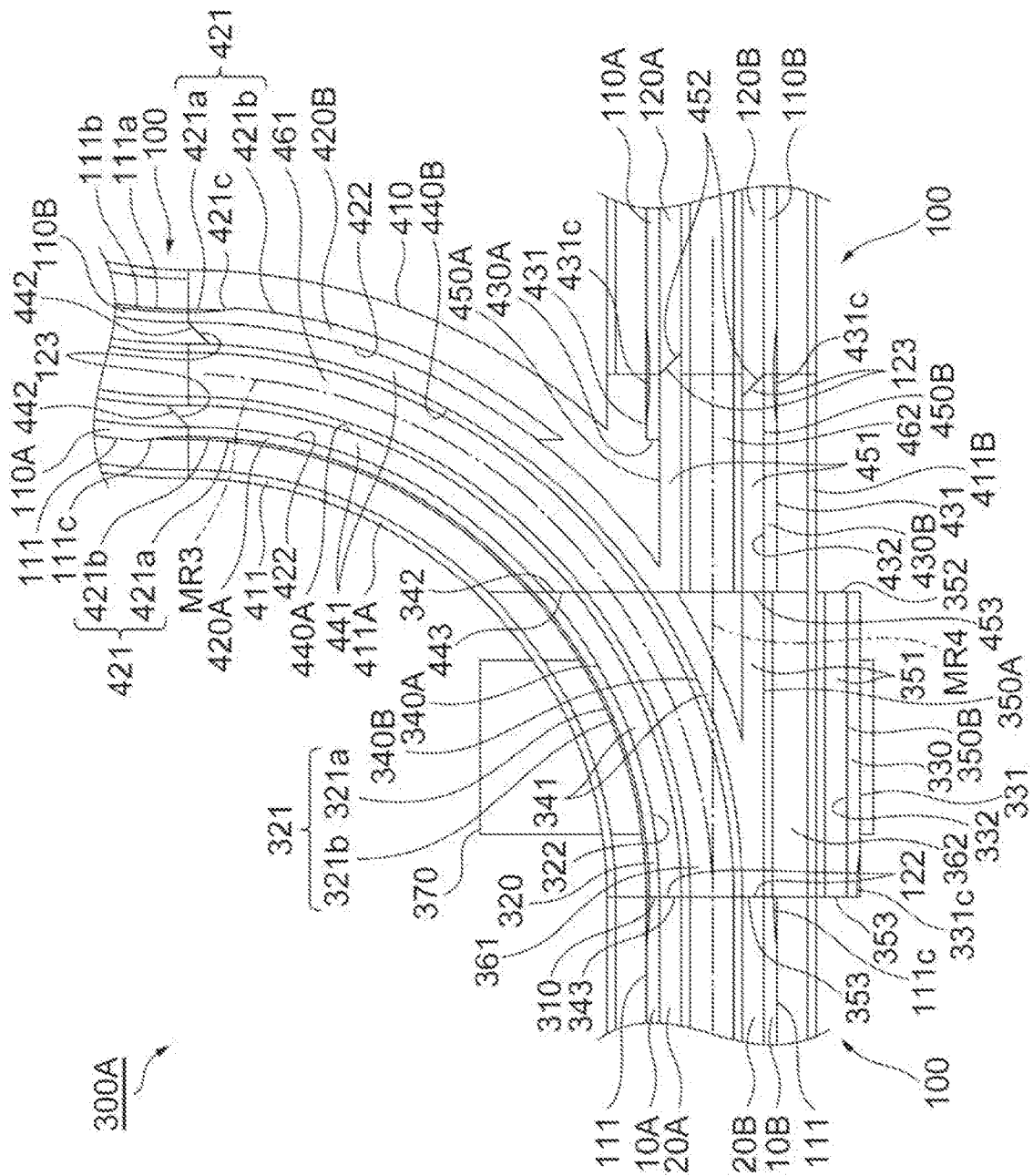
FIG. 16 is a plan view of the branch unit in a first state.

FIG. 14 is a perspective view illustrating the branch unit 300A in the second state. FIG. 15 is a plan view illustrating the branch unit 300A in the second state. FIG. 16 is a plan view illustrating the branch unit 300A in the first state. In FIG. 14, for convenience of explanation, the guide unit 100 connected to the lower side of the branch unit 300A will be referred to as the above-described second guide unit 100 and the guide unit 100 connected to the left side of the branch unit 300A will be referred to as the above-described third guide unit 100.

The branch unit 300A is configured so as to allow either one of the guide rail 110A and the guide rail 110B to have mutual connection, and not to allow the other to have mutual connection in any of the first state or the second state. For example, in the first state, the guide rail 110A of the first guide unit 100 and the guide rail 110A of the second guide unit 100 are mutually connected, while the guide rail 110B of the first guide unit 100 and the guide rail 110B of the second guide unit 100 are not mutually connected. In the second state, the guide rail 110B of the first guide unit 100 and the guide rail 110B of the third guide unit 100 are mutually connected, while the guide rail 110A of the first guide unit 100 and the guide rail 110A of the third guide unit 100 are not mutually connected.

The branch unit 300A constitutes a conveying path MR3 in the first state, and constitutes a conveying path MR4 in the second state. In the present embodiment, the conveying path MR4 is straight, and the conveying path MR3 is curved so as to branch from the conveying path MR4.

The branch unit 300A includes a movable platform 310, relay guide rails 320 and 330, relay support rails 340A, 340B, 350A, and 350B, relay stators 361 and 362, and a drive section 370.

The drive section 370 causes the movable platform 310 to slide in a direction intersecting the conveying paths MR3 and MR4. The direction intersecting the conveying paths MR3 and MR4 is a direction perpendicular to the conveying path MR4 in the horizontal plane, for example. In the first state, the drive section 370 causes the movable platform 310 to slide toward the second guide unit 100 side. In the second state, the drive section 370 causes the movable platform 310 to slide toward the third guide unit 100 side. The drive section 370 is an electric linear actuator, for example.

The relay guide rails 320 and 330 are fixed to the movable platform 310 by bolt fastening, for example. In the first state, the relay guide rail 320 is arranged so as to be interposed between the guide rail 110A of the first guide unit 100 and the guide rail 110A of the third guide unit 100. In the second state, the relay guide rail 330 is arranged so as to be interposed between the guide rail 110B of the first guide unit 100 and the guide rail 110B of the second guide unit 100.

For example, the relay guide rail 320 extends along the conveying path MR3 on the inner circumferential side of the curved conveying path MR3. The outer side surface 321b of the upper portion of the relay guide rail 320 is recessed on the outer circumferential side of the conveying path MR3, similarly to the above-described concave outer side surface 111b. The relay guide rail 330 extends along the conveying path MR4. On the first guide unit 100 side, a recessed portion 331c similar to the recessed portion 111c is provided at the end portion of the outer side surface 331 of the relay guide rail 330.

The relay support rails 340A, 340B, 350A and 350B are fixed to the movable platform 310 by bolt fastening, for example. The relay support rails 340A and 340B constitute a traveling surface 341 similarly to the support rails 120A and 120B. In the first state, the relay support rails 340A and 340B are arranged such that the traveling surface 341 is interposed between the traveling surface 121 of the first guide unit 100 and the traveling surface 121 of the second guide unit 100. The relay support rails 350A and 350B also constitute a traveling surface 351 similarly to the support rails 120A and 120B. In the second state, the relay support rails 350A and 350B are arranged such that the traveling surface 351 is interposed between the traveling surface 121 of the first guide unit 100 and the traveling surface 121 of the third guide unit 100.

For example, the relay support rails 340A, 340B, 350A, and 350B are arranged in order from the relay guide rail 320 side between the relay guide rails 320 and 330, the relay support rails 340A and 340B extend along the conveying path MR3, and the relay support rails 350A and 350B extend along the conveying path MR4.

The relay support rail 340B and the relay support rail 350A may be merged on the first guide unit 100 side. By merging the relay support rail 340B with the relay support rail 350A, it is possible to reduce the width of the movable platform 310 and the sliding distance of the movable platform 310, enabling downsizing of the branch unit 300A.

As described above, in the guide unit 100, in principle, both end surfaces 122 and 123 of the support rail 120 protrude or are recessed with respect to both end surfaces of the platform 101. In contrast, both end surfaces 342 and 343 of the relay support rails 340A and 340B are flush with both end surfaces of the movable platform 310 so as not to hinder sliding of the movable platform 310. Both end surfaces 352 and 353 of the relay support rails 350A and 350B are flush with both end surfaces of the movable platform 310. Accordingly, at the end portion of the first guide unit 100 on the branch unit 300A side, the end surface 122 of the support rail 120 is exceptionally flush with the end surface of the platform 101.

The relay stators 361 and 362 are fixed to the movable platform 310 by bolt fastening, for example. In the first state, the relay stator 361 is arranged so as to be interposed between the stator 130 of the first guide unit 100 and the stator 130 of the second guide unit 100. In the second state, the relay stator 362 is arranged so as to be interposed between the stator 130 of the first guide unit 100 and the stator 130 of the third guide unit 100.

For example, the relay stator 361 extends along the conveying path MR3 between the relay support rails 340A and 340B. The relay stator 362 extends along the conveying path MR4 between the relay support rails 350A and 350B.

The branch unit 300A may further include a fixed platform 410, a side wall 411, relay guide rails 420A, 420B, 430A, and 430B, relay support rails 440A, 440B, 450A, and 450B, relay stators 461 and 462, a plurality of conductive lines 470, and a plurality of conductive lines 480. The fixed platform 410 is interposed between the movable platform 310 and each of the second guide unit 100 and the third guide unit 100.

The relay guide rails 420A, 420B, 430A, and 430B are arranged in order from the second guide unit 100 side to the third guide unit 100 side, and are fixed to the fixed platform 410 by bolt fastening, for example. The relay guide rail 420A extends along the conveying path MR3 on the inner circumferential side of the conveying path MR3 and is continuous to the guide rail 110A of the third guide unit 100. The outer side surface 421b of the upper portion of the relay guide rail 420A is recessed on the outer circumferential side of the conveying path MR3, similarly to the above-described concave outer side surface 111b.

The relay guide rail 420B extends along the conveying path MR3 on the outer circumferential side of the conveying path MR3 and is continuous to the guide rail 110B of the second guide unit 100. The outer side surface 421b of the upper portion of the relay guide rail 420B bulges toward the outer circumferential side of the conveying path MR3, similarly to the above-described convex outer side surface 111b. The length of the relay guide rail 420B is set so as not to allow the carrier 200 traveling along the conveying path MR4 to interfere with the relay guide rail 420B.

The relay guide rail 430A extends along the conveying path MR4 and is continuous to the guide rail 110A of the third guide unit 100. On the third guide unit 100 side, a recessed portion 431c similar to the recessed portion 111c is provided at the end portion of the outer side surface 431 (side surface on the opposite side of the relay guide rail 430B) of the relay guide rail 430A. The length of the relay guide rail 430A is set so as not to allow the carrier 200 traveling along the conveying path MR3 to interfere with the relay guide rail 430A.

The relay guide rail 430B extends along the conveying path MR4 and is continuous to the guide rail 110B of the third guide unit 100. On the side of the third guide unit 100, the recessed portion 431c similar to the recessed portion 111c is provided at the end portion of the outer side surface 431 (side surface on the opposite side of the relay guide rail 430A) of the relay guide rail 430B.

The relay support rails 440A, 440B, 450A, and 450B are fixed to the fixed platform 410 by bolt fastening, for example. The relay support rails 440A and 440B are continuous to the support rails 120A and 120B of the second guide unit 100, respectively, and constitute a traveling surface 441 continuous to the traveling surface 121. The relay support rails 440A and 440B are arranged in order from the relay guide rail 420A side between the relay guide rails 420A and 420B and extend along the conveying path MR3, respectively.

The relay support rails 450A and 450B are continuous to the support rails 120A and 120B of the third guide unit 100, respectively, and constitute a traveling surface 441 continuous to the traveling surface 121. The relay support rails 450A and 450B are arranged in order from the relay guide rail 430A side between the relay guide rails 430A and 430B and extend along the conveying path MR4, respectively. A boundary portion between the movable platform 310 and the fixed platform 410 may be set at a position where the relay support rail 440B is merged with the relay support rail 450A. With this configuration, it is possible to further downsize the movable platform 310.

An end surface 442 of the relay support rail 440A on the second guide unit 100 side protrudes from the end surface of the fixed platform 410 so as to be fitted to the end surface 123 of the guide rail 110A of the second guide unit 100 and is inclined with respect to the conveying path MR3 in plan view. An end surface 442 of the relay support rail 440B on the second guide unit 100 side is recessed from the end surface of the fixed platform 410 so as to be fitted to the end surface 123 of the guide rail 110B of the second guide unit 100 and is inclined with respect to the conveying path MR3 in plan view.

An end surface 452 of the relay support rail 450A on the third guide unit 100 side protrudes from the end surface of the fixed platform 410 so as to be fitted to the end surface 123 of the guide rail 110A of the third guide unit 100 and is inclined with respect to the conveying path MR4 in plan view. An end surface 452 of the relay support rail 450B on the third guide unit 100 side is recessed from the end surface of the fixed platform 410 so as to be fitted to the end surface 123 of the guide rail 110B of the third guide unit 100 and is inclined with respect to the conveying path MR3 in plan view.

The end surfaces 443 of the relay support rails 440A and 440B on the movable platform 310 side and the end surface 453 of the relay support rails 450A and 450B on the movable platform 310 side are flush with the end surface of the fixed platform 410 so as not to hinder sliding of the movable platform 310.

The relay stators 461 and 462 are fixed to the fixed platform 410 by bolt fastening, for example. The relay stator 461 is continuous to the stator 130 of the second guide unit 100. The relay stator 462 is continuous to the stator 130 of the third guide unit 100. The relay stator 461 extends along the conveying path MR3 between the relay support rails 440A and 440B. The relay stator 462 is arranged along the conveying path MR4 between the relay support rails 450A and 450B.

In this manner, in a case where the fixed platform 410 is provided, the relay guide rail 320 of the movable platform 310 is arranged in the first state so as to be interposed between the guide rail 110A of the first guide unit 100 and the relay guide rail 420A. In the second state, the relay guide rail 330 is arranged so as to be interposed between the guide rail 110B of the first guide unit 100 and the relay guide rail 430B.

In the first state, the relay support rails 340A and 340B of the movable platform 310 are arranged such that the traveling surface 341 is interposed between the traveling surface 121 of the first guide unit 100 and the traveling surface 441. In the second state, the relay support rails 350A and 350B of the movable platform 310 are arranged such that the traveling surface 351 is interposed between the traveling surface 121 of the first guide unit 100 and the traveling surface 451.

In the first state, the relay stator 361 of the movable platform 310 is arranged so as to be interposed between the stator 130 of the guide unit 100 and the relay stator 461. In the second state, the relay stator 362 of the movable platform 310 is arranged so as to be interposed between the stator 130 of the guide unit 100 and the relay stator 462.

According to the configuration exemplified above, the branch unit 300A functions as a means for mutually connecting solely one guide rails among the guide rails 110A and the guide rails 110B, in any of the first state in which the first guide unit 100 is connected to the second guide unit 100 and the second state in which the first guide unit 100 is connected to the third guide unit 100.

The branch unit 300A may further include two side walls 411. The two side walls 411 are arranged further outside the relay guide rails 420A and 430B, and are fixed to the fixed platform 410 by bolt fastening, for example. Hereinafter, one of the two side walls 411 (for example, side wall 411 on the second guide unit 100 side) will be defined as a side wall 411A, and the other will be defined as a side wall 411B to distinguish between them. The side wall 411A extends along the conveying path MR3 and is continuous to the side wall 102A of the second guide unit 100. The side wall 411B extends along the conveying path MR4 and is continuous to the side wall 102B of the third guide unit 100.

The side walls 411A and 411B include extending portions 411a extending from the end surface of the fixed platform 410 to the first guide unit 100 side. The extending portion 411a of the side wall 411A extends along the conveying path MR3 and is continuous to the side wall 102A of the first guide unit 100 via the movable platform 310. The extending portion 411a of the side wall 411B extends along the conveying path MR4 and is continuous to the side wall 102B of the first guide unit 100 via the movable platform 310. Note that the lower sides of the extending portions 411a are notched so as not to hinder sliding of the movable platform 310.

Figure 17:
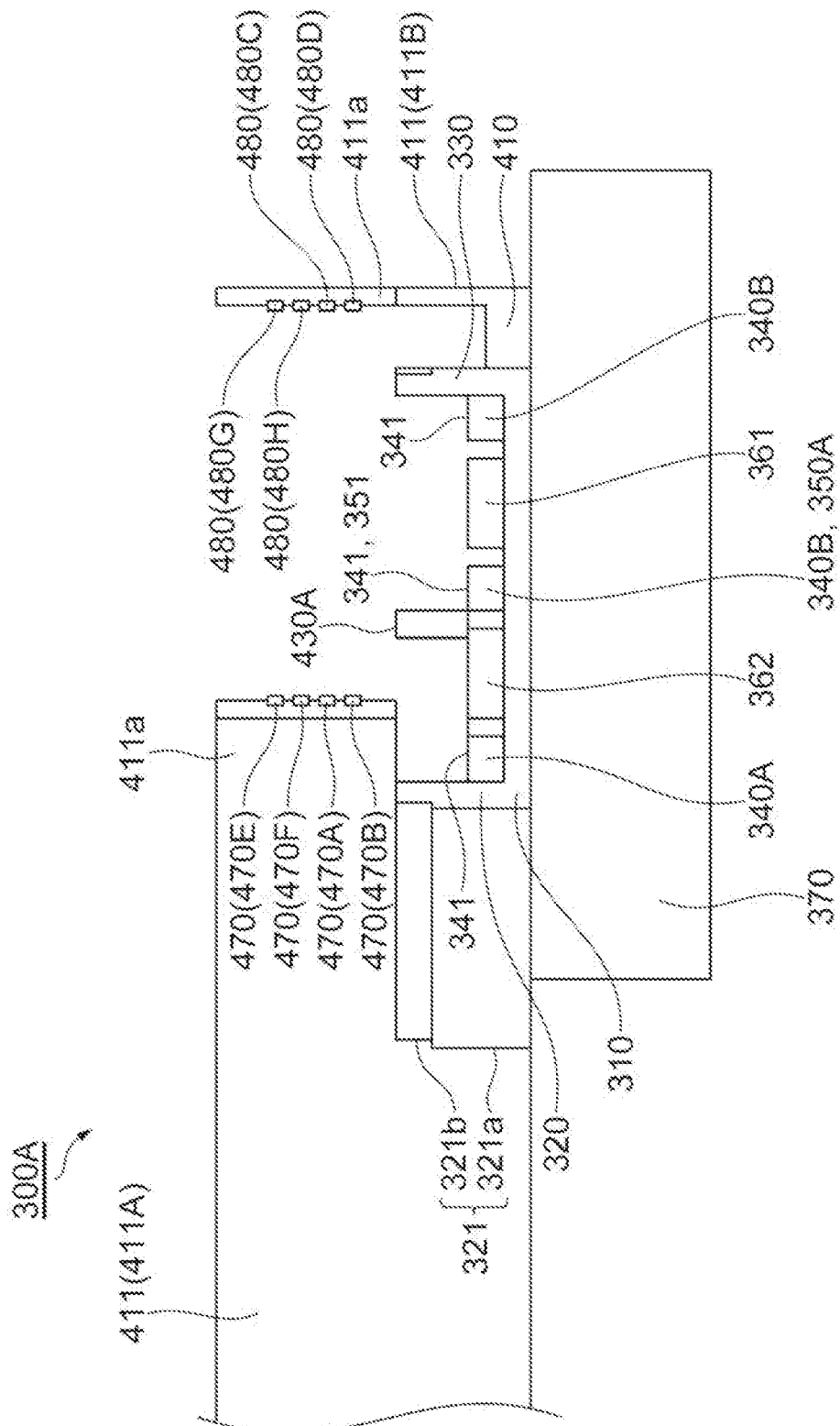
FIG. 17 is a cross-sectional view taken along line XVII-XVII in FIG. 15.

As illustrated in FIG. 17, the plurality of conductive lines 470 and the plurality of conductive lines 480 are arranged on the inner side surface of the side wall 411 (side surfaces facing each other between the side walls 411). The plurality of conductive lines 470 includes two power supply lines 470A and 470B and two communication lines 470E and 470F. The plurality of conductive lines 480 includes two power supply lines 480C and 480D and two communication lines 480G and 480H. In FIG. 17, the power supply lines 470A and 470B and the communication lines 470E and 470F are arranged on the inner side surface (side surface on the side wall 411B side) of the side wall 411A. The power supply lines 480C and 480D and the communication lines 480G and 480H are arranged on the inner side surface (side surface on the side wall 411A side) of the side wall 411B. The power supply lines 470A and 470B and the communication lines 470E and 470F are respectively interposed between the power supply lines 140A and 140B and the communication lines 140E and 140F of the first guide unit 100 (refer to FIG. 2), and the power supply lines 140A and 140B and the communication lines 140E and 140F of the second guide unit 100. The power supply lines 480C and 480D and the communication lines 480G and 480H are respectively interposed between the power supply lines 140C and 140D and the communication lines 140G and 140H of the first guide unit 100 (refer to FIG. 2), and the power supply lines 140C and 140D and the communication lines 140G and 140H of the third guide unit 100.

In a case where the branch unit 300A is in the first state and the carrier 200 travels through the branch unit 300A, the power supply brushes 250A and 250B and the communication brushes 250E and 250F of the carrier 200 (refer to FIG. 2) respectively come in contact with the power supply lines 470A and 470B and the communication line 470E and 470F. The power supply brushes 250C and 250D and the communication brushes 250G and 250H of the carrier 200 do not come in contact with the power supply line and the communication line. In contrast, in a case where the branch unit 300A is in the second state and the carrier 200 travels on the branch unit 300A, the power supply brushes 250C and 250D and the communication brushes 250G and 250H of the carrier 200 respectively come in contact with the power supply lines 480C and 480D and the communication lines 480G and 480H. The power supply brushes 250A and 250B and the communication brushes 250E and 250F of the carrier 200 do not come in contact with the power supply line and the communication line.

That is, during the travel of the carrier 200 through the branch unit 300A, the brushes 250 on solely one of the side wall 411A side and the wall 411B side comes in contact with the conductive lines 470 and 480, and the brush 250 on the other side does not come in contact with the conductive lines 470 and 480. In contrast, as exemplified in FIG. 2, since the carrier 200 includes a pair of power supply lines and communication lines on both sides of the carrier 200, it is possible to continue power supply and information communication even while the carrier 200 is traveling through the branch unit 300A.

As illustrated in FIG. 11, in the configuration in which the carrier 200 includes solely the pair of power supply brushes 250A and 250B, the power supply to the carrier 200 is interrupted while the carrier 200 is traveling through the branch unit 300A. Even in such a case, it is possible to continue conveyance in a case where the carrier 200 can pass through the branch unit 300A by coasting. It is allowable to store power in the driver circuit 260 and to supplement the power to the power in the branch unit 300A. As illustrated in FIGS. 12 and 13, in the configuration in which the carrier 200 includes solely the pair of communication brushes 250E and 250F, the information communication with the carrier 200 is interrupted while the carrier 200 is traveling through the branch unit 300A. In this case, it is allowable to supplement information during passage through the branch unit 300A by performing information communication before and after passing through the branch unit 300A.

While the material constituting the branch unit 300A is not particularly limited, a relatively lightweight metal material such as an aluminum based alloy can be an exemplary constituent material of each of the members.

The configuration of the branch unit 300A is not limited to those exemplified above. As one example, the branch unit 500 illustrated in FIG. 18 includes a relay stator 363 instead of the relay stators 361 and 362. The relay stator 363 is connected to the stator 130 of the first guide unit 100 on the first guide unit 100 side. On the second and third guide units 100 sides, the relay stator 363 branches into a branch portion 364 along the conveying path MR3 and a branch portion 365 along the conveying path MR4. The branch portion 364 is connected to the relay stator 461, while the branch portion 365 is connected to the relay stator 462. The relay stator 363 is integrated with the relay stator 461 and the relay stator 462, and is not fixed to the movable platform 310.

The branch unit 500 has solely the relay support rails 340A and 350B out of the above-described relay support rails 340A, 340B, 350A, and 350B. The relay support rail 340A is integrated with the relay support rail 440A and is not fixed to the movable platform 310. The relay support rail 350A is integrated with the relay support rail 450A and is not fixed to the movable platform 310. In any of the first state and the second state, the relay support rails 340A and 440A are interposed between the guide rail 110A of the first guide unit 100 and the guide rail 110A of the second guide unit 100. The relay support rails 350B and 450B are interposed between the guide rail 110B of the first guide unit 100 and the guide rail 110B of the third guide unit 100.

The end surface 343 of the relay support rail 340A on the first guide unit 100 side is recessed from the end surface of the movable platform 310 so as to be fitted to the end surface 122 of the guide rail 110A of the guide unit 100 and is inclined with respect to the conveying path MR3 in plan view. The end surface 353 of the relay support rail 350B on the first guide unit 100 side protrudes from the end surface of the movable platform 310 so as to be fitted to the end surface 122 of the guide rail 110B of the guide unit 100 and is inclined with respect to the conveying path MR3 in plan view. Correspondingly, the end surface 122 of the first guide unit 100 connected to the branch unit 500 need not be flush with the end surface of the platform 101, and may be configured similarly to the other guide units 100.

In the branch unit 500, even when the movable platform 310 slides, the relay stator 363 and the relay support rails 340A and 350B do not slide, and solely the relay guide rails 320 and 330 slide. Therefore, in a case where the carrier 200 passes through the branch unit 500 in the first state, the wheel 210 of the carrier 200 crosses the branch portion 365. In the second state, in a case where the carrier 200 passes through the branch unit 500, the wheels 210 of the carrier 200 cross the branch portion 364. Therefore, the height of the upper surface of the relay stator 363 is set so as not to interfere with the wheel 210 of the traveling carrier 200. Specifically, the height of the upper surface of the relay stator 363 is set to be the height of the traveling surface 341 or less.

Figure 18:
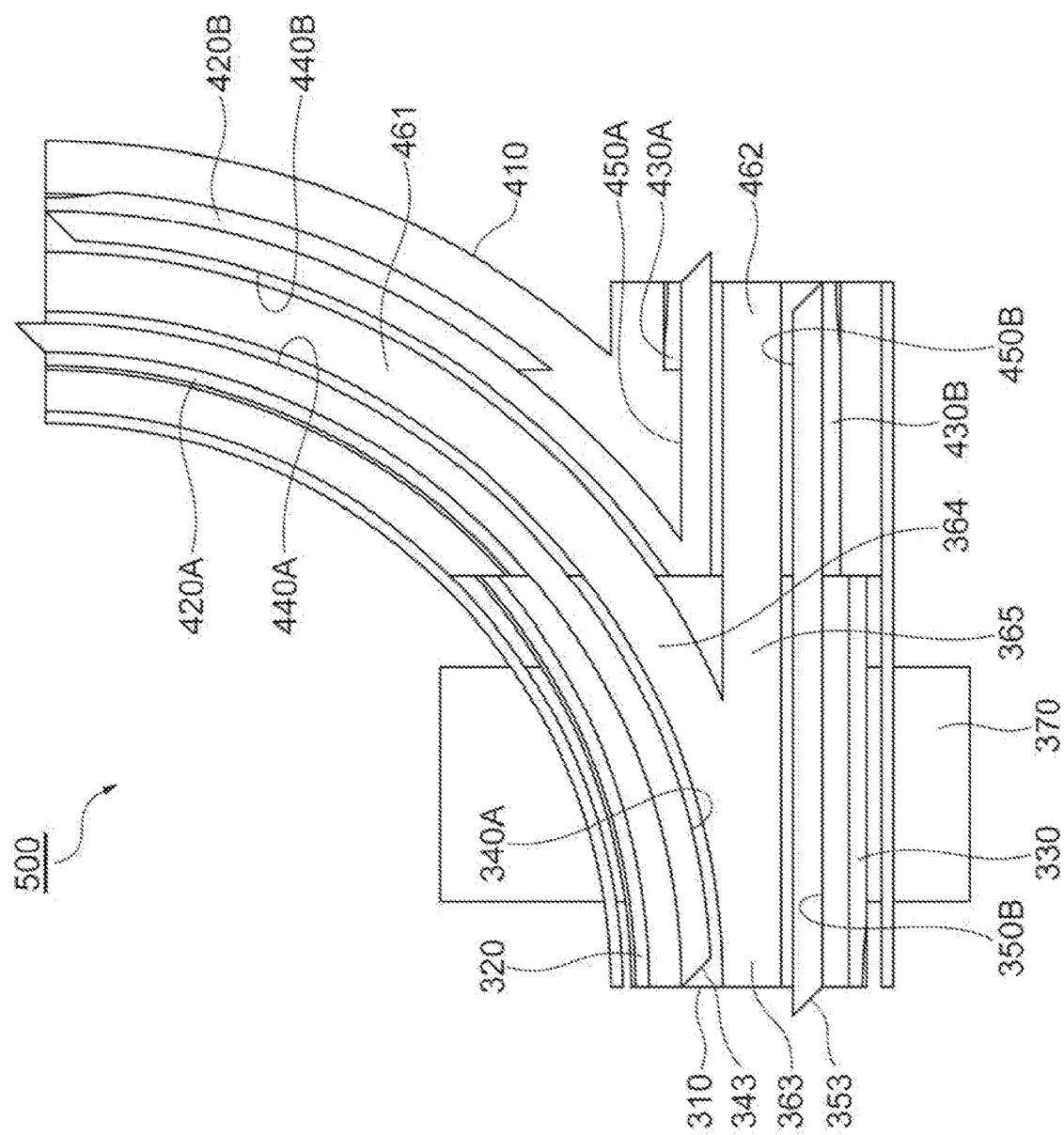
FIG. 18 is a plan view illustrating a modification of the branch unit.

According to the configuration exemplified in FIG. 18, there is no need to slide the relay stator 363, making it possible to reduce the branch unit 500 in size and weight.

Instead of sliding the relay guide rails 320 and 330, they may be caused to appear/disappear onto/from the fixed platform 410. For example, in the configuration illustrated in FIG. 18, it is possible to switch between the first state and the second state by integrating the movable platform 310 with the fixed platform 410 and allowing the relay guide rails 320 and 330 to appear/disappear onto/from the fixed platform 410. "Appear/disappear" means to switch between a state protruding relative to a reference surface (for example, traveling surface 341) on the fixed platform 410 and a state not protruding relative to the reference surface.

With such a configuration, there is no need to slide the branch unit 500 in the horizontal plane, making it possible to reduce the area occupied by the branch unit 500.

2. Second Embodiment

Figure 19:
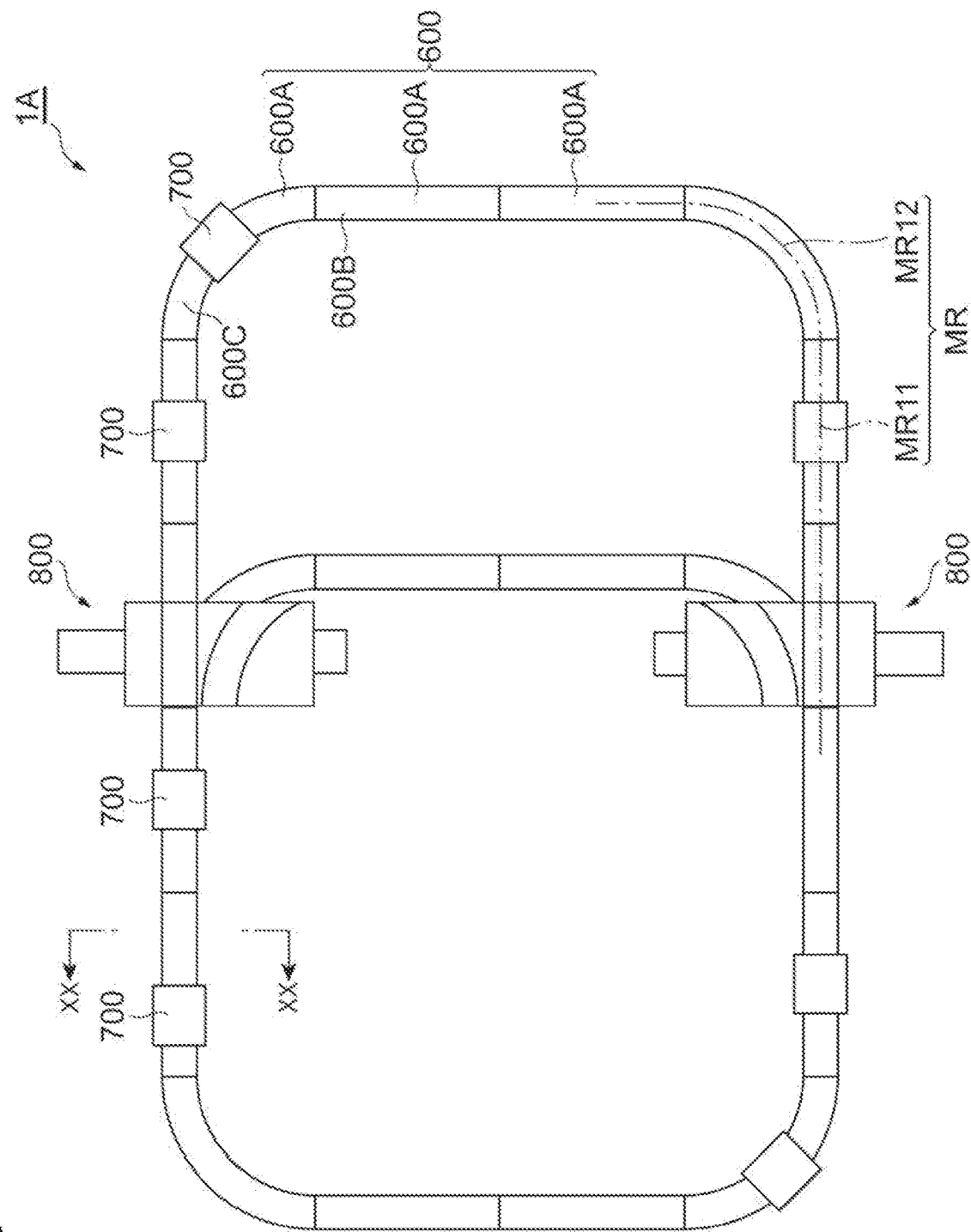
FIG. 19 is a plan view illustrating a schematic configuration of a conveying system.

[Conveying system] As illustrated in FIG. 19, a conveying system 1A according to a second embodiment includes a guide 600 and at least one carrier 700. A conveying system 1A exemplified in FIG. 19 includes a plurality of carriers 700. The guide 600 constitutes a conveying path (movement path) MR. The conveying path MR may include a straight conveying path MR11 and a curved conveying path MR12. The carrier 700 supports an object to be conveyed such as a component and an assembly, and moves along the conveying path MR.

(1) Guide

Figure 20:
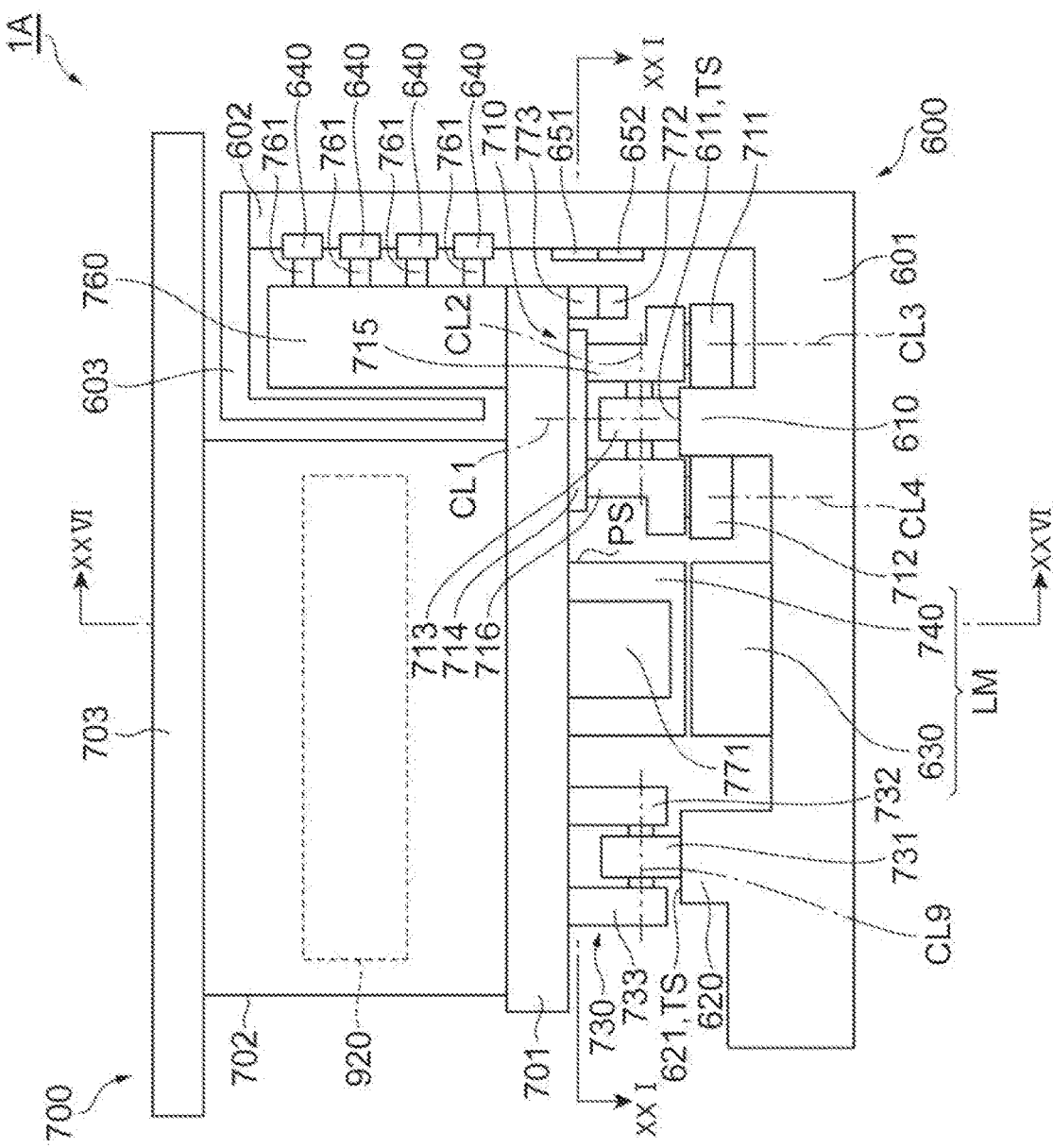
FIG. 20 is a cross-sectional view taken along line XX-XX in FIG. 19.
Figure 21:
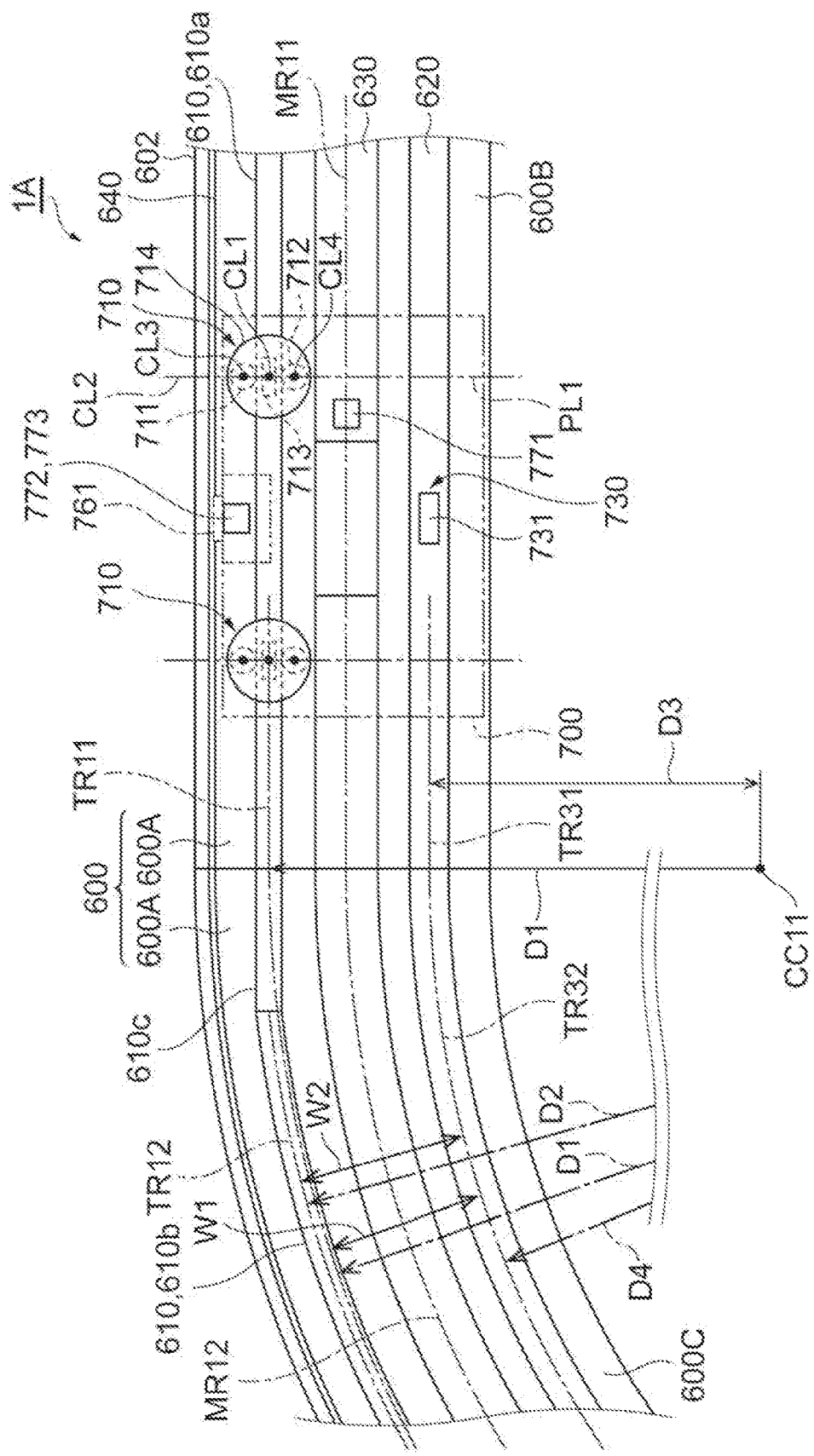
FIG. 21 is a cross-sectional view taken along line XXI-XXI in FIG. 20.

As illustrated in FIGS. 20 and 21, the guide 600 includes a guide rail 610 provided along the conveying path MR. Hereinafter, a specific configuration example of the guide 600 will be described.

The guide 600 includes a platform 601, a guide rail 610, and a support rail 620. The platform 601 extends along the conveying path MR and has its width in a direction orthogonal to the conveying path MR.

The guide rail 610 and the support rail 620 are aligned in a width direction of the platform 601 and are raised from the platform 601 on individual lines along the conveying path MR. The guide rail 610 and the support rail 620 may be integrally formed with the platform 601 or may be formed as a separate member from the platform 601 and may be fixed to the platform 601 by bolt fastening, for example. An upper surface 611 of the guide rail 610 and an upper surface 621 of the support rail 620 are used as a traveling surface TS of the wheel.

While the constituent materials of the platform 601, the guide rail 610, and the support rail 620 are not particularly limited, a relatively lightweight metal material such as an aluminum based alloy can be an exemplary material.

The guide 600 may further include a stator 630. The stator 630 extends along the conveying path MR between the guide rail 610 and the support rail 620 and is fixed to the platform 601 by bolt fastening, for example.

(2) Carrier

As illustrated in FIGS. 20 and 21, the carrier 700 includes two casters 710 (first casters) and a caster 730. The two casters 710 are arranged along the conveying path MR, each being configured to move along the guide rails 610.

The caster 730 is positioned between the two casters 710 in the direction along the conveying path MR and is separated from the caster 710 in a direction orthogonal to the conveying path MR.

Hereinafter, a specific configuration example of the carrier 700 will be described. "Up and down (or upper and lower)" in the description of the specific configuration example represents upper and lower directions in a case where the carrier 700 is installed so as to be movable in the horizontal direction.

The carrier 700 includes a chassis 701, and the two casters 710 and the caster 730 are provided at a lower portion of the chassis 701.

The caster 710 includes two guide rollers 711 and 712 (rollers), a wheel 713 (first wheel), and a base 714 (first base). The two guide rollers 711 and 712 sandwich the guide rail 610. For example, the guide rollers 711 and 712 sandwich the guide rail 610 in the width direction of the platform 601. In other words, the guide rollers 711 and 712 come in contact with the guide rails 610 from the opposite sides in the width direction of the platform 601. Here, "coming in contact" is not intended to mean strict constant contact and is not intended to exclude temporary release within a range not substantially impairing guidance or support functions. The wheel 713 comes in contact with the upper surface 611 (traveling surface TS) of the guide rail 610 and rolls in accordance with the movement of the carrier 700. The base 714 holds the wheel 713 and the two guide rollers 711 and 712 and is turnable so as to change the orientation of the wheel 713.

More specifically, the base 714 is attached to a lower portion of the chassis 701 so as to be turnable about a vertical turning center (center axis) CL1. The base 714 includes two downwardly protruding bearing columns 715 and 716. The wheel 713 is arranged between the bearing columns 715 and 716 and is supported by the bearing columns 715 and 716 so as to be rotatable around a horizontal rotation center (center axis) CL2 passing through the bearing columns 715 and 716. The guide roller 711 is attached to an end portion of the bearing column 715 so as to be rotatable around a vertical rotation center CL3. The guide roller 712 is attached to an end portion of the bearing column 716 so as to be rotatable around a vertical rotation center CL4.

The rotation center CL2 of the wheel 713, the rotation center CL3 of the guide roller 711, and the rotation center CL4 of the guide roller 712 may be positioned within a same plane PL1. For example, the rotation center CL2 may intersect with both the rotation center CL3 and the rotation center CL4. Furthermore, the turning center CL1 of the base 714 may also be positioned within the same plane PL1. For example, the rotation center CL2 may intersect with all of the turning center CL1, the rotation center CL3, and the rotation center CL4. In this case, the turning center CL1 may pass through a position bisecting a portion between the rotation centers CL3 and CL4.

Figure 22:
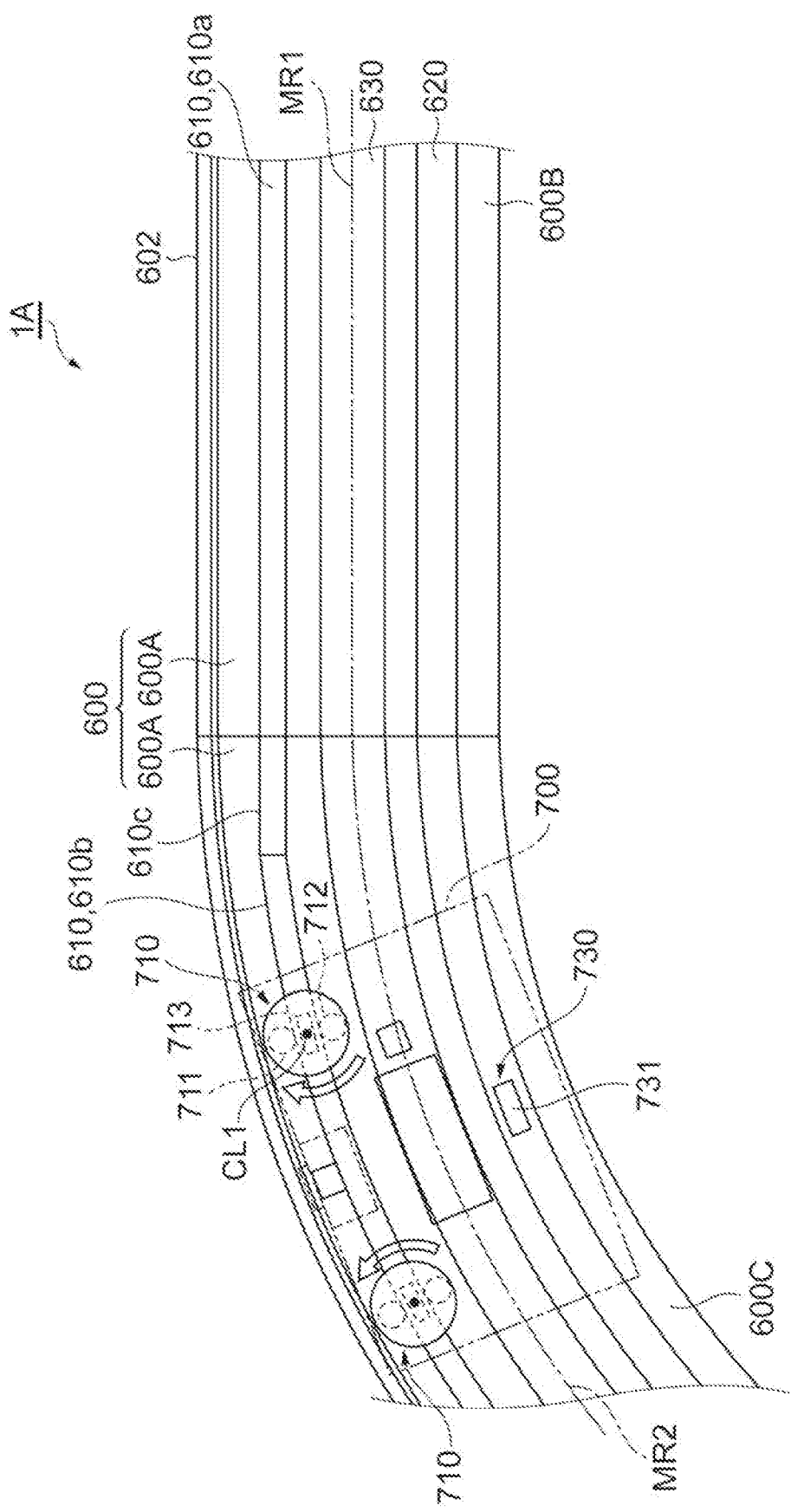
FIG. 22 is a view illustrating a state in which a carrier in FIG. 21 has moved onto a curved conveying path.

The guide rollers 711 and 712 sandwich the guide rail 610, whereby the base 714 turns in accordance with an extending direction of the guide rail 610 (refer to FIGS. 21 and 22). With this configuration, the orientation of the wheel 713 (direction in which the wheel 713 advances by rolling) is adjusted in the extending direction of the guide rail 610. In this manner, the base 714 functions as a means for integrally holding the wheel 713 and the two guide rollers 711 and 712 and enabling the orientation of the wheel 713 to change.

The casters 710 need not include other guide rollers having different rotation centers with respect to the two guide rollers 711 and 712.

The caster 730 includes a wheel 731 (third wheel). The wheel 731 comes in contact with the upper surface 621 (traveling surface TS) of the support rail 620 and rolls in accordance with the movement of the carrier 700.

More specifically, the caster 730 includes two bearing columns 732 and 733 protruding downward from a lower surface of the chassis 701. The wheel 731 is arranged between the bearing columns 732 and 733 and is supported by the bearing columns 732 and 733 so as to be rotatable around a horizontal rotation center CL9 passing through the bearing columns 732 and 733. The bearing columns 732 and 733 are aligned in a direction intersecting the conveying path MR, and the rotation center CL9 intersects the conveying path MR. As one example, the rotation center CL9 passes through a position bisecting a portion between the turning centers CL1 of each of the two base 714 and is orthogonal to the conveying path MR. With this configuration, the orientation of the wheel 731 (direction of advance by rolling movement) is arranged along the conveying path MR in both of a linear-type guide unit 600B and a curve-type guide unit 600C.

While the constituent materials of the chassis 701 and the casters 710 and 730 are not particularly limited, a relatively lightweight metal material such as an aluminum based alloy can be an exemplary material. The constituent material of the casters 710 and 730 may be selected such that the surface hardness of the wheels 713 and 731 is higher than the surface hardness of the guide rollers 711 and 712. For example, the wheels 713 and 731 may be formed of a metal material and the guide rollers 711 and 712 may be formed of a resin material.

While the aluminum based alloy is exemplified as the material constituting the guide rail 610 and the support rail 620 that support the wheels 713 and 731, it is allowable to form the guide rail 610 and the support rail 620 with a material having higher hardness than the wheels 713 and 731. For example, in a case where the wheels 713 and 731 are formed of aluminum based alloy, the guide rail 610 and the support rail 620 may be formed of steel, stainless steel, or the like.

By forming the guide rail 610 and the support rail 620 with a material with high hardness, it is possible to suppress wear of the guide rail 610 and the support rail 620. This can reduce the replacement frequency of the guide 600 as compared with the replacement frequency of the carrier 700. By reducing the replacement frequency of the guide 600 that cannot be easily replaced as compared with the carrier 700, it is possible to enhance maintainability of the conveying equipment.

The carrier 700 may further include a mover 740. The mover 740 generates thrust along the conveying path MR in cooperation with the stator 630. As an example, the mover 740 is arranged between the casters 710 and 730, and is fixed to a lower portion of the chassis 701 by bolt fastening, or the like. The mover 740 faces the stator 630 from above in a state where the wheel 713 comes in contact with the upper surface 611 of the guide rail 610 and the wheel 731 comes in contact with the upper surface 621 of the support rail 620.

The carrier 700 may further include a housing 702 provided on the upper portion of the chassis 701 and a tray 703 provided on the housing 702. The housing 702 houses a carrier controller 920, or the like, to be described below. The tray 703 supports an object to be conveyed.

(3) Details of Guide Rail and Supporting Rail

As described above, the conveying path MR may include the straight conveying path MR11 and the curved conveying path MR12. Corresponding to this, the guide rail 610 may include a straight portion 610a along the straight conveying path MR11 and a curved portion 610b along the curved conveying path MR12. The width of the straight portion 610a and the width of the curved portion 610b may be equal to each other. Hereinafter, arrangement of the guide rail 610 will be described on the basis of the above.

The straight portion 610a may be provided at a position of a first distance D1 from the curvature center CC11 of the curved portion 610b, and the curved portion 610b may be provided more toward the outer circumferential side of the conveying path MR12 relative to the position of the first distance D1, from the curvature center CC11.

Note that the distance to the guide rail 610 (straight portion 610a or the curved portion 610b) represents a distance to the center of the guide rail 610. The "outer circumferential side" of the conveying path MR12 represents the opposite side of the curvature center CC11, and the "inner circumferential side" of the conveying path MR12 represents the curvature center CC11 side.

The distance (hereinafter referred to as a "second distance D2") from the curvature center CC11 to the curved portion 610b may be set so as to allow the track TR31 of the caster 730 (wheel 731) in the straight conveying path MR11 to be smoothly connected to the track TR32 of the caster 730 (the wheel 731) in the curved conveying path MR12.

Note that connecting the tracks TR31 and TR32 smoothly means that the track TR31 is arranged along a tangent line of the track TR32 at a connecting portion of the tracks TR31 and TR32. In other words, the curved portion 610b may be arranged so as not to cause a deviation between the track TR31 in the straight conveying path MR11 and the track TR32 in the curved conveying path MR12. Having no deviation between the tracks TR31 and TR32 means that the distance from the curvature center CC11 to the track TR31 (hereinafter referred to as a "third distance D3") matches the distance from the curvature center CC11 to the track TR32 (hereinafter referred to as a "fourth distance D4"). The distance to the tracks TR31 and TR32 means the distance to the center of each of the tracks TR31 and TR32.

As illustrated in FIG. 21, in a case where the curved portion 610b is positioned on more outer circumferential side of the curved conveying path MR12 than the track TR31, the first distance D1 and the second distance D2 are calculated by the following expressions.

First distance $D1$ = third distance $D3$ + first track interval $W1$

Second distance $D2$ = fourth distance $D4$ + second track interval $W2$

First track interval W1: interval between the track TR11 of the caster 710 in the straight conveying path MR11 and the track TR31 of the caster 730 in the straight conveying path MR11 (interval between the center of the track TR11 and the center of the track TR31).

Second track interval W2: interval between the track TR12 of the caster 710 in the curved conveying path MR12 and the track TR32 of the caster 730 in the curved conveying path MR12 (interval between the center of the track TR12 and the center of the track TR32).

In contrast, in a case where the curved portion 610b is positioned on more inner circumferential side of the curved conveying path MR12 than the track TR31, the first distance D1 and the second distance D2 are calculated by the following expressions.

First distance $D1$ = third distance $D3$ − first track interval $W1$

Second distance $D2$ = fourth distance $D4$ − second track interval $W2$

The first track interval W1 and the second track interval W2 can be geometrically derived in accordance with the arrangement of the wheels 713 and 731. In the curved conveying path MR12, in a case where the curved portion 610b is positioned on more outer circumferential side than the track TR32 of the caster 730, the second track interval W2 is greater than the first track interval W1. In the curved conveying path MR12, in a case where the curved portion 610b is positioned on more inner circumferential side than the track TR32 of the caster 730, the second track interval W2 is smaller than the first track interval W1.

In this manner, the guide rail 610 may include a means for reducing the deviation between the track TR31 of the wheel 731 in the straight conveying path MR11 and the track TR32 of the wheel 731 in the curved conveying path MR12.

The guide 600 may be configured to be dividable into a plurality of guide units 600A continuous along the conveying path MR. In this case, each of the plurality of guide units 600A includes the platform 601, the guide rail 610, the support rail 620, and the stator 630. Coupling the guide units 600A to each other allows the guide rails 610 to be continuous with each other, the support rails 620 to be continuous to each other, and the stators 630 to be continuous to each other along the conveying path MR.

Note that "continuous" means to be aligned along a same line, including a case where they are aligned at intervals. This also applies to the following description.

The conveying system 1A may include at least one guide unit 600A and at least one carrier 700. According to this conveying system 1A, it is possible to construct conveying equipment including a desired conveying path MR by a combination of arbitrary guide units 600A (for example, a combination of a plurality of the linear-type guide units 600B and a plurality of the guide units 600A).

The plurality of guide units 600A may include the linear-type guide unit 600B constituting the straight conveying path MR11 and the curve-type guide unit 600C constituting the curved conveying path MR12. In this case, the guide rail 610 of the linear-type guide unit 600B includes the straight portion 610a. The guide rail 610 of the curve-type guide unit 600C includes the curved portion 610b.

The guide rail 610 of the curve-type guide unit 600C may further include a transition portion 610c interposed between the curved portion 610b and the guide rail 610 (straight portion 610a) of the linear-type guide unit 600B. The curvature of the transition portion 610c is smaller than the curvature of the curved portion 610b. In other words, the curvature radius of the transition portion 610c is greater than the curvature radius of the curved portion 610b. The transition portion 610c may be straight along the guide rail 610 of the linear-type guide unit 600B. The width of the transition portion 610c may be equal to the width of the straight portion 610a and the width of the curved portion 610b.

Figure 23:
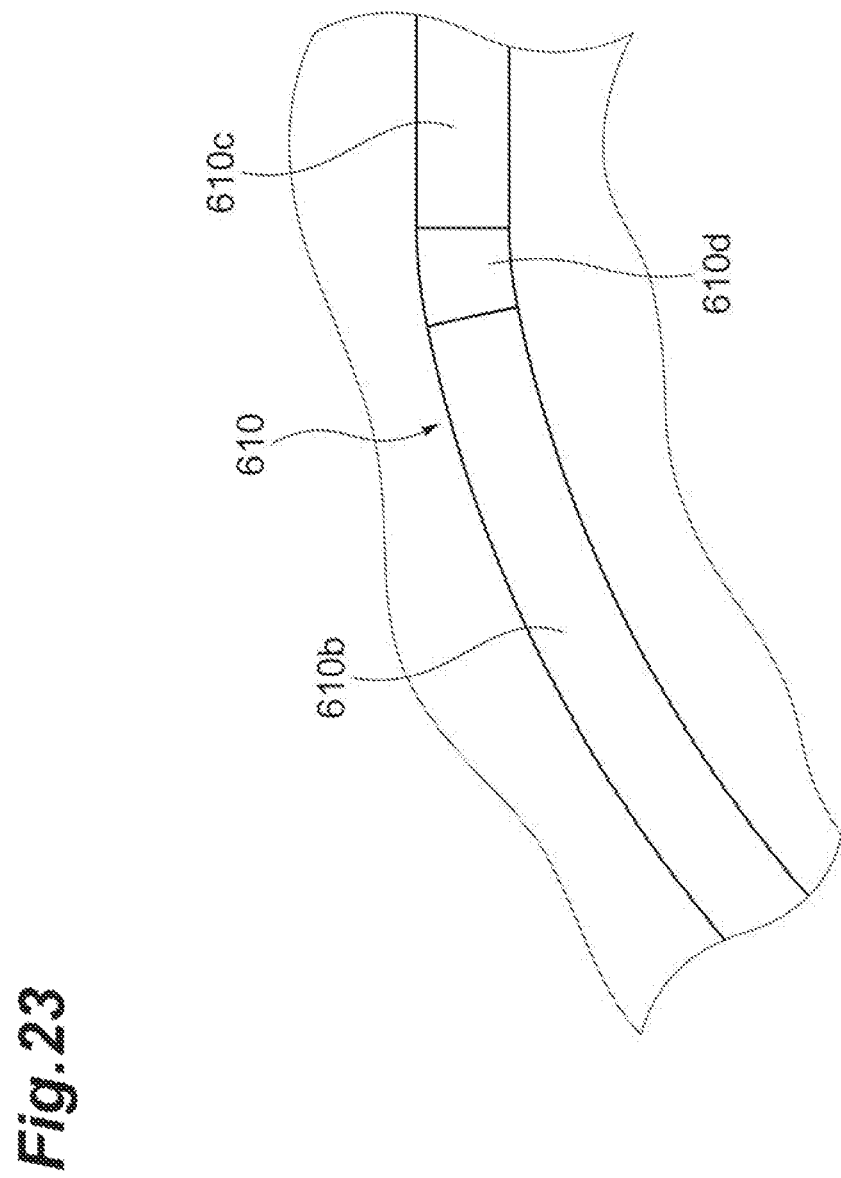
FIG. 23 is an enlarged view of a connecting portion of a guide rail.

As illustrated in FIG. 23, the guide rail 610 of the curve-type guide unit 600C may further include an interpolation portion 610d interposed between the curved portion 610b and the transition portion 610c. The interpolation portion 610d smoothly connects the curved portion 610b and the transition portion 610c with no corners. The width of the interpolation portion 610d may be equal to the width of the curved portion 610b and the width of the transition portion 610c.

Figure 24:
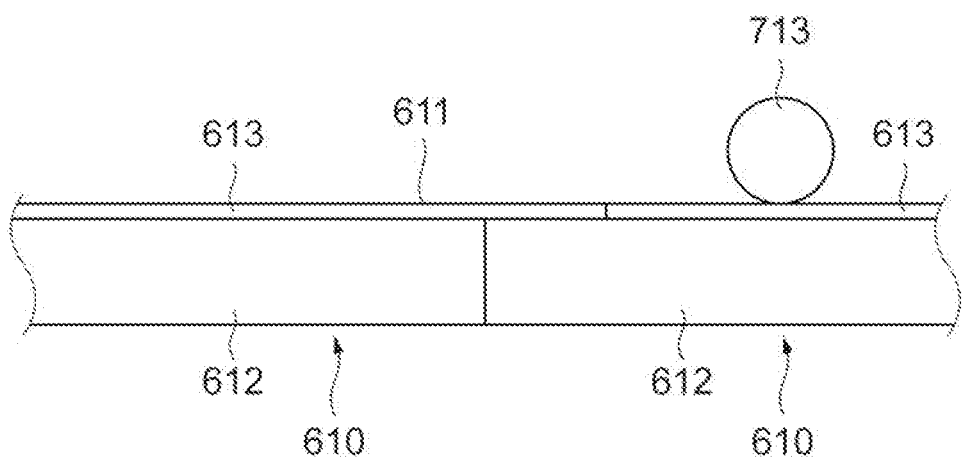
FIG. 24 is a schematic diagram illustrating a configuration example of the guide rail.

As illustrated in FIG. 24, the guide rail 610 of the guide unit 600A may include a rail base 612 and a surface layer plate 613. The rail base 612 is raised from the platform 601 on a line along the conveying path MR. The surface layer plate 613 is bonded onto the rail base 612 to constitute the upper surface 611 of the guide rail 610. The rail base 612 and the surface layer plate 613 may be configured such that when the guide units 600A are coupled to each other, the connection position between the rail bases 612 and the connection position between the surface layer plates 613 differ from each other in the direction along the conveying path MR. For example, the surface layer plate 613 may protrude beyond the rail base 612 at one end portion of the guide rail 610, and the rail base 612 may protrude beyond the surface layer plate 613 at the other end portion of the guide rail 610.

With this configuration, the level difference generated on the upper surface 611 of the guide rail 610 at the connecting portion between the guide units 600A is suppressed to a degree of variability in the thickness of the surface layer plate 613. Generally, since the variability in the thickness of a thin plate material is small, it is possible to suppress the level difference generated on the upper surface 611, leading to achievement of more smooth traveling of the wheel 713.

Figure 25:
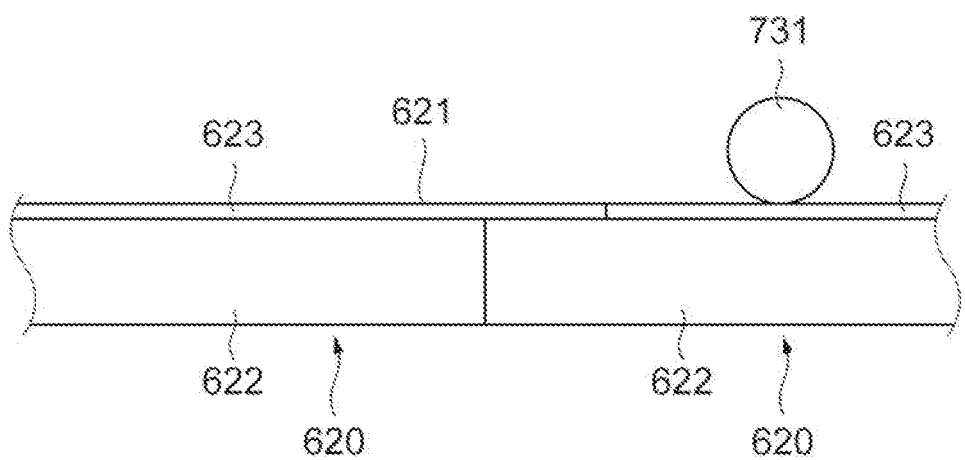
FIG. 25 is a schematic diagram illustrating a configuration example of a support rail.

As illustrated in FIG. 25, the support rail 620 may also include a rail base 622 and a surface layer plate 623 similarly to the guide rail 610. The rail base 622 and the surface layer plate 623 may be configured such that when the guide units 600A are coupled to each other, the connection position between the rail bases 622 and the connection position between the surface layer plates 623 differ from each other in the direction along the conveying path MR. Also in this case, the level difference generated on the upper surface 621 is suppressed, leading to more smooth traveling of the wheel 731.

(4) Stator and Mover

The stator 630 of the guide 600 and the mover 740 of the carrier 700 generate thrust along the conveying path MR in cooperation with each other. As an example, the stator 630 includes a magnetic member, and the mover 740 includes a plurality of coils configured to generate thrust along the conveying path MR by generating a moving magnetic field acting on the magnetic member in accordance with supply of power. That is, the stator 630 and the mover 740 constitute a moving coil (MC) type linear motor LM. In this configuration, the mover 740 functions as a power source PS that generates thrust in accordance with supply of power.

In addition to the thrust along the conveying path MR, the plurality of coils of the mover 740 may generate attraction toward the magnetic material of the stator 630. In this case, the movement of the carrier 700 to the opposite side of the stator 630 is restricted by the attraction generated between the mover 740 and the stator 630.

Hereinafter, a specific configuration example of the stator 630 and the mover 740 will be described with reference to FIG. 26. The stator 630 includes a magnetic member 631 formed of a soft magnetic material. Examples of the soft magnetic material include an iron-based metallic material. The magnetic member 631 includes a plurality of salient poles 632. Each of the plurality of salient poles 632 is aligned along the conveying path MR, and protrudes toward the mover 740 side.

The mover 740 includes a core 741, a plurality of coils 743, and a plurality of permanent magnets 744. The core 741 includes a plurality of teeth 742 aligned along the conveying path MR. Each of the plurality of coils 743 is wound so as to surround each of the plurality of teeth 742. The plurality of permanent magnets 744 is embedded in the plurality of teeth 742, respectively.

AC power having a different phase is supplied to each of the plurality of coils 743. Corresponding to this, a magnetic field generated by the plurality of coils 743 and a magnetic field generated by the plurality of permanent magnets 744 overlap with each other, so as to form a moving magnetic field along the conveying path MR. Action of this moving magnetic field on the salient pole 632 of the magnetic member 631 generates thrust along the conveying path MR and attraction toward the magnetic member 631.

Note that the configurations of the stator 630 and the mover 740 are not limited to those exemplified here. The stator 630 and the mover 740 may be configured in any way as long as it is possible to generate thrust along the conveying path MR in accordance with the supply of power. For example, the magnetic member 631 may be formed of a permanent magnet. The mover 740 need not include the plurality of permanent magnets 744.

The mover 740 may include the magnetic member 631, and the stator 630 may include the core 741 and the coil 743. That is, the linear motor LM may be a moving magnet (MM) type linear motor.

Furthermore, the configuration for generating the thrust of the carrier 700 is not limited to the linear motor LM including the stator 630 and the mover 740. At least one of the guide 600 and the carrier 700 may include at least a power source PS that generates thrust in accordance with the supply of power. For example, the mover 740 may include a rotary motor for driving any one of the wheels 713 and 731.

(5) Conductive Rail and Brush

The guide 600 may include a first conductive rail 640 (conductive line) along the conveying path MR. The carrier 700 may include brushes 761 each coming in contact with the plurality of first conductive rails 640. The number of the first conductive rails 640 may be one, or more.

The carrier 700 may further include a carrier controller 920 (described below). In a case where the stator 630 and the mover 740 constitute the above-described MC type linear motor LM, the carrier controller 920 generates AC power for forming a moving magnetic field and supplies the generated AC power to the mover 740. In this case, the plurality of brushes 761 may be electrically connected to the carrier controller 920.

The plurality of energization systems constituted with the first conductive rail 640 and the brush 761 may include, for example, an energization system for supplying power (for example, DC power) to the carrier controller 920 and an energization system for performing communication with the carrier controller 920. For example, any of the first conductive rails 640 may be connected to a power supply (for example, a DC power supply), and the other first conductive rail 640 may be connected to an input/output port of the controller.

Hereinafter, a specific configuration example of the first conductive rail 640 and the brush 761 will be described with reference to FIGS. 20 and 21. In the present example, the guide 600 includes a plurality (for example, four) of first conductive rails 640. Correspondingly, the carrier 700 includes a plurality (for example, four) of brushes 761 each coming in contact with each of the plurality of first conductive rails 640.

The guide 600 includes a side wall 602 upright with respect to the platform 601 on a line along the conveying path MR, and the plurality of first conductive rails 640 is attached to side surfaces of the side wall 602. The plurality of first conductive rails 640 is aligned in the vertical direction and is extending along the conveying path MR.

In a case where the guide 600 is dividable into a plurality of guide units 600A as described above, each of the plurality of guide units 600A includes the side wall 602 and the plurality of first conductive rails 640. Coupling the guide units 600A to each other allows the side walls 602 to be continued with each other, and the first conductive rails 640 to be continued to each other. In the joint between the guide units 600A, the first conductive rails 640 are electrically connected to each other.

The side wall 602 and the plurality of first conductive rails 640 (all the first conductive rails 640) may be arranged on one side with respect to the stator 630 (the magnetic member 631) as a reference. For example, the side wall 602 and the plurality of first conductive rails 640 may be arranged on the guide rail 610 side with respect to the stator 630 as a reference. In the guide 600 exemplified in FIGS. 20 and 21, the side wall 602 is arranged more outside (opposite side of the stator 630) than the guide rail 610, and the first conductive rail 640 is attached on the side surface of the side wall 602 on the stator 630 side.

The mover 740 has an energization section 760 including a plurality of brushes 761 on the chassis 701. The plurality of brushes 761 is aligned in the vertical direction in the energization section 760 and protrudes toward the side wall 602 side. The energization section 760 is arranged between the housing 702 and the side wall 602. The energization section 760 incorporates a plurality of elastic members that extrudes each of the plurality of energization sections 760 toward the side wall 602 side. This works to allow each of the plurality of brushes 761 to be pressed against each of the plurality of first conductive rails 640.

The guide 600 may further include a cover 603 covering the first conductive rail 640 and the brush 761. For example, the cover 603 extends laterally so as to cover the energization section 760 from the side wall 602, and further extends downward so as to partition between the housing 702 and the energization section 760. This makes it possible to firmly protect the connecting portion between the first conductive rail 640 and the brush 761 from foreign matter, or the like.

As described above, in a case where the guide 600 is dividable into a plurality of guide units 600A, each of the plurality of guide units 600A has a cover 603. In addition, coupling the guide units 600A to each other allows the covers 603 to be continuous with each other.

Figure 27:
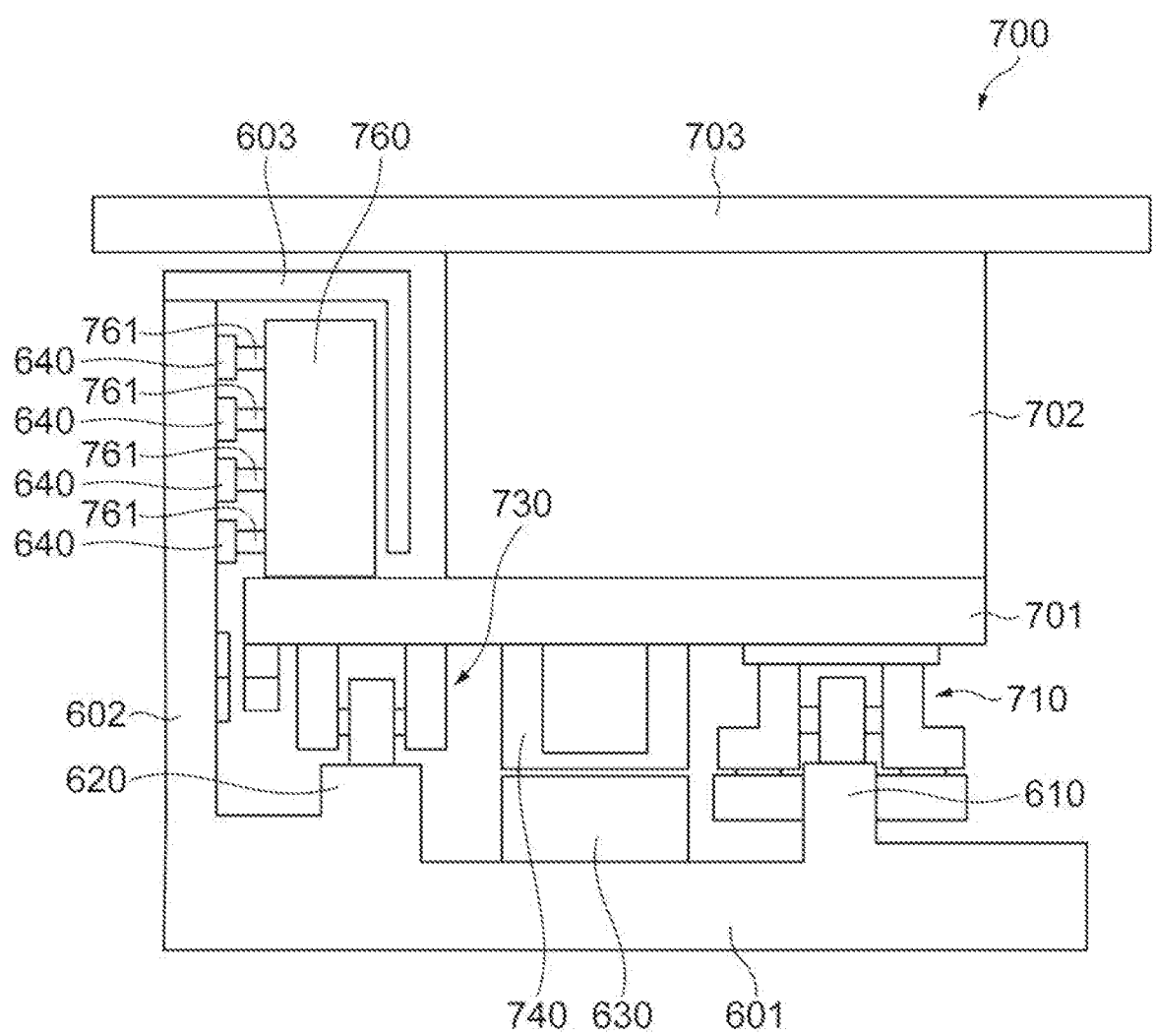
FIG. 27 is a view illustrating another arrangement example of a first conductive rail and a brush.

The side wall 602 and the plurality of first conductive rails 640 may be arranged on the opposite side of the guide rail 610 (on the support rail 620 side) with respect to the stator 630 as a reference. For example, in the guide 600 exemplified in FIG. 27, the side wall 602 is arranged more outside (opposite side of the stator 630) than the support rail 620, and the first conductive rail 640 is attached on the side surface of the side wall 602 on the stator 630 side.

The plurality of first conductive rails 640 may be dispersedly arranged on both sides with respect to the stator 630 as a reference. Furthermore, the plurality of first conductive rails 640 may be provided on the upper surface of the guide 600, and the plurality of brushes 761 may protrude downward accordingly.

(6) Switch Unit

Returning to FIG. 19, the conveying system 1A may further include a switch unit 800 (branch unit) interposed between the guide units 600A to change the course of the carrier 700. The switch unit 800 includes a movable platform, a plurality of second conductive rails provided on the movable platform, and an actuator. The actuator slides the movable platform so as to change the second conductive rail positioned on the same line as the first conductive rail 640 of the guide unit 600A.

Figure 28:
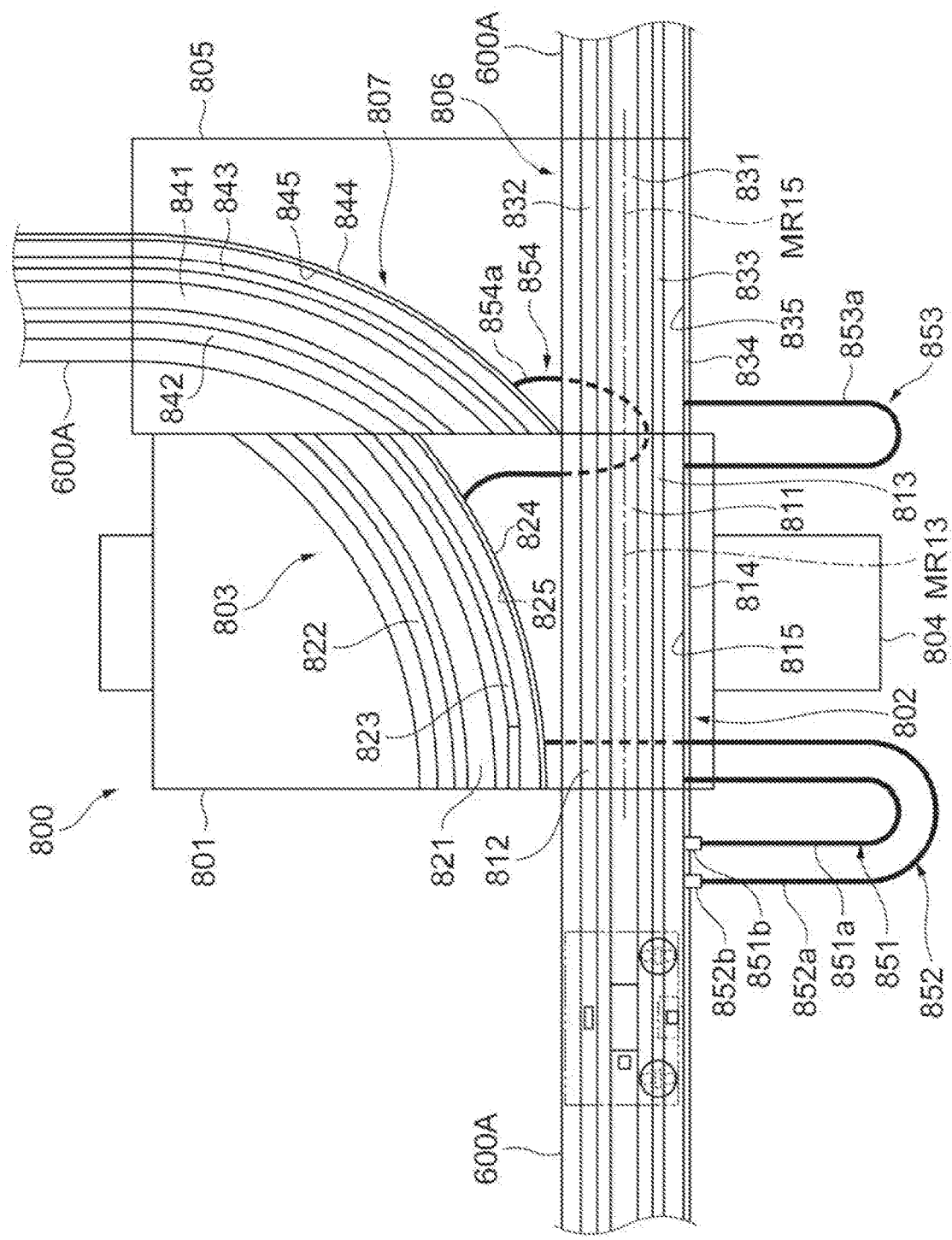
FIG. 28 is an enlarged plan view of a switch unit.
Figure 29:
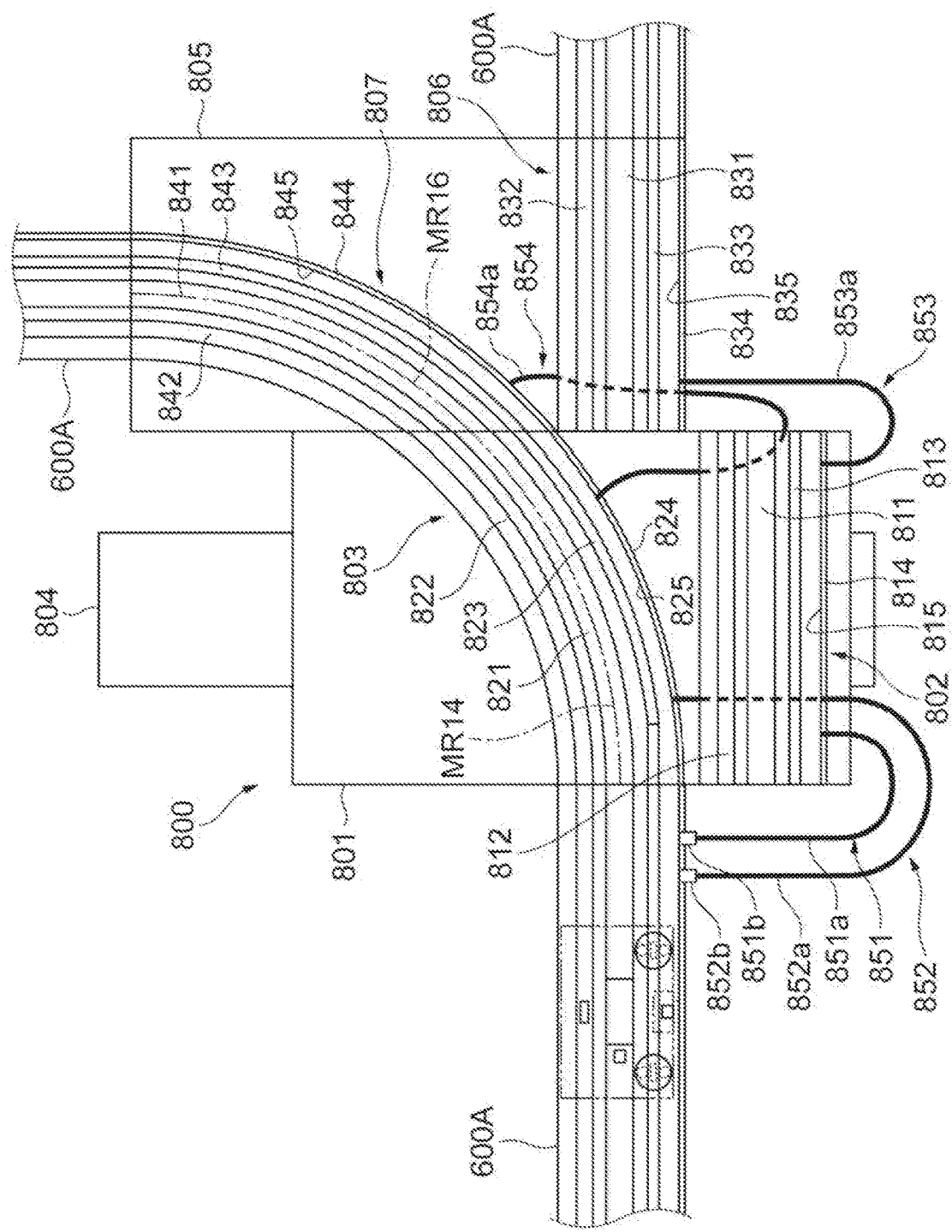
FIG. 29 is an enlarged plan view of the switch unit.

Hereinafter, a specific configuration example of the switch unit 800 will be described with reference to FIGS. 28 and 29. The switch unit 800 is interposed between one guide unit 600A (hereinafter referred to as "first guide unit 600A") and two guide units 600A (hereinafter referred to as a "second guide unit 600A" and a "third guide unit 600A"). The switch unit 800 switches between a first state in which the first guide unit 600A is connected to the second guide unit 600A and a second state in which the first guide unit 600A is connected to the third guide unit 600A.

Hereinafter, in FIGS. 28 and 29, the guide unit 600A connected to the left side of the switch unit 800 will be referred to as the above-described first guide unit 600A, the guide unit 600A connected to the right side will be referred to as the above-described second guide unit 600A, and the guide unit 600A connected to the upper side of the switch unit 800 will be referred to as the above-described third guide unit 600A. FIG. 28 illustrates the switch unit 800 in the above-described first state, and FIG. 29 illustrates the switch unit 800 in the above-described second state.

The switch unit 800 includes a movable platform 801, a first guide portion 802, a second guide portion 803, and an actuator 804. The actuator 804 slides the movable platform 801 in a direction intersecting the conveying path MR of the first guide unit 600A. The actuator 804 is an electric linear actuator, for example.

The first guide portion 802 and the second guide portion 803 are provided on the movable platform 801 and are aligned in the sliding direction of the movable platform 801.

In the first state, the first guide portion 802 is interposed between the first guide unit 600A and the second guide unit 600A, and constitutes a conveying path MR13 continuous to the conveying path MR of the first guide unit 600A.

The first guide portion 802 includes a relay stator 811, a relay support rail 812, a relay guide rail 813, a side wall 814, and a plurality of second conductive rails 815.

The relay guide rail 813 and the relay support rail 812 are configured similarly to the guide rail 610 and the support rail 620, and are respectively continuous to the guide rail 610 and the support rail 620 of the first guide unit 600A in the first state. Specifically, the relay guide rail 813 and the relay support rail 812 are aligned in a direction orthogonal to the conveying path MR13 and are raised from the movable platform 801 on a line along the conveying path MR13.

The relay stator 811 is configured similarly to the stator 630 and is continuous to the stator 630 of the first guide unit 600A in the first state. Specifically, the relay stator 811 extends along the conveying path MR13 between the relay support rail 812 and the relay guide rail 813, and is fixed to the movable platform 801 by bolt fastening, for example.

The side wall 814 is configured similarly to the side wall 602 and is continuous to the side wall 602 of the first guide unit 600A in the first state. Specifically, the side wall 814 is upright with respect to the movable platform 801 on a line along the conveying path MR13.

The plurality of second conductive rails 815 is configured similarly to the plurality of first conductive rails 640, and is positioned on the same line as the plurality of first conductive rails 640 of the first guide unit 600A in the first state. Specifically, the plurality of second conductive rails 815 is aligned in the vertical direction on the side surface of the side wall 814, arranged along the conveying path MR13.

In the second state, the second guide portion 803 is interposed between the first guide unit 600A and the third guide unit 600A, and constitutes a conveying path MR14 continuous to the conveying path MR of the first guide unit 600A.

The second guide portion 803 includes a relay stator 821, a relay support rail 822, a relay guide rail 823, a side wall 824, and a plurality of second conductive rails 825.

The relay guide rail 823 and the relay support rail 822 are configured similarly to the guide rail 610 and the support rail 620, and are respectively continuous to the guide rail 610 and the support rail 620 of the first guide unit 600A in the second state. Specifically, the relay guide rail 823 and the relay support rail 822 are aligned in a direction orthogonal to the conveying path MR14, and are raised from the movable platform 801 on a line along the conveying path MR14.

The relay stator 821 is configured similarly to the stator 630, and is continuous to the stator 630 of the first guide unit 600A in the second state. Specifically, the relay stator 821 extends along the conveying path MR14 between the relay support rail 822 and the relay guide rail 823, and is fixed to the movable platform 801 by bolt fastening, for example.

The side wall 824 is constructed similarly to the side wall 602 and is continuous to the side wall 602 of the first guide unit 600A in the second state. Specifically, the side wall 824 is upright with respect to the movable platform 801 on a line along the conveying path MR14.

The plurality of second conductive rails 825 is configured similarly to the plurality of first conductive rails 640, and is positioned on the same line as the plurality of first conductive rails 640 of the first guide unit 600A in the second state. Specifically, the plurality of second conductive rails 825 is aligned in the vertical direction on the side surface of the side wall 824, arranged along the conveying path MR14.

The switch unit 800 may further include a fixed platform 805, a third guide portion 806, and a fourth guide portion 807. The fixed platform 805 is interposed between the movable platform 801 and the second guide unit 600A, and between the movable platform 801 and the third guide unit 600A.

The third guide portion 806 and the fourth guide portion 807 are provided on the fixed platform 805 and are aligned in the sliding direction of the movable platform 801.

The third guide portion 806 is connected to the second guide unit 600A and constitutes a conveying path MR15 continuous to the conveying path MR of the second guide unit 600A. In the first state, the third guide portion 806 is interposed between the first guide portion 802 and the second guide unit 600A, and the conveying path MR15 is continuous to the conveying path MR13.

The third guide portion 806 includes a relay stator 831, a relay support rail 832, a relay guide rail 833, a side wall 834, and a plurality of third conductive rails 835.

The relay guide rail 833 and the relay support rail 832 are configured similarly to the guide rail 610 and the support rail 620. In the first state, the relay guide rail 833 is interposed between the guide rail 610 of the second guide unit 600A and the relay guide rail 813 of the first guide portion 802, and the relay support rail 832 is interposed between the support rail 620 of the second guide unit 600A and the relay support rail 812 of the first guide portion 802. Specifically, the relay guide rail 833 and the relay support rail 832 are aligned in a direction orthogonal to the conveying path MR15, and are raised from the fixed platform 805 on a line along the conveying path MR15.

The relay stator 831 is configured similarly to the stator 630. In the first state, the relay stator 831 is interposed between the stator 630 of the second guide unit 600A and the relay stator 811 of the first guide portion 802. Specifically, the relay stator 831 extends along the conveying path MR15 between the relay support rail 832 and the relay guide rail 833, and is fixed to the fixed platform 805 by bolt fastening, for example.

The side wall 834 is configured similarly to the side wall 602. In the first state, the side wall 834 is interposed between the side wall 602 of the second guide unit 600A and the side wall 814 of the first guide portion 802. Specifically, the side wall 834 is upright with respect to the fixed platform 805 on a line along the conveying path MR15.

The plurality of third conductive rails 835 is configured similarly to the plurality of first conductive rails 640. In the first state, the plurality of third conductive rails 835 is respectively interposed between the plurality of first conductive rails 640 of the second guide unit 600A and the plurality of second conductive rails 815 of the first guide portion 802. Specifically, the plurality of third conductive rails 835 is aligned in the vertical direction on the side surface of the side wall 834, and is arranged along the conveying path MR15. The third conductive rail 835 and the first conductive rail 640 are electrically connected to each other at a joint between the third guide portion 806 and the second guide unit 600A.

The fourth guide portion 807 is connected to the third guide unit 600A and constitutes a conveying path MR16 continuous to the conveying path MR of the third guide unit 600A. In the second state, the fourth guide portion 807 is interposed between the second guide portion 803 and the third guide unit 600A, and the conveying path MR16 is continuous to the conveying path MR14.

The fourth guide portion 807 includes a relay stator 841, a relay support rail 842, a relay guide rail 843, a side wall 844, and a plurality of third conductive rails 845.

The relay guide rail 843 and the relay support rail 842 are configured similarly to the guide rail 610 and the support rail 620. In the second state, the relay guide rail 843 is interposed between the guide rail 610 of the third guide unit 600A and the relay guide rail 823 of the second guide portion 803, while the relay support rail 832 is interposed between the support rails 620 of the third guide unit 600A and the relay support rail 822 of the second guide portion 803. Specifically, the relay guide rail 843 and the relay support rail 842 are aligned in a direction orthogonal to the conveying path MR16, and are raised from the fixed platform 805 on a line along the conveying path MR16.

The relay stator 841 is configured similarly to the stator 630. In the second state, the relay stator 841 is interposed between the stator 630 of the third guide unit 600A and the relay stator 821 of the second guide portion 803. Specifically, the relay stator 841 extends along the conveying path MR16 between the relay support rail 842 and the relay guide rail 843, and is fixed to the fixed platform 805 by bolt fastening, for example.

The side wall 844 is configured similarly to the side wall 602. In the second state, the side wall 844 is interposed between the side wall 602 of the third guide unit 600A and the side wall 824 of the second guide portion 803. Specifically, the side wall 844 is upright with respect to the fixed platform 805 on a line along the conveying path MR16.

The plurality of third conductive rails 845 is configured similarly to the plurality of first conductive rails 640. In the second state, the plurality of third conductive rails 845 is respectively interposed between the plurality of first conductive rails 640 of the third guide unit 600A and the plurality of second conductive rails 825 of the second guide portion 803. Specifically, the plurality of third conductive rails 845 is aligned in the vertical direction on the side surface of the side wall 844, and is arranged along the conveying path MR16. The third conductive rail 845 and the first conductive rail 640 are electrically connected to each other at a joint between the fourth guide portion 807 and the third guide unit 600A.

The switch unit 800 may further include a plurality of conducting lines 851, a plurality of conducting lines 852, a plurality of conducting lines 853, and a plurality of conducting lines 854. The plurality of conducting lines 851 electrically connects each of the plurality of first conductive rails 640 of the first guide unit 600A with each of the plurality of second conductive rails 815 of the first guide portion 802. The plurality of conducting lines 852 electrically connects each of the plurality of first conductive rails 640 of the first guide unit 600A with each of the plurality of second conductive rails 825 of the second guide portion 803. The plurality of conducting lines 853 electrically connects each the plurality of second conductive rails 815 of the first guide portion 802 with each of the plurality of third conductive rails 835 of the third guide portion 806. The plurality of conducting lines 854 electrically connects each of the plurality of second conductive rails 825 of the second guide portion 803 with each of the plurality of third conductive rails 845 of the fourth guide portion 807.

The conducting lines 851 and 852 are configured to maintain electrical connection between the first conductive rail 640 and the second conductive rails 815 and 825 even during sliding of the movable platform 801.

As an example, the conducting line 851 may include a cable 851a connecting the first conductive rail 640 to the second conductive rail 815, and a connector 851b provided on the cable 851a. For example, one end portion of the cable 851a is electrically connected to the second conductive rail 815 from the outside of the side wall 814 (opposite side of the relay stator 811), while the connector 851b is provided at the other end portion of the cable 851a. The connector 851b is detachably connected to the first conductive rail 640 from the outside (opposite side of the stator 630) of the side wall 602. In this case, the first conductive rail 640 may include a terminal for connection of the connector 851b. The length of the cable 851a is set so as to be able to follow the sliding of the movable platform 801.

The conducting line 852 may include a cable 852a connecting the first conductive rail 640 to the second conductive rail 825, and may include a connector 852b provided on the cable 852a. For example, one end portion of the cable 852a is electrically connected to the second conductive rail 825 from the outside of the side wall 824 (opposite side of the relay stator 821), while the connector 852b is provided at the other end portion of the cable 852a. The connector 852b is detachably connected to the first conductive rail 640 from the outside (opposite side of the stator 630) of the side wall 602. In this case, the first conductive rail 640 may further include a terminal for connection of the connector 852b. The length of the cable 852a is set so as to be able to follow the sliding of the movable platform 801.

The conducting lines 851 and 852 are configured to maintain the electrical connection of the second conductive rails 815 and 825 to the third conductive rails 835 and 845, even during sliding of the movable platform 801.

The conducting line 853 may include a cable 853a connecting the second conductive rail 815 to the third conductive rail 835. For example, one end portion of the cable 853a is electrically connected to the second conductive rail 815 from the outside (opposite side of the relay stator 811) of the side wall 814, while the other end portion of the cable 853a is electrically connected to the third conductive rail 835 from the outside (opposite side of the relay stator 831) of the side wall 834. The length of the cable 853a is set so as to be able to follow the sliding of the movable platform 801.

The conducting line 854 may include a cable 854a connecting the second conductive rail 825 to the third conductive rail 845. For example, one end portion of the cable 854a is electrically connected to the second conductive rail 825 from the outside (opposite side of the relay stator 821) of the side wall 824, while the other end portion of the cable 854a is electrically connected to the third conductive rail 845 from the outside (opposite side of the relay stator 841) of the side wall 844. The length of the cable 854a is set so as to be able to follow the sliding of the movable platform 801.

Figure 30:
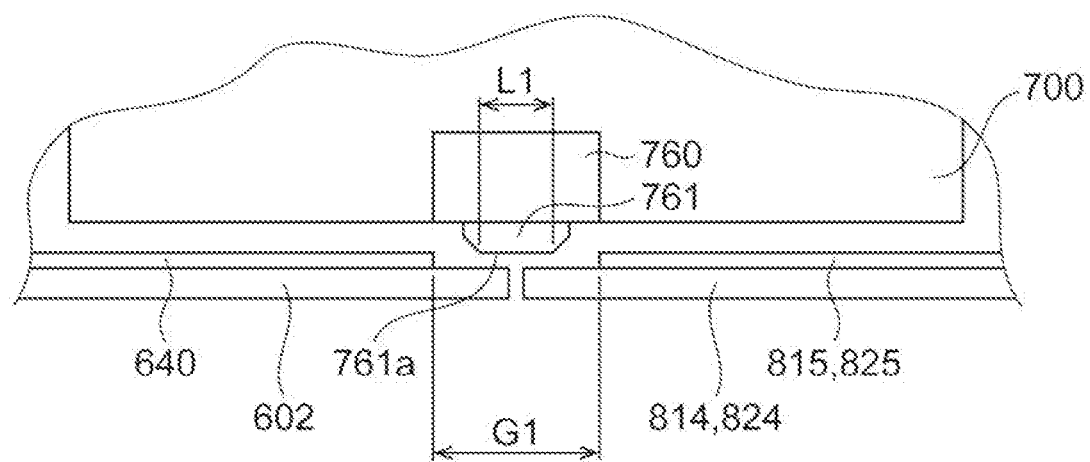
FIG. 30 is an enlarged plan view illustrating end portions of the first conductive rail and a second conductive rail.

In the case where the conducting lines 851 and 852 are provided, the second conductive rails 815 and 825 may be configured to form an interval G1 with the first conductive rail 640 in a state where the second conductive rails 815 and 825 are positioned on the same line as the first conductive rail 640 (refer to FIG. 30). The interval G1 may be greater than a length L1 of an energized portion 761a (portion coming in contact with the first conductive rail 640 or the second conductive rails 815 and 825) of the brush 761 in the direction along the conveying path MR.

Figure 31:
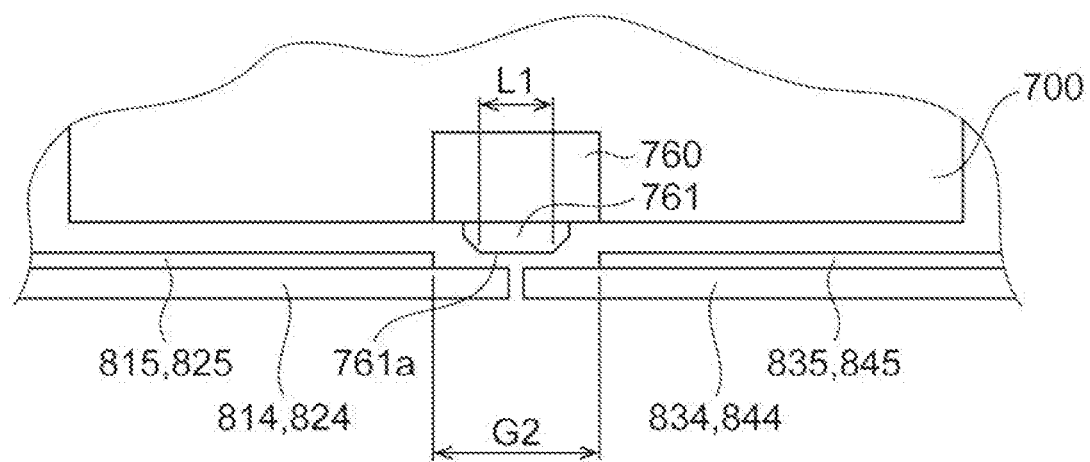
FIG. 31 is an enlarged plan view illustrating end portions of the second conductive rail and a third conductive rail.

In the case where the conducting lines 853 and 854 are provided, the second conductive rails 815 and 825 may be configured to form an interval G2 with the third conductive rails 835 and 845 in a state of being positioned on the same line as the third conductive rails 835 and 845 (refer to FIG. 31). The interval G2 may also be greater than the length L1 of the energized portion 761a of the brush 761 in the direction along the conveying path MR.

In this manner, the switch unit 800 may include a first means for electrically connecting the first conductive rail 640 to the second conductive rails 815 and 825, and maintaining electrical connection between the first conductive rail 640 and the second conductive rails 815 and 825 even during sliding of the movable platform 801, and may include a second means for preventing the first conductive rail 640 and the second conductive rails 815 and 825 from coming into contact with each other without interposing the above-described first means.

Furthermore, the switch unit 800 may include a third means for electrically connecting the second conductive rails 815 and 825 to the third conductive rails 835 and 845, and maintaining electrical connection between the second conductive rails 815 and 825 and the third conductive rails 835 and 845 even during sliding of the movable platform 801, and may include a fourth means for preventing the second conductive rails 815 and 825 and the third conductive rails 835 and 845 from coming into contact with each other without interposing the above-described third means.

(7) Configuration for Detecting Position of Carrier

As illustrated in FIG. 20, the guide 600 may further include a plurality of markers 652, as a configuration for detecting an initial position of the carrier 700. The plurality of markers 652 is provided in the guide 600 so as to be aligned along the conveying path MR (refer to FIG. 32), and each of the markers 652 holds initial position information. The initial position information is, for example, identification information of the marker 652 itself. In this case, it is possible to determine the initial position of the carrier 700 on the basis of which marker 652 has been detected.

The marker 652 possesses initial position information as an optical pattern readable by an optical sensor or magnetic data readable by a magnetic sensor, for example. There is no limit to the number of markers 652, and it can be set appropriately.

Figure 32:
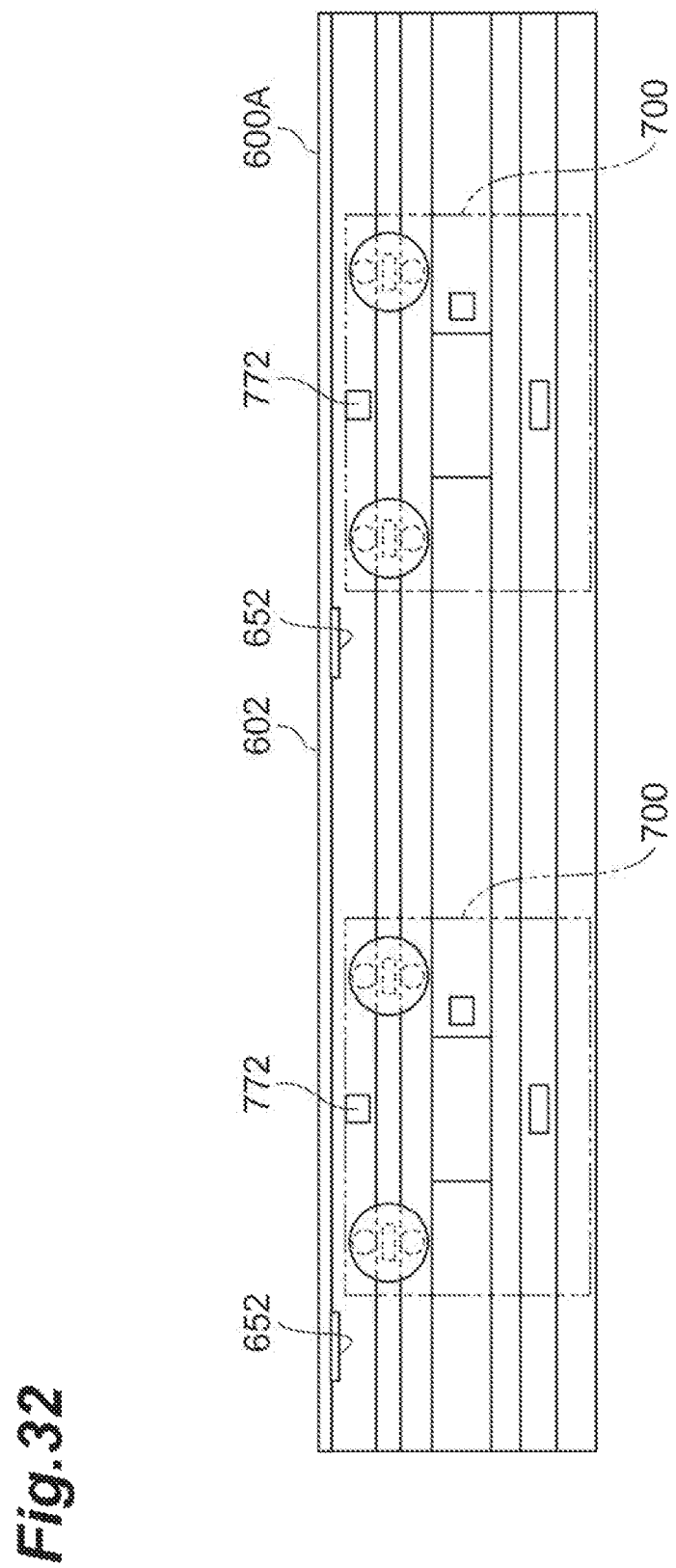
FIG. 32 is a plan view illustrating an arrangement example of markers.

Even in a case where the guide 600 is dividable into the plurality of guide units 600A, the number of carriers 700 that can be mounted on one guide unit 600A may be equal to the number of markers 652 provided in one guide unit 600A (refer to FIG. 32). In this case, the difference between the positions of the markers 652 in one guide unit 600A may be greater than the total length of the carrier 700. Here, the difference in positions of two objects corresponds to the distance between same sites of two objects (for example, distance between the center of one object and the center of the other object). This also applies to the following description. The number of carriers 700 that can be mounted in one guide unit 600A can be obtained, for example, by dividing the total length of the guide unit 600A by the total length of the carrier 700 and rounding down decimal places.

The carrier 700 may further include an initial position sensor 772 for obtaining the initial position information possessed by the marker 652. Specific examples of the initial position sensor 772 are an optical sensor, a magnetic sensor, or the like.

As a configuration for detecting the relative position of the carrier 700 with respect to the above-described initial position, the carrier 700 may further include a magnetic sensor 771 as illustrated in FIG. 20. The magnetic sensor 771 detects magnetism varying with the movement of the carrier 700. Specifically, the magnetic sensor 771 is provided at a lower portion of the chassis 701.

Figure 26:
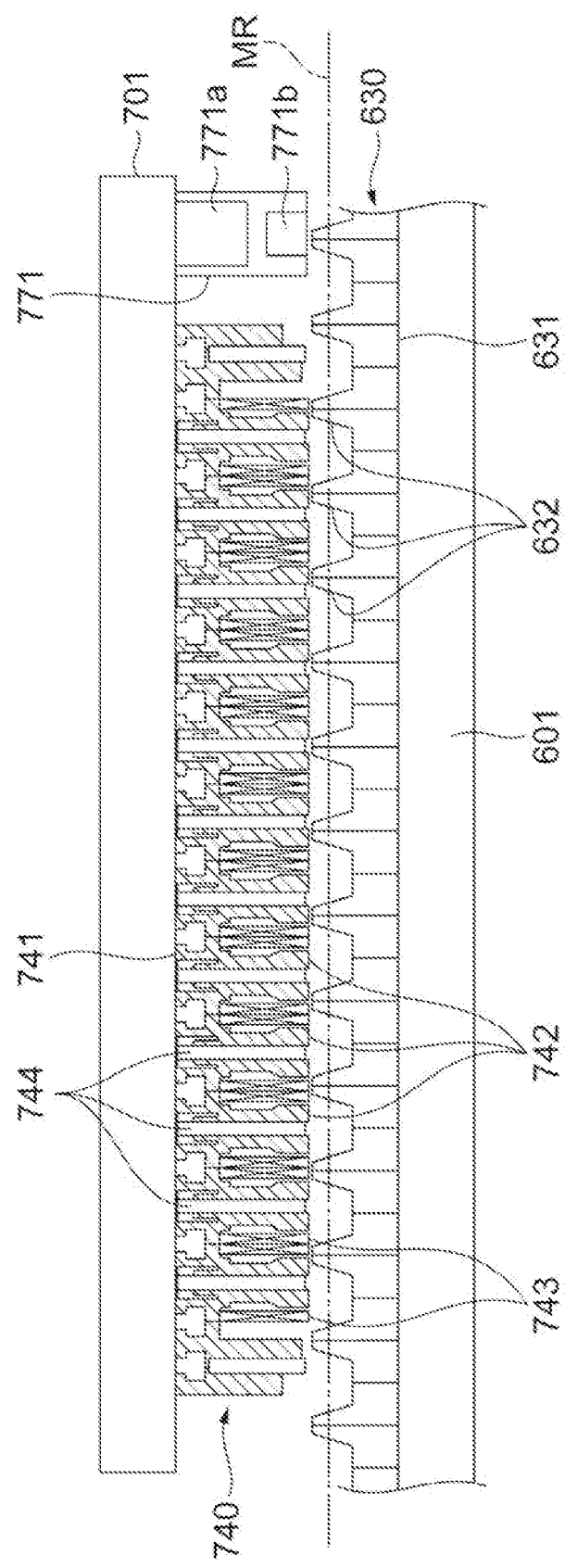
FIG. 26 is a cross-sectional view taken along line XXVI-XXVI in FIG. 20.

As illustrated in FIG. 26, the magnetic sensor 771 includes a bias magnet 771a that generates a magnetic flux along the vertical direction and a Hall element 771b that detects the magnetic flux. In a case where the salient pole 632 of the stator 630 is positioned below the magnetic sensor 771, the magnetic flux passing through the Hall element 771b is increased by the action of the salient pole 632, as compared with a case where the salient pole 632 is not positioned below the magnetic sensor 771. Accordingly, the magnetic flux passing through the Hall element 771b varies along the movement of the carrier 700. Therefore, by detecting the output of the Hall element 771b, it is possible to detect magnetism varying along the movement of the carrier 700.

As illustrated in FIG. 20, the guide 600 may further include a scale 651 that holds position information, and the carrier 700 may further include a position sensor 773 configured to detect the position information possessed by the scale 651. The scale 651 possesses position information as a pattern readable by an optical sensor or magnetic data readable by a magnetic sensor, for example. There is no need to provide the scale 651 over the entire area of the conveying path MR. For example, the scale 651 may be provided limitedly in a region where positioning accuracy is needed. Specific examples of the position sensor 773 are an optical sensor, a magnetic sensor, or the like.

(8) Controller

Figure 33:
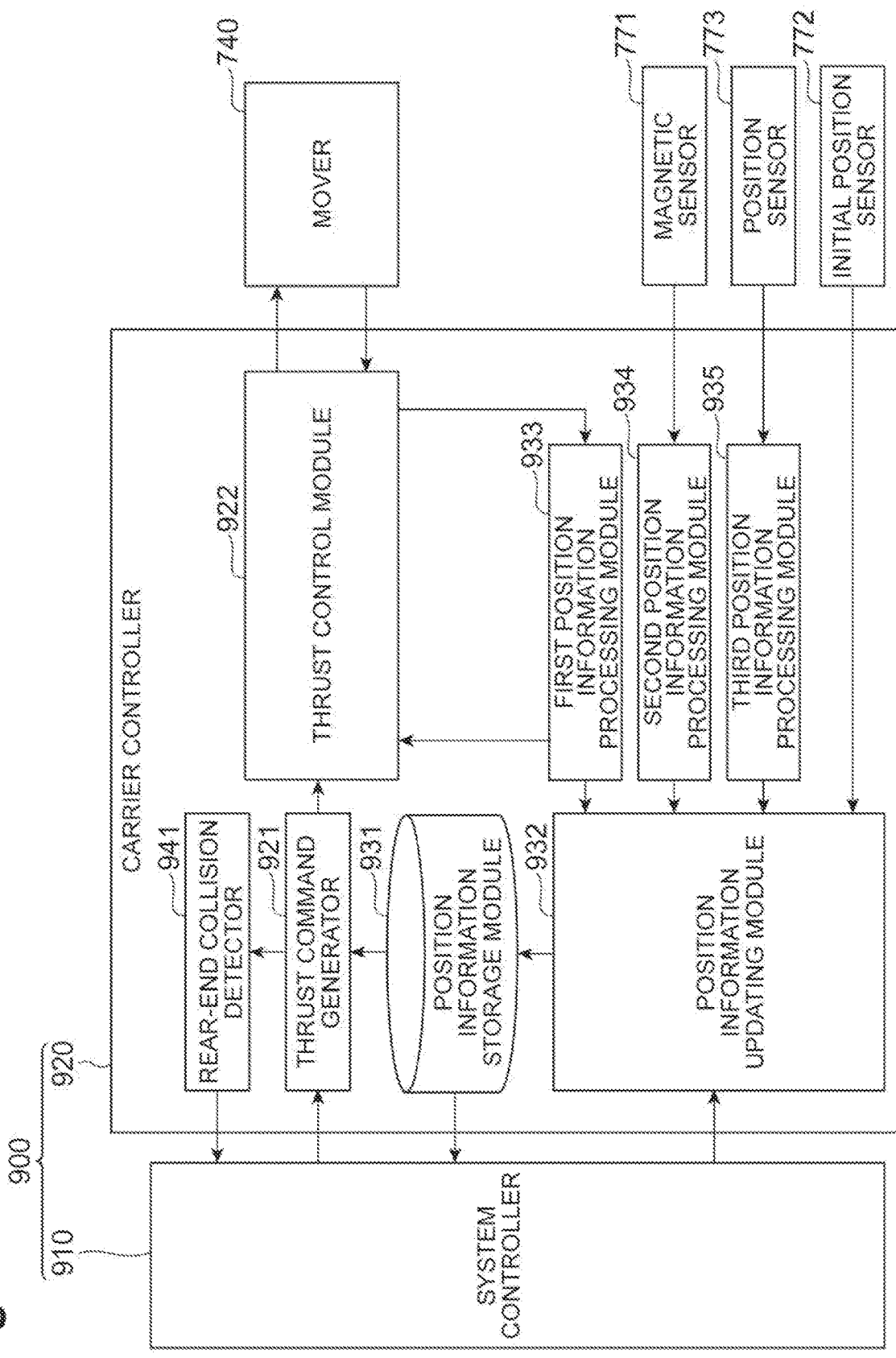
FIG. 33 is a functional block diagram of a controller.

As illustrated in FIG. 33, the conveying system 1A may further include a controller 900. The controller 900 performs various controls related to the movement of the carrier 700.

The controller 900 may be configured to detect collision between the carriers 700 on the basis of an increase in thrust on the carrier 700.

The controller 900 may be configured to further execute moving the carrier 700 and obtaining initial position information of the carrier 700 including the initial position sensor 772 when the initial position sensor 772 detects the marker 652.

The controller 900 may be configured to execute first method position detection of detecting the position of the carrier 700 on the basis of inductance variation of the coil 743 and execute second method position detection of detecting the position of the carrier 700 on the basis of the output of the magnetic sensor 771. In other words, the controller 900 may function as a first position detection means which detects the position of the carrier 700 on the basis of inductance variation and a second position detection means which detects the position of the carrier 700 on the basis of the output of the magnetic sensor 771.

The controller 900 may be configured to further execute a third method position detection of obtaining the position of the carrier 700 on the basis of the output of the position sensor 773 when the position sensor 773 passes through the position where the scale 651 is provided.

For example, the controller 900 includes a system controller 910 and a plurality of carrier controllers 920. As an example, the system controller 910 is arranged outside the conveying path MR and manages the position of all the carriers 700 in the conveying system 1A. The system controller 910 outputs a command for moving or stopping for each of the carriers 700 in accordance with the processing of production equipment including the conveying system 1A.

Each of the plurality of carrier controllers 920 is provided in each of the plurality of carriers 700. For example, the carrier controller 920 is arranged in the housing 702. The carrier controller 920 controls the carrier 700 in accordance with a command from the system controller 910. The carrier controller 920 includes a thrust command generator 921, a thrust control module 922, a position information storage module 931, a position information updating module 932, a first position information processing module 933, a second position information processing module 934, a third position information processing module 935, and a rear-end collision detector 941.

The thrust command generator 921 generates a thrust command value (for example, a target value of the thrust to be generated in the mover 740 of the carrier 700) on the basis of a command from the system controller 910. For example, the thrust command generator 921 obtains a target value for the moving speed of the carrier 700 from the system controller 910, calculates the moving speed of the carrier 700 on the basis of the current position information of the carrier 700 stored in the position information storage module 931, and generates a command value for thrust so as to bring the moving speed of the carrier 700 closer to the target value.

The first position information processing module 933 executes position detection of the above-described first method. Specifically, the first position information processing module 933 executes processing of obtaining the relative movement amount of the carrier 700 on the basis of the inductance variation of the coil 743. The inductance of the coil 743 changes in accordance with the positional relationship between the teeth 742 and the salient pole 632. Therefore, the inductance of the coil 743 varies with the movement of the carrier 700. This makes it possible to obtain the relative movement amount of the carrier 700 on the basis of the inductance variation of the coil 743.

For example, the first position information processing module 933 outputs to the thrust control module 922 a command to apply a detection voltage having higher frequency as compared with a driving AC voltage applied to the coil 743, to the AC voltage, and obtains from the thrust control module 922 information related to a current that flows through the coil 743 corresponding to the detection voltage (hereinafter, referred to as "current information"). On the basis of the above-described current information, the first position information processing module 933 calculates a relative movement amount of the carrier 700 by a known method (refer to, for example, Japanese Unexamined Patent Publication No. 2010-172080). The current flowing through the coil 743 in accordance with the detection voltage correlates with the inductance of the coil 743. That is, calculating the relative movement amount of the carrier 700 on the basis of the above-described current information corresponds to obtaining the relative movement amount of the carrier 700 on the basis of the inductance variation of the coil 743.

The second position information processing module 934 executes position detection of the above-described second method. Specifically, the second position information processing module 934 executes processing of obtaining the relative movement amount of the carrier 700 on the basis of an output of the magnetic sensor 771. For example, the second position information processing module 934 obtains the relative movement amount of the carrier 700 on the basis of the variation of the output of the magnetic sensor 771 according to the positional relationship with the salient pole 632.

The third position information processing module 935 executes position detection of the above-described third method. Specifically, when the position sensor 773 passes through a position where the scale 651 is provided, the third position information processing module 935 executes processing of obtaining the relative movement amount of the carrier 700 on the basis of the output of the position sensor 773.

The position information storage module 931 stores information indicating a current position of the carrier 700 (hereinafter referred to as "current position information"). The position information updating module 932 updates the current position information using the information obtained by any of the first position information processing module 933, the second position information processing module 934, and the third position information processing module 935. Moreover, at the time of detecting the initial position, the position information updating module 932 updates the current position information using the information included in the marker 652 detected by the initial position sensor 772 (hereinafter, referred to as "initial position registration").

As described above, the first position information processing module 933 obtains the relative movement amount of the carrier 700 on the basis of the variation of the inductance of the coil 743 corresponding to the position change between the teeth 742 and the salient pole 632. Therefore, in the position detection of the first method, the position of the carrier 700 is obtained on the basis of the signal variation attributed to the salient pole 632. The second position information processing module 934 obtains the relative movement amount of the carrier 700 on the basis of the variation of the output of the magnetic sensor 771 corresponding to the positional relationship with the salient pole 632. Therefore, even in the position detection of the second method, the position of the carrier 700 can be obtained on the basis of the signal variation attributed to the salient pole 632. In this manner, the controller 900 may be configured to determine the position of the carrier 700 on the basis of the signal variation attributed to the salient poles 632 in both the first method and the second method.

The rear-end collision detector 941 detects a collision between the carriers 700 on the basis of an increase in thrust on the carrier 700. For example, the rear end rear-end collision detector 941 estimates that the carrier 700 has collided with another carrier 700 in a case where the thrust on the carrier 700 exceeds a predetermined threshold. The above-described threshold can be appropriately set on the basis of a preliminary experiment or a simulation, or the like. Herein, the "thrust" represents a force acting in one direction along the conveying path MR toward the carrier 700, and does not necessarily include movement of the carrier 700. For example, the "thrust" includes a force for maintaining the carrier 700 to be in a stopped state against external force.

Detecting a collision between the carriers 700 on the basis of an increase in the thrust includes detecting a collision between the carriers 700 on the basis of an increase in a value correlated with the thrust. For example, the rear-end collision detector 941 may obtain a command value of the thrust output from the thrust command generator 921 as the information correlated with the thrust on the carrier 700 and may detect the collision between the carriers 700 on the basis of the increase in the command value. Moreover, the rear-end collision detector 941 may obtain a current value flowing through the coil 743 of the mover 740 as the information correlated with the thrust on the carrier 700 and may detect the collision between the carriers 700 on the basis of the increase in the current value.

The above-described configuration is merely an example, and various modifications are possible. For example, a portion of the configuration of the carrier controller 920 may be provided in the system controller 910. For example, the rear-end collision detector 941 may be provided in the system controller 910.

Figure 34:
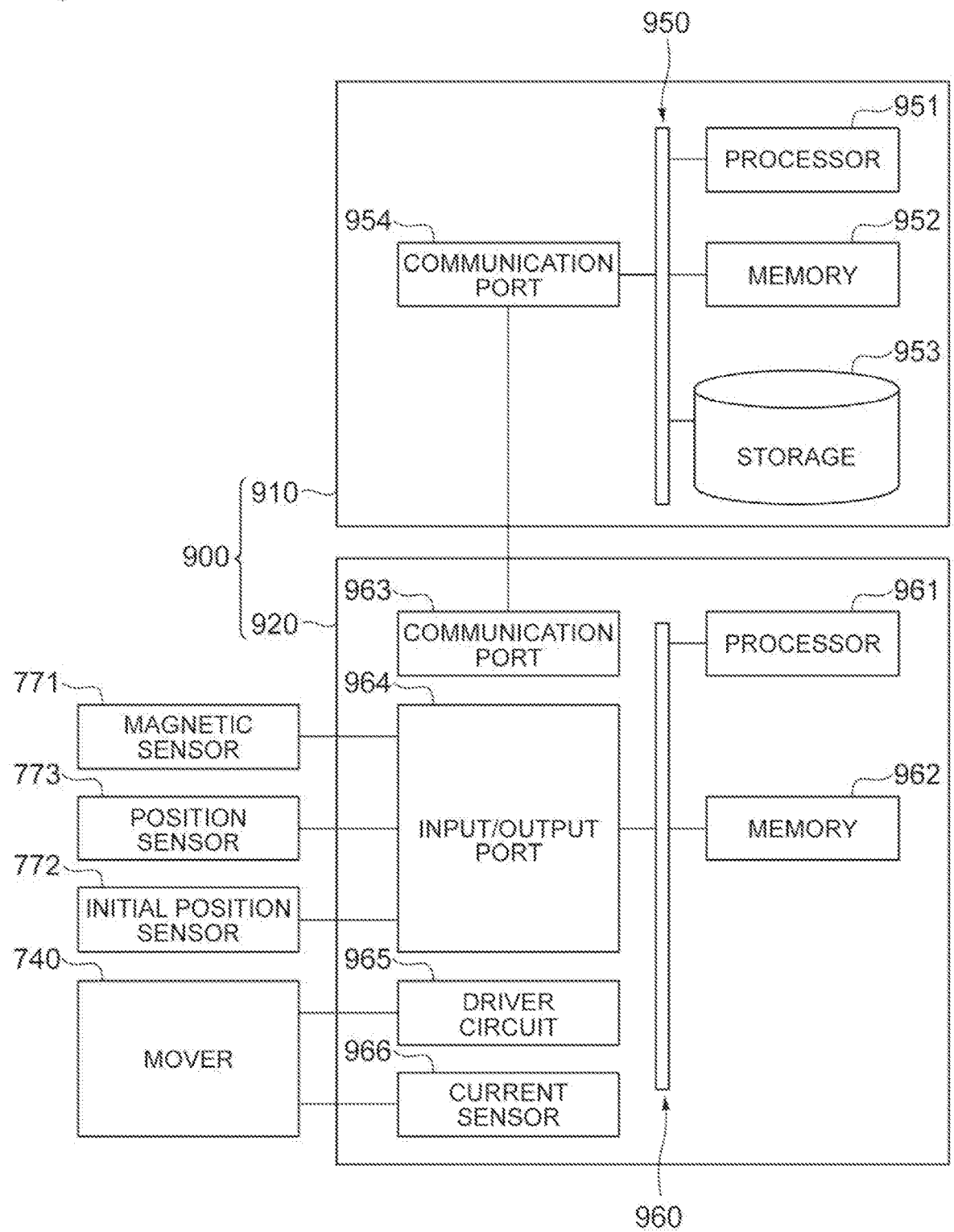
FIG. 34 is a hardware configuration diagram of the controller.

As illustrated in FIG. 34, the system controller 910 includes a circuit 950, for example, as a hardware configuration. The circuit 950 includes a processor 951, a memory 952, a storage 953, and a communication port 954. The communication port 954 communicates with the carrier controller 920 via the first conductive rail 640, for example. The processor 951 executes a program in cooperation with at least one of the memory 952 and the storage 953, and manages the position of all the carriers 700 by performing communication via the communication port 954.

The system controller 910 may be configured to retry communication in a case where the communication with the carrier controller 920 is unsuccessful, and the maximum period for retry may be set to a period that is equal to or longer than a period during which the contact between the brush 761 and one of the first conductive rail 640 and the second conductive rails 815 and 825 is interrupted due to the above-described interval G1. Similarly, the above-described retry period may be set to be a period that is equal to or longer than a period during which contact between the brush 761 and one of the second conductive rails 815 and 825 and the third conductive rails 835 and 845 is interrupted due to the above-described interval G2. The "maximum period for retrying communication" is a period as a criterion for a communication failure in a case where communication is not recovered after the period has elapsed. This also applies to the following description.

The carrier controller 920 includes a circuit 960, for example, as a hardware configuration. The circuit 960 includes a processor 961, a memory 962, a communication port 963, an input/output port 964, a driver circuit 965, and a current sensor 966. The communication port 963 communicates with the system controller 910 via the first conductive rail 640, for example. The input/output port 964 performs input/output of data with the magnetic sensor 771, the initial position sensor 772, and the position sensor 773.

The current sensor 966 obtains the current value flowing through the coil 743 of the mover 740. The driver circuit 965 outputs the power corresponding to the above-described command value of the thrust to the coil 743 of the mover 740. For example, the driver circuit 965 outputs power corresponding to deviation between the above-described command value of the thrust and the current value obtained by the current sensor 966 to the coil 743.

The processor 961 executes a program in cooperation with the memory 962, and performs input/output to the communication port 963, the input/output port 964, the driver circuit 965, and the current sensor 966, thereby configuring the above-described functional module.

The carrier controller 920 may be configured to retry communication in a case where the communication with the system controller 910 is unsuccessful, and the maximum period for retry may be set to a period that is equal to or longer than a period during which the contact between the brush 761 and one of the first conductive rail 640 and the second conductive rails 815 and 825 is interrupted due to the above-described interval G1. Similarly, the above-described retry period may be set to be a period that is equal to or longer than a period during which contact between the brush 761 and one of the second conductive rails 815 and 825 and the third conductive rails 835 and 845 is interrupted due to the above-described interval G2.

Note that the hardware configuration of the controller 900 is not necessarily limited to a configuration of a functional module by executing a program. For example, the controller 900 may constitute at least a portion of a functional module by a dedicated logic circuit or an application specific integrated circuit (ASIC) in which the dedicated logic circuits are integrated.

[Method for controlling conveying system] Subsequently, as an example of a control method of the conveying system, an initial position detection procedure using the conveying system 1A, a control procedure of the carrier 700 before detecting the initial position, and a control procedure of the carrier 700 after detecting the initial position will be described.

(1) Initial Position Detection Procedure

Figure 35:
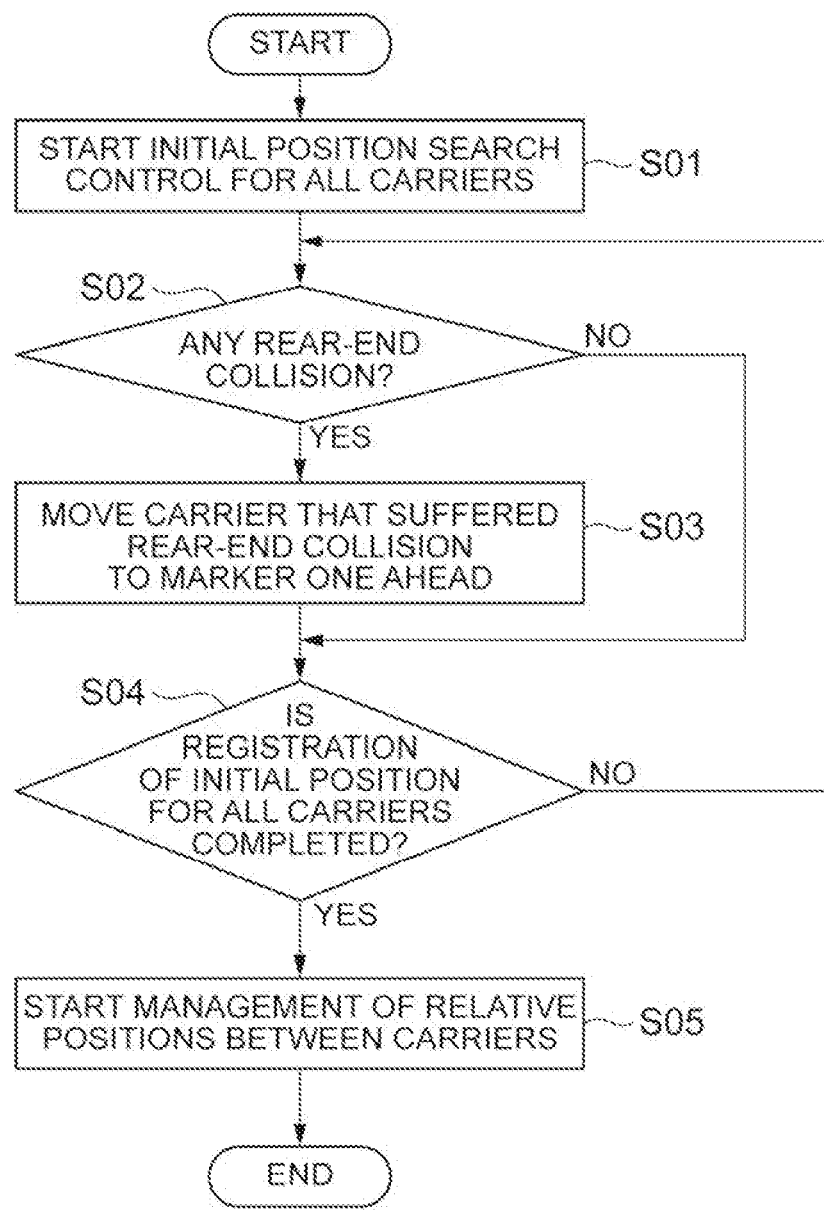
FIG. 35 is a flowchart illustrating an initial position detection procedure.

As illustrated in FIG. 35, the controller 900 first executes step S01. In step S01, the system controller 910 outputs a command to the carrier controller 920 of all the carriers 700 so as to start initial position search control in all the carriers 700. Thereafter, each of carrier controllers 920 controls the mover 740 so as to move the carrier 700 in one direction along the conveying path MR, and stops the carrier 700 in accordance with the detection of the marker 652 by the initial position sensor 772, registers the position of the marker 652 as an initial position of the carrier 700, and notifies the system controller 910 that the initial position registration has been completed. Detailed processing content performed by the carrier controller 920 will be described below.

Next, the controller 900 executes step S02. In step S02, the system controller 910 confirms whether a collision has been detected in any of the carriers 700. For example, the system controller 910 confirms whether information indicating the presence or absence of a collision has been output from the rear-end collision detector 941 of each of the carrier controllers 920.

A collision of the carrier 700 can occur between, for example, the carrier 700 stopped by obtaining the initial position information of the marker 652 and the carrier 700 that continues moving without obtaining the initial position information of the marker 652. In a case where a collision is detected in the carrier 700 that has not obtained the initial position information, the system controller 910 may estimate that the carrier 700 collided with the preceding carrier 700. In a case where a collision is detected in the stopped or decelerated carrier 700, the system controller 910 may estimate that the carrier 700 suffered rear-end collision by the subsequent carrier 700.

In a case where it is determined in step S02 that a collision occurred between the carriers 700, the controller 900 executes step S03. In step S03, the system controller 910 outputs a command to the carrier controller 920 of the carrier 700 estimated to have suffered rear-end collision (hereinafter referred to as "carrier 700 that suffered rear-end collision") by the subsequent carrier 700 so as to move the carrier 700 that suffered rear-end collision to the opposite side of the subsequent carrier 700. For example, the initial position search control module 912 moves the carrier 700 that suffered rear-end collision to a next marker 652 (next in the movement direction of the carrier 700).

In a case where it is determined in step S02 that there is no collision between the carriers 700, the controller 900 advances the processing to the next step without executing step S03.

Next, the controller 900 executes step S04. In step S04, the system controller 910 confirms whether initial position registration has been completed in all the carriers 700. In a case where it is determined in step S04 that there is a remaining carrier 700 for which the initial position registration has not been completed, the controller 900 returns the processing to step S02. By returning to the processing to step S02, it is possible to continue detecting the initial position of each of the carriers 700 while resolving the stagnation due to the collision between the carriers 700.

In a case where it is determined in step S04 that the initial position information of all the carriers 700 is recorded in the initial position storage module 914, the controller 900 finishes the initial position detection processing.

The controller 900 may execute step S05 before finishing the processing. In step S05, the system controller 910 starts managing the relative positions between the carriers 700. For example, in transition processing, the system controller 910 manages (for example, by adjusting the content of the command to the carrier controller 920) the relative positions between the carriers 700 such that the difference between the position of the carrier 700 during movement and the position of the carrier 700 before/after the movement becomes greater than the difference between the positions of the markers 652 adjacent to each other along the conveying path MR. That is, the controller 900 may be configured to execute moving the carrier 700 such that the difference between the positions of the carriers 700 adjacent to each other along the conveying path MR becomes greater than the difference between the positions of the markers 652 adjacent to each other along the conveying path MR.

(2) Procedure for Controlling Carrier 700 Before Initial Position Detection

Figure 36:
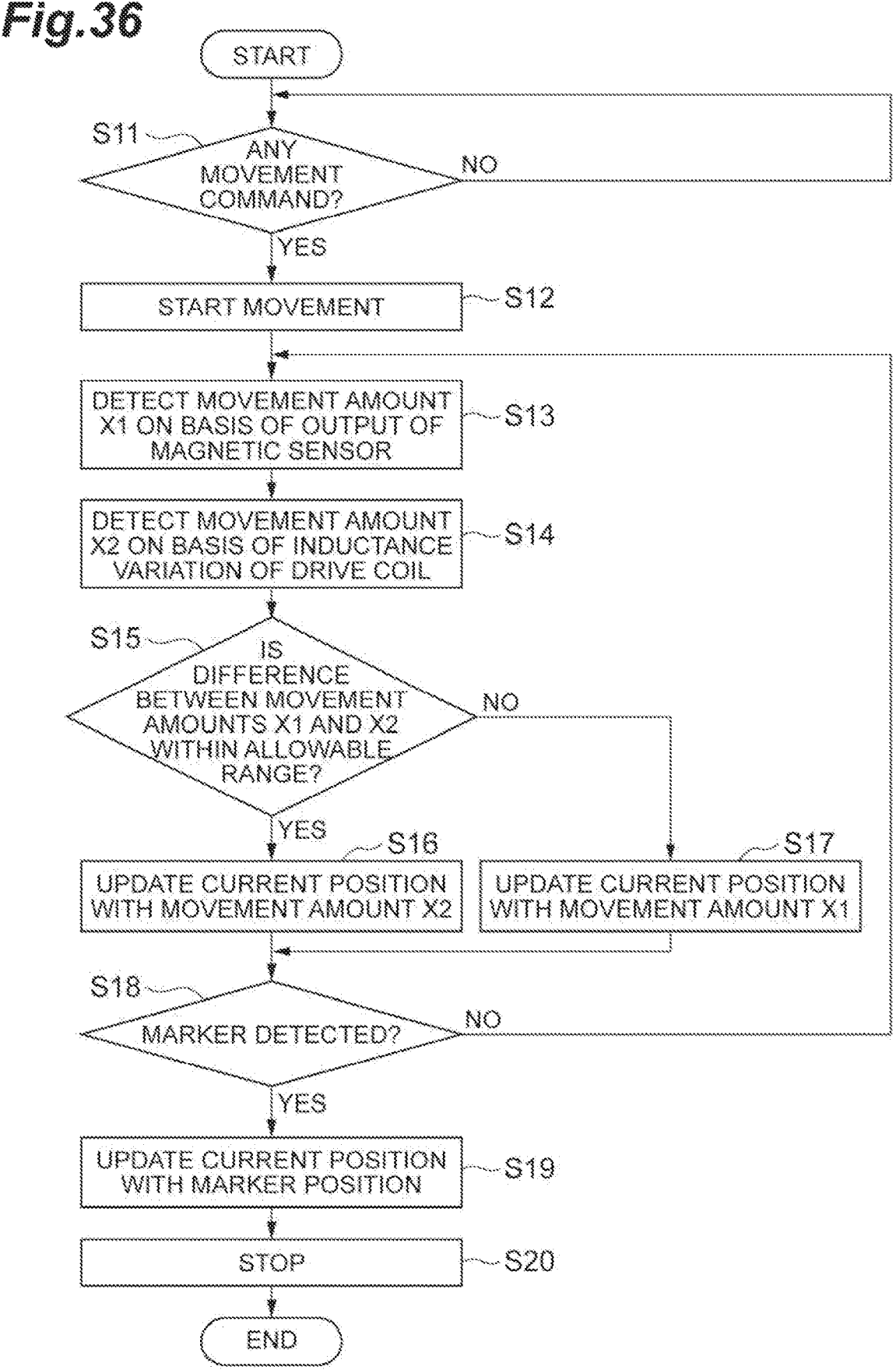
FIG. 36 is a flowchart illustrating a control procedure of each of carriers before detecting an initial position.

As illustrated in FIG. 36, the controller 900 first executes step S11. In step S11, the thrust command generator 921 waits for a command from the system controller 910.

Next, the controller 900 executes step S12. In step S12, the thrust command generator 921 generates a command value of the thrust in accordance with a movement command from the system controller 910, and the thrust control module 922 outputs the power corresponding to the command value of the thrust to the mover 740. This operation starts movement of the carrier 700. At this time, the position information updating module 932 sets the current position stored in the position information storage module 931 to a temporary initial position.

Next, the controller 900 executes steps S13 and S14. In step S13, the second position information processing module 934 executes position detection of the second method. That is, the second position information processing module 934 obtains a movement amount X1 (movement amount from the latest current position) of the carrier 700 on the basis of the variation of the output of the magnetic sensor 771.

In step S14, the first position information processing module 933 executes position detection of the first method. That is, the second position information processing module 934 obtains a movement amount X2 (movement amount from the latest current position) of the carrier 700 on the basis of the inductance variation of the coil 743. The execution procedure of steps S13 and S14 may be reversed.

Next, the controller 900 executes step S15. In step S15, the position information updating module 932 calculates a difference between the movement amounts X1 and X2, and confirms whether the difference is within an allowable range.

In a case where the difference between the movement amounts X1 and X2 is determined to be within the allowable range, the controller 900 executes step S16. In a case where the difference between the movement amounts X1 and X2 is determined to be outside the allowable range, the controller 900 executes step S17. In step S16, the position information updating module 932 updates the current position with the movement amount X2. For example, the position information updating module 932 adds the movement amount X2 to the current position stored in the position information storage module 931. When the updating of the current position is completed, the position information updating module 932 sets both the movement amounts X1 and X2 to zero.

In step S17, the position information updating module 932 updates the current position with the movement amount X1. For example, the position information updating module 932 adds the movement amount X1 to the current position stored in the position information storage module 931. When the updating of the current position is completed, the position information updating module 932 sets both the movement amounts X1 and X2 to zero. Note that "addition" in steps S16 and S17 means addition as a vector quantity, and includes subtraction as a scalar quantity. This also applies to the following description.

As exemplified in steps S13 to S17, the controller 900 may be configured to execute, in a case where power is supplied to the plurality of coils 743, position detection of both the first method and the second method so as to calculate the difference between the position detection result of the first method and the position detection result of the second method, adopting the position detection result of the first method in a case where the difference is within an allowable range, and adopting the position detection result of the second method in a case where the difference is outside the allowable range.

Note that it is not mandatory to perform such a comparison. The controller 900 may be configured to perform position detection of the first method and not to perform position detection of the second method when power is supplied to the coil 743.

Next, the controller 900 executes step S18. In step S18, the position information updating module 932 confirms whether the marker 652 is detected in the initial position sensor 772. In a case where it is determined in step S18 that the marker 652 is not detected, the controller 900 returns the processing to step S13. As a result, position detection by at least one of the first method and the second method is continued until the marker 652 is detected.

In a case where it is determined in step S18 that the marker 652 is detected, the controller 900 executes step S19. In step S19, the position information updating module 932 updates the current position of the carrier 700 on the basis of the initial position information included in the marker 652. For example, the position information updating module 932 replaces the current position stored in the position information storage module 931 with the position of the marker 652 itself. Thereafter, the position information updating module 932 notifies the system controller 910 that initial position registration is completed.

Next, the controller 900 executes step S20. In step S20, the thrust command generator 921 generates a command value of the thrust so as to stop the carrier 700 at a position where the marker 652 is detected, and the thrust control module 922 outputs the power corresponding to the command value of the thrust to the mover 740. As a result, the carrier 700 is stopped. This concludes the control procedure of the carrier 700 before detecting the initial position.

(3) Control Procedure of Each of Carriers 700 After Detecting Initial Position

Figure 37:
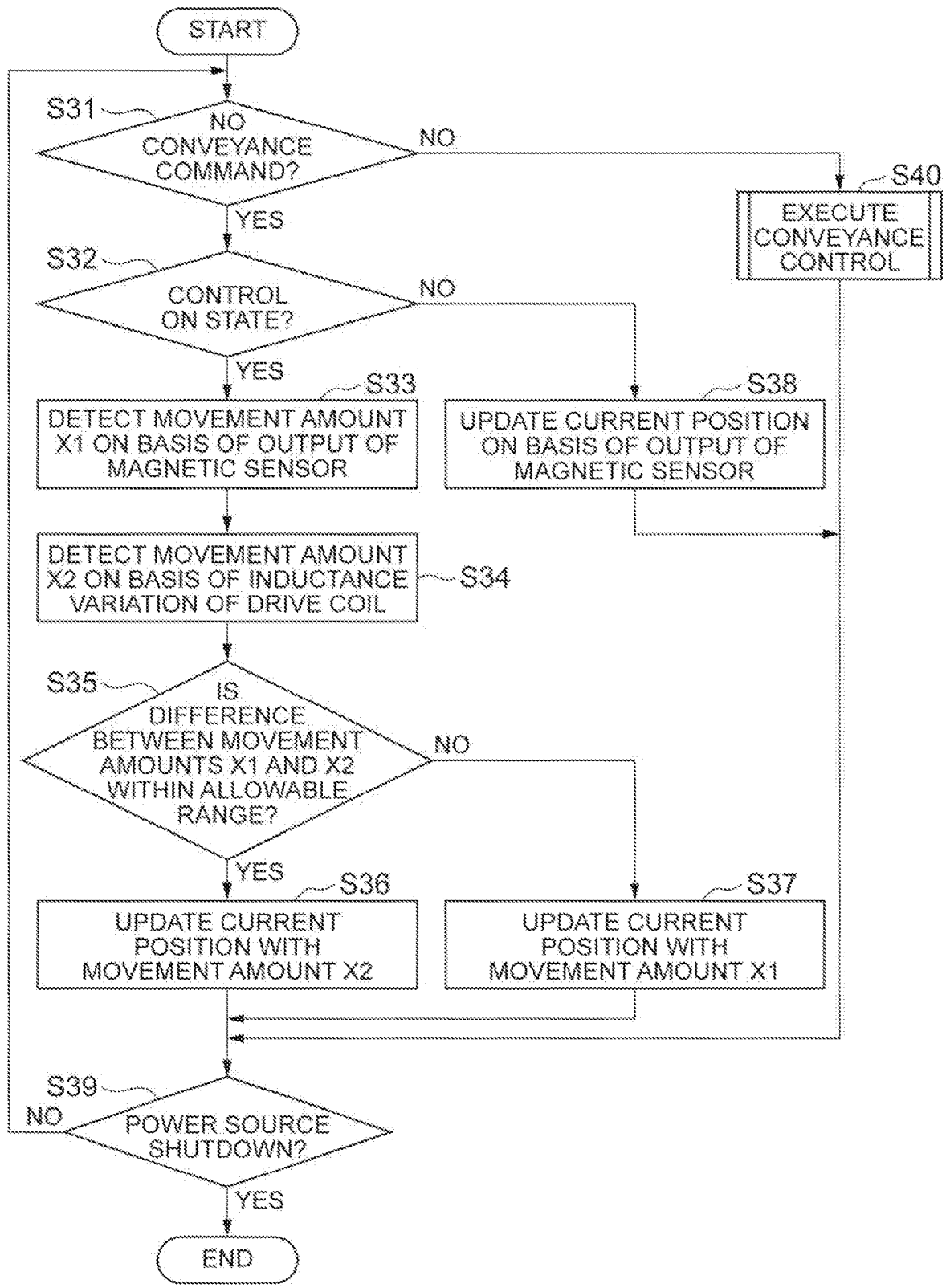
FIG. 37 is a flowchart illustrating a control procedure of each of carriers after detecting the initial position.

As illustrated in FIG. 37, the controller 900 first executes step S31. In step S31, the thrust command generator 921 confirms the presence or absence of a conveyance command from the system controller 910.

In a case where it is determined in step S31 that there is no conveyance command from the system controller 910, the controller 900 executes step S32. In step S32, the position information updating module 932 confirms whether power for control is supplied from the thrust control module 922 to the carrier 700.

Hereinafter, a state in which the power for control is supplied to the carrier 700 will be referred to as a "control on state", and a state in which the power for control is not supplied to the carrier 700 will be referred to as a "control off state". The state in which the power for control is not supplied to the carrier 700 represents a state in which power capable of substantially driving the carrier 700 is not supplied, and this is not intended to exclude a state where weak power such as noise is supplied.

In step S32, in a case where the carrier 700 is determined to be in the control on state, the controller 900 executes steps S33 and S34. In step S33, similarly to step S13, the second position information processing module 934 executes position detection of the second method. That is, the second position information processing module 934 obtains a movement amount X1 (movement amount from the latest current position) of the carrier 700 on the basis of the variation of the output of the magnetic sensor 771.

In step S34, similarly to step S14, the first position information processing module 933 executes position detection of the first method. That is, the second position information processing module 934 obtains the movement amount X2 (movement amount from the latest current position) of the carrier 700 on the basis of the inductance variation of the coil 743. Note that the execution procedure of steps S33 and S34 may be reversed.

Next, the controller 900 executes step S35. In step S35, similarly to step S15, the position information updating module 932 calculates the difference between the movement amounts X1 and X2, and confirms whether the difference is within an allowable range.

In a case where it is determined that the difference between the movement amounts X1 and X2 is within the allowable range, the controller 900 executes step S36. In a case where the controller 900 determines that the difference between the movement amounts X1 and X2 is outside the allowable range, the controller 900 executes step S37. In step S36, similarly to step S16, the position information updating module 932 updates the current position with the movement amount X2. When the updating of the current position is completed, the position information updating module 932 sets both the movement amounts X1 and X2 to zero.

In step S37, similarly to step S17, the position information updating module 932 updates the current position with the movement amount X1. When the updating of the current position is completed, the position information updating module 932 sets both the movement amounts X1 and X2 to zero.

As exemplified in steps S33 to S37, the controller 900 may be configured to execute, in a case where power is supplied to the plurality of coils 743, position detection of both the first method and the second method so as to calculate the difference between the position detection result of the first method and the position detection result of the second method, adopting the position detection result of the first method in a case where the difference is within an allowable range, and adopting the position detection result of the second method in a case where the difference is outside the allowable range.

Note that it is not mandatory to perform such a comparison. Alternatively, the controller 900 may be configured to perform position detection of the first method and not to perform position detection of the second method when power is supplied to the coil 743.

In step S32, in a case where the carrier 700 is determined to be in the control off state, the controller 900 executes step S38 instead of steps S33 to S37. In step S38, the second position information processing module 934 executes position detection of the second method, and the position information updating module 932 updates the current position using the movement amount obtained by this position detection. For example, the second position information processing module 934 obtains the movement amount X1 similarly to step S33, and the position information updating module 932 updates the current position with the movement amount X1 similarly to step S37.

After the above processing is completed, in a case where the power supply is not cut off, the controller 900 returns the processing to step S31 (step S39). This operation continues updating the current position of the carrier 700 until the conveyance command is obtained in step S31.

When the conveyance command from the system controller 910 is confirmed in step S31, the controller 900 executes step S40 instead of steps S31 to S38. In step S40, the carrier controller 920 moves the carrier 700 to a target position designated by the system controller 910. Hereinafter, step S40 will be described in detail.

Figure 38:
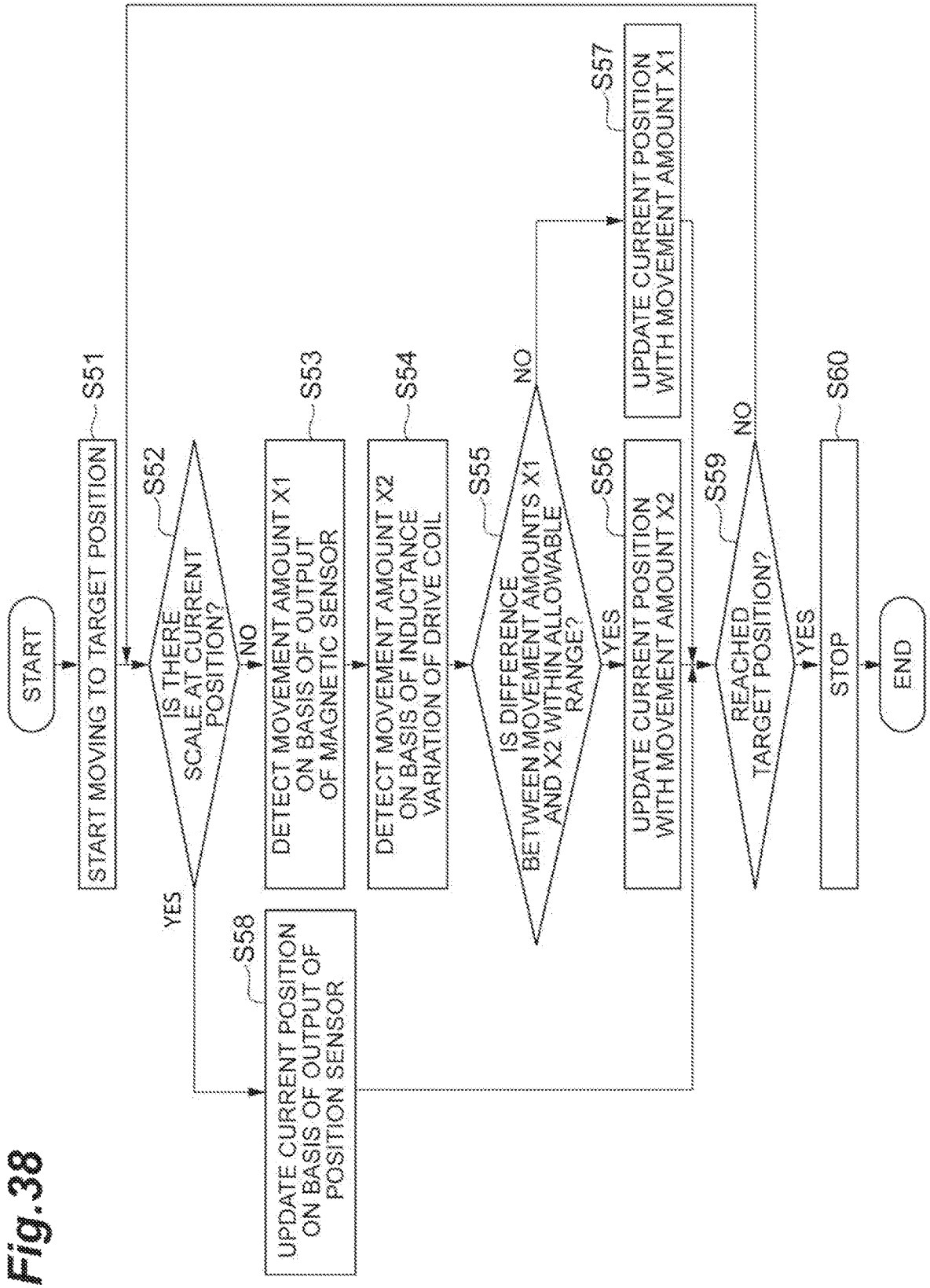
FIG. 38 is a flowchart illustrating a carrier conveyance control procedure of each of carriers.

As illustrated in FIG. 38, the controller 900 first executes step S51. In step S51, the thrust command generator 921 generates a command value of the thrust in accordance with the conveyance command from the system controller 910, and the thrust control module 922 outputs the power corresponding to the command value of the thrust to the mover 740. This operation starts movement of the carrier 700 to the target position.

Next, the controller 900 executes step S52. In step S52, the position information updating module 932 confirms presence or absence of the scale 651 in the current position. The presence or absence of the scale 651 can be determined on the basis of the output of the position sensor 773, for example. Arrangement information of the scale 651 may be recorded in advance in the system controller 910 and the presence or absence of the scale 651 may be determined on the basis of the arrangement information.

In a case where it is determined in step S52, that the scale 651 is absent in the current position, the controller 900 executes steps S53 and S54. In step S53, similarly to step S13, the second position information processing module 934 executes position detection of the second method. That is, the second position information processing module 934 obtains a movement amount X1 (movement amount from the latest current position) of the carrier 700 on the basis of the variation of the output of the magnetic sensor 771.

In step S54, similarly to step S14, the first position information processing module 933 executes position detection of the first method. That is, the second position information processing module 934 obtains the movement amount X2 (movement amount from the latest current position) of the carrier 700 on the basis of the inductance variation of the coil 743. Note that the execution procedure of steps S53 and S54 may be reversed.

Next, the controller 900 executes step S55. In step S55, similarly to step S15, the position information updating module 932 calculates the difference between the movement amounts X1 and X2, and confirms whether the difference is within an allowable range.

In a case where the difference between the movement amounts X1 and X2 is determined to be within the allowable range, the controller 900 executes step S56. In a case where the difference between the movement amounts X1 and X2 is determined to be outside the allowable range, the controller 900 executes step S57. In step S56, similarly to step S16, the position information updating module 932 updates the current position with the movement amount X2. When the updating of the current position is completed, the position information updating module 932 sets both the movement amounts X1 and X2 to zero.

In step S57, similarly to step S17, the position information updating module 932 updates the current position with the movement amount X1. When the updating of the current position is completed, the position information updating module 932 sets both the movement amounts X1 and X2 to zero.

As exemplified in steps S53 to S57, the controller 900 may be configured to execute, in a case where power is supplied to the plurality of coils 743, position detection of both the first method and the second method so as to calculate the difference between the position detection result of the first method and the position detection result of the second method, adopting the position detection result of the first method in a case where the difference is within an allowable range, and adopting the position detection result of the second method in a case where the difference is outside the allowable range.

Note that it is not mandatory to perform such a comparison. Alternatively, the controller 900 may be configured to perform position detection of the first method and not to perform position detection of the second method when power is supplied to the coil 743.

In step S52, in a case where it is determined that the scale 651 is present at the current position, the controller 900 executes step S58 instead of steps S53 to S57. In step S58, the third position information processing module 935 executes position detection of the third method, and the position information updating module 932 updates the current position using the movement amount obtained by this position detection. That is, the third position information processing module 935 obtains the movement amount of the carrier 700 on the basis of the output of the position sensor 773. The position information updating module 932 updates the current position with the movement amount. For example, the position information updating module 932 adds the movement amount to the current position stored in the position information storage module 931. When the updating of the current position is completed, the position information updating module 932 sets the movement amount to zero.

Next, the controller 900 executes step S59. In step S59, the thrust command generator 921 confirms whether the current position of the carrier 700 matches the target position. "Match" means substantial achievement and is not intended to exclude a difference in an error level. In a case where it is determined in step S59 that the current position of the carrier 700 does not match the target position, the controller 900 returns the processing to step S52. This operation leads to repetition of the movement of the carrier 700 and the update of the current position until the carrier 700 reaches the target position.

In a case where it is determined in step S59 that the current position of the carrier 700 matches the target position, the controller 900 executes step S60. In step S60, the thrust command generator 921 generates a command value of the thrust so as to stop the carrier 700 at the target position, and the thrust control module 922 outputs the power according to the command value of the thrust to the mover 740. As a result, the carrier 700 is stopped. This concludes the above-described step S40.

Referring back to FIG. 37, in a case where the power supply is not cut off after the completion of step S40, the controller 900 returns the processing to step S31 (step S39). As a result, the update of the current position is continued even after the completion of the conveyance control.

3. Third Embodiment

A conveying system 1B according to a third embodiment includes a configuration of the carrier 700 modified from the second embodiment. Accordingly, the third embodiment will mainly describe a configuration of a carrier 700A.

(1) Carrier

Figure 39:
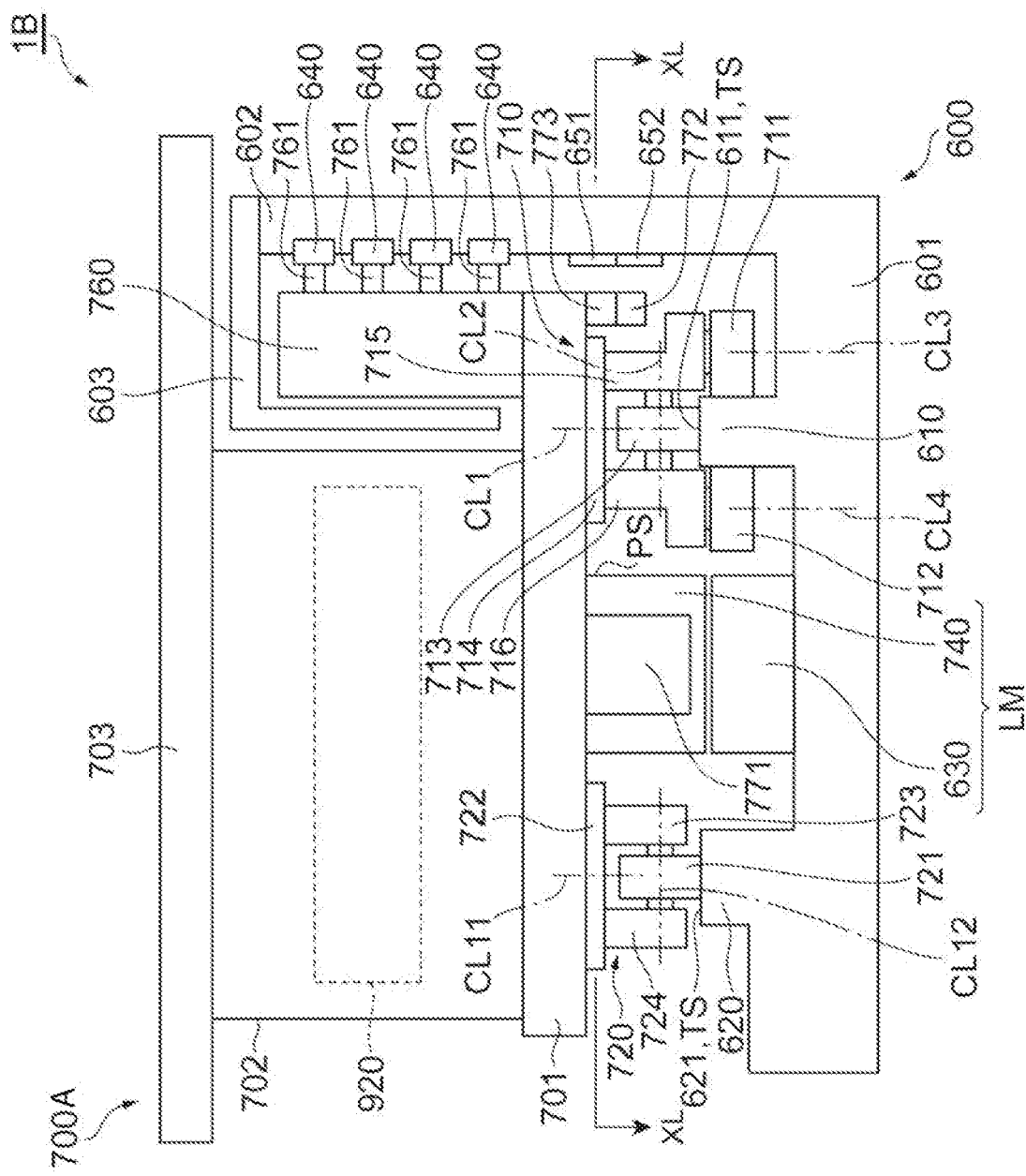
FIG. 39 is a cross-sectional view illustrating a conveying system according to a third embodiment.
Figure 40:
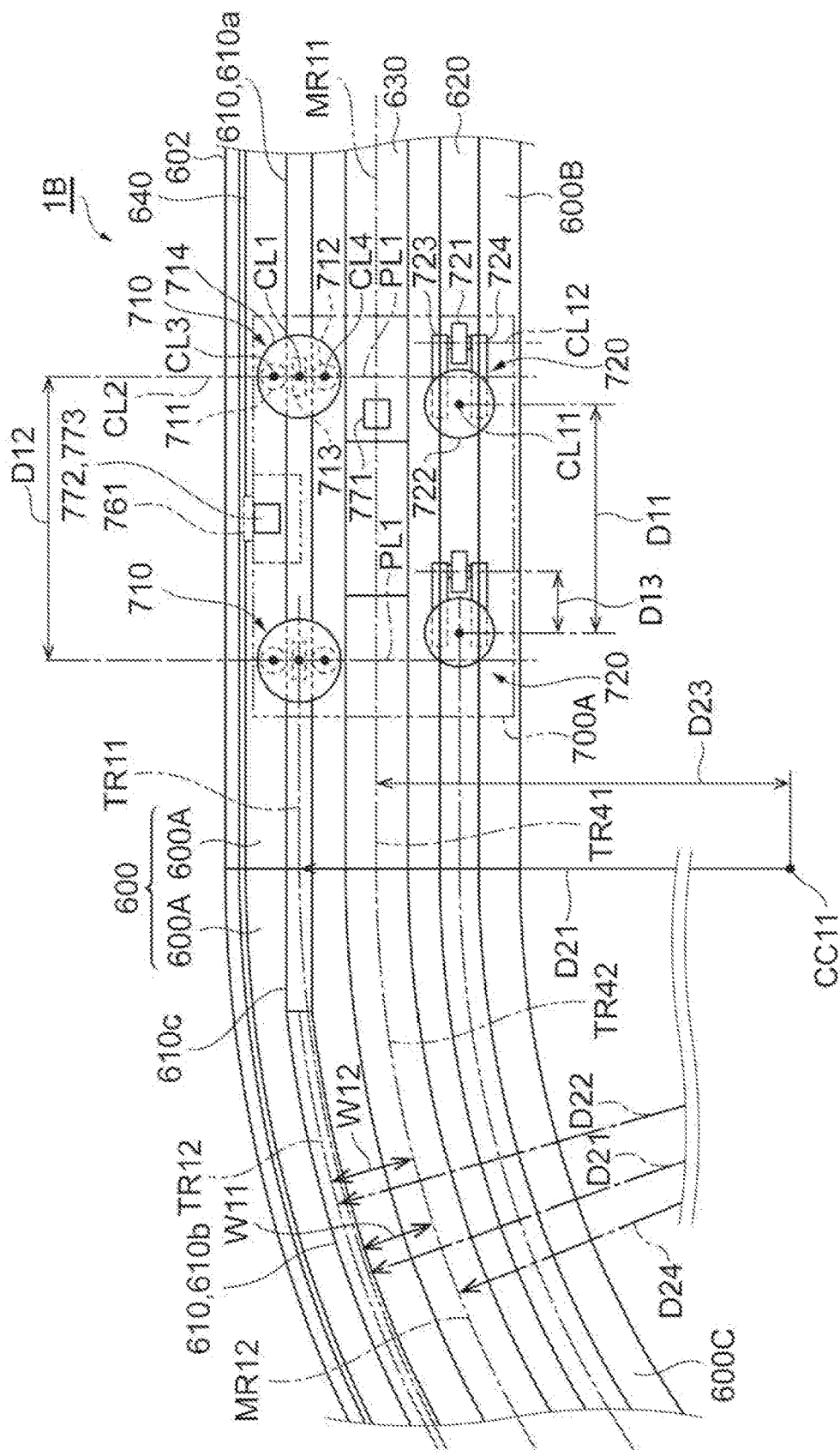
FIG. 40 is a cross-sectional view taken along line XL-XL in FIG. 39.

The carrier 700A of the third embodiment includes a configuration modified from the casters 710 and 730 in the carrier 700 of the second embodiment. As illustrated in FIGS. 39 and 40, the carrier 700A includes at least one caster 710 (first caster) and at least one caster 720 (second caster). The caster 710 is configured to move along the guide rail 610.

The caster 720 includes a wheel 721 (a second wheel) and a base 722 (a second base). The base 722 holds the wheel 721 and is turnable to change the orientation of the wheel 721. A turning center CL11 and a rotation center (center axis) CL12 of the wheel 721 are separated from each other as viewed from a direction along the turning center (center axis) CL11 of the base 722.

Hereinafter, a specific configuration example of the carrier 700A will be described. "Up and down (or upper or lower)" in the description of the specific configuration example means up and down (or upper or lower direction) in a case where the carrier 700A is installed so as to be movable in the horizontal direction.

The carrier 700A includes the chassis 701, and the two casters 710 and the two casters 720 provided at a lower portion of the chassis 701. The two casters 710 are aligned along the conveying path MR, and the two casters 720 are also aligned along the conveying path MR.

The caster 710 includes the two guide rollers 711 and 712, the wheel 713 (first wheel), and the base 714 (first base). The two guide rollers 711 and 712 sandwich the guide rail 610. For example, the guide rollers 711 and 712 sandwich the guide rail 610 in the width direction of the platform 601. In other words, the guide rollers 711 and 712 come in contact with the guide rails 610 from the opposite sides in the width direction of the platform 601. Here, "coming in contact" is not intended to mean strict constant contact and is not intended to exclude temporary release within a range not substantially impairing guidance or support functions. The wheel 713 comes in contact with the upper surface 611 (traveling surface TS) of the guide rail 610 and rolls in accordance with the movement of the carrier 700A. The base 714 holds the wheel 713 and the two guide rollers 711 and 712 and is turnable so as to change the orientation of the wheel 713.

More specifically, the base 714 is attached to a lower portion of the chassis 701 so as to be turnable about the vertical turning center CL1. The base 714 includes two downwardly protruding bearing columns 715 and 716. The wheel 713 is arranged between the bearing columns 715 and 716 and is supported by the bearing columns 715 and 716 so as to be rotatable around a horizontal rotation center CL2 passing through the bearing columns 715 and 716. The guide roller 711 is attached to an end portion of the bearing column 715 so as to be rotatable around a vertical rotation center CL3 (center axis of rotation). The guide roller 712 is attached to an end portion of the bearing column 716 so as to be rotatable around a vertical rotation center CL4 (center axis of rotation).

The rotation center CL2 of the wheel 713, the rotation center CL3 of the guide roller 711, and the rotation center CL4 of the guide roller 712 may be positioned within the same plane PL1. For example, the rotation center CL2 may intersect both the rotation center CL3 and the rotation center CL4. Furthermore, the turning center CL1 of the base 714 may also be positioned within the same plane PL1. For example, the rotation center CL2 may intersect with all of the turning center CL1, the rotation center CL3, and the rotation center CL4. In this case, the turning center CL1 may pass through a position bisecting a portion between the rotation centers CL3 and CL4.

Figure 41:
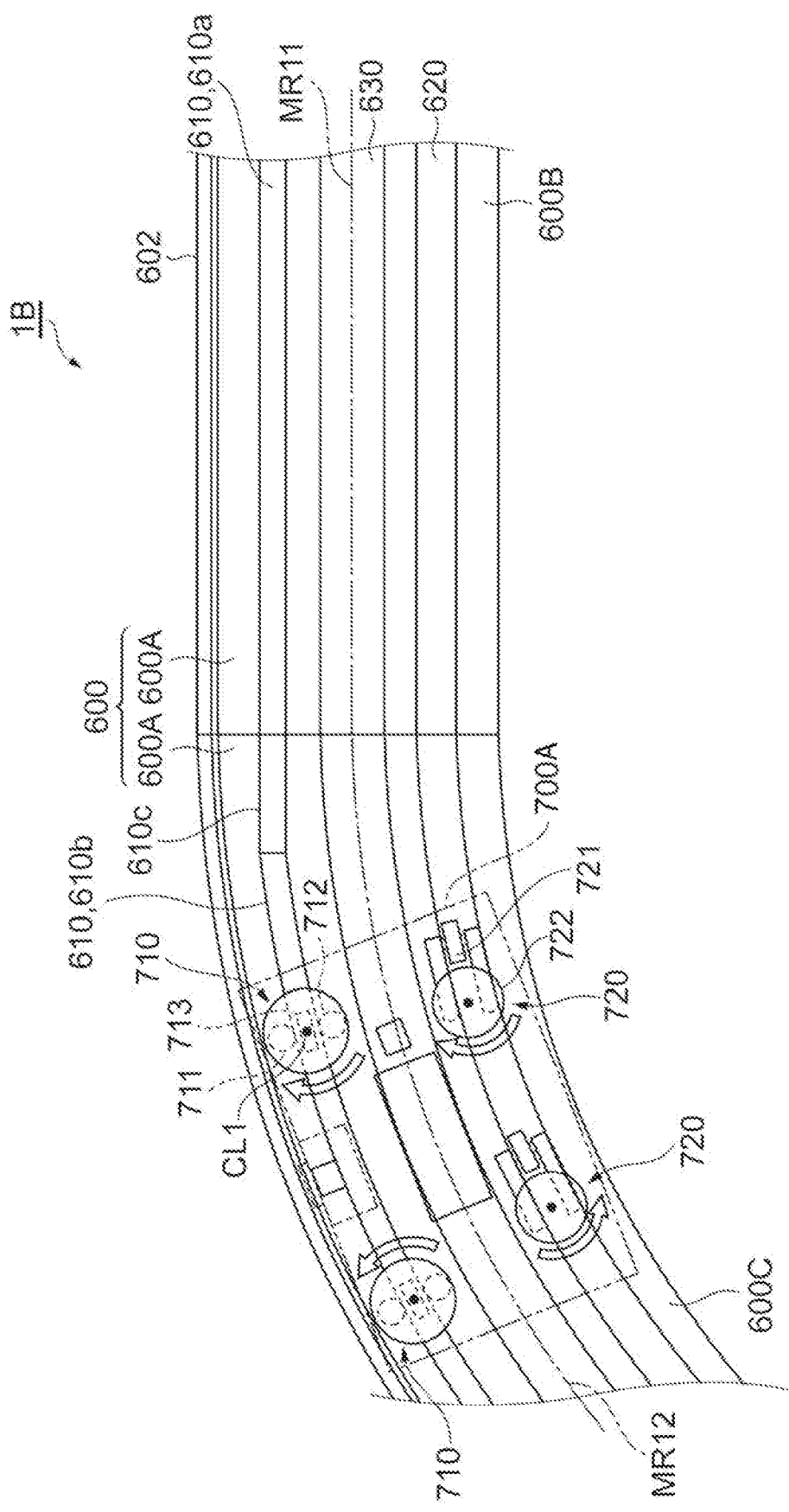
FIG. 41 is a diagram illustrating a state in which carriers in FIG. 40 have moved onto a curved conveying path.

The guide rollers 711 and 712 sandwich the guide rail 610, whereby the base 714 turns in accordance with an extending direction of the guide rail 610 (refer to FIGS. 40 and 41). With this configuration, the orientation of the wheel 713 (direction in which the wheel 713 advances by rolling) is adjusted in the extending direction of the guide rail 610. In this manner, the base 714 functions as a means for integrally holding the wheel 713 and the two guide rollers 711 and 712 and enabling the orientation of the wheel 713 to change.

The casters 710 need not include other guide rollers having different rotation centers with respect to the two guide rollers 711 and 712.

The caster 720 includes the wheel 721 and the base 722. The wheel 721 comes in contact with the upper surface 621 (traveling surface TS) of the support rail 620 and rolls in accordance with the movement of the carrier 700A. The base 722 holds the wheel 721 and is turnable so as to change the orientation of the wheel 721 (direction of moving by roll).

More specifically, the base 722 is attached to a lower portion of the chassis 701 so as to be turnable about the vertical turning center CL11. The base 722 includes two downwardly protruding bearing walls 723 and 724. The wheel 721 is arranged between the bearing walls 723 and 724 and is supported by the bearing walls 723, 724 so as to be rotatable around a horizontal rotation center CL12 passing through the bearing walls 723 and 724.

When viewed from the direction along the turning center CL11, the turning center CL11 and the rotation center CL12 are separated from each other. Corresponding to this, the bearing walls 723 and 724 protrude from the base 722 toward the rotation center CL12 side.

An interval D11 between the turning centers CL11 of the two bases 722 may be smaller than an interval D12 between the turning centers CL1 of the two bases 714. An interval D13 between the turning center CL11 of the base 722 and the rotation center CL12 of the wheel 721 held by the base 722 may be less than half of the interval D11.

Figure 42:
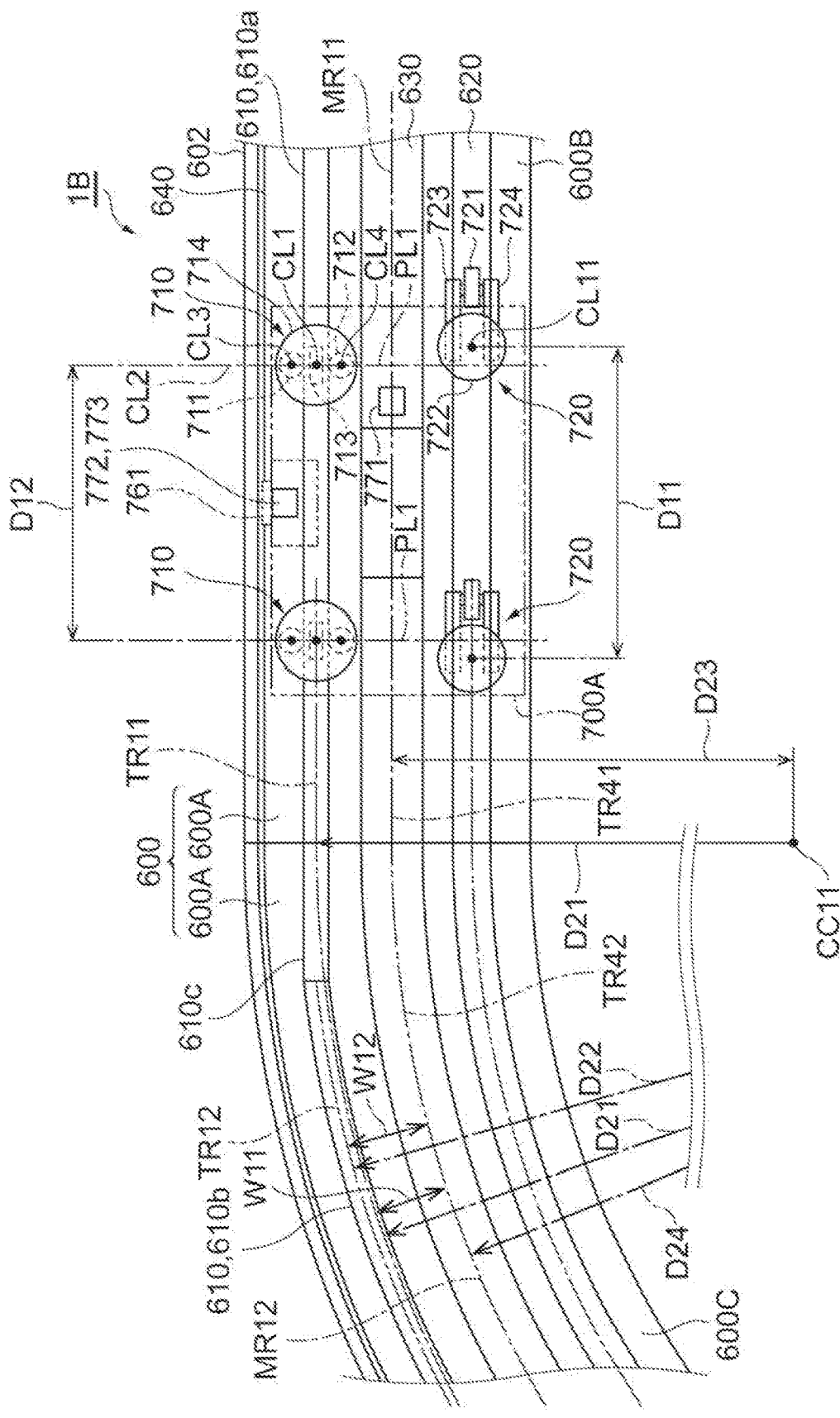
FIG. 42 is a cross-sectional view illustrating a modification of the carrier in FIG. 40.

As illustrated in FIG. 42, the interval D11 between the turning centers CL11 of the two bases 722 may be greater than the interval D12 between the turning centers CL1 of the two bases 714. In this case, the above-described interval D13 may also be less than half of the interval D11.

Figure 43:
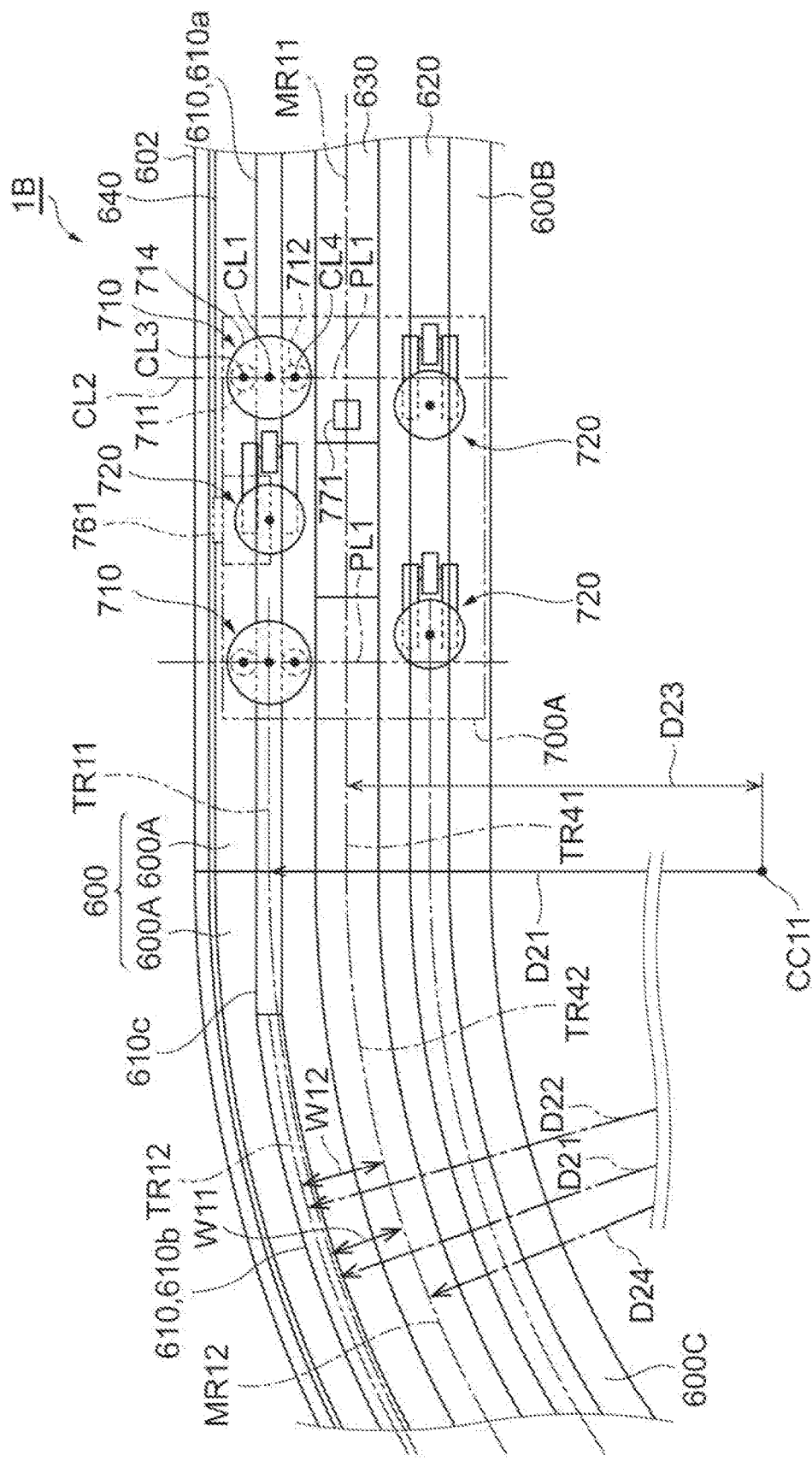
FIG. 43 is a cross-sectional view illustrating another modification of the carrier in FIG. 40.

The carrier 700A may be modified in a various manner as long as it includes at least one caster 710 and at least one caster 720, the caster 710 is configured to move along the guide rail 610, the caster 720 includes the wheel 721 and the base 722, and the turning center CL11 and the rotation center CL12 of the wheel 721 are separated from each other when viewed from the direction along the turning center CL11 of the base 722. For example, as illustrated in FIG. 43, the caster 710 need not include the wheel 713. In this case, the carrier 700A may include three or more casters 720. For example, the carrier 700A in FIG. 43 has a caster 720 between the two casters 710 in addition to the two casters 720 along the support rail 620.

While the constituent materials of the chassis 701 and the casters 710 and 720 are not particularly limited, a relatively lightweight metal material such as an aluminum based alloy can be an exemplary material. The constituent material of the casters 710 and 720 may be selected such that the surface hardness of the wheels 713 and 721 is higher than the surface hardness of the guide rollers 711 and 712. For example, the wheels 713 and 721 may be formed of a metal material and the guide rollers 711 and 712 may be formed of a resin material.

While an aluminum based alloy is exemplified as a material constituting the guide rail 610 and the support rail 620 that support the wheels 713 and 721, the guide rail 610 and the support rail 620 may be formed of a material having higher hardness than the wheels 713 and 721. For example, in a case where the wheels 713 and 721 are formed of aluminum based alloy, the guide rail 610 and the support rail 620 may be formed of steel, stainless steel, or the like.

By forming the guide rail 610 and the support rail 620 with a material with high hardness, it is possible to suppress wear of the guide rail 610 and the support rail 620. This can reduce the replacement frequency of the guide 600 as compared with the replacement frequency of the carrier 700A. By reducing the replacement frequency of the guide 600 that cannot be easily replaced as compared with the carrier 700A, it is possible to enhance maintainability of the conveying equipment.

(2) Details of Guide Rail and Support Rail

Also in the third embodiment, the guide rail 610 may include the straight portion 610a along the straight conveying path MR11 and the curved portion 610b along the curved conveying path MR12. The width of the straight portion 610a and the width of the curved portion 610b may be equal to each other. Hereinafter, arrangement of the guide rail 610 will be described on the basis of the above.

The straight portion 610a is provided at a position of the first distance D21 from the curvature center CC11 of the curved portion 610b and the curved portion 610b is positioned at more toward the outer circumferential side of the conveying path MR12 as compared with the position of the first distance D21 from the curvature center CC11.

Note that the distance to the guide rail 610 (straight portion 610a or the curved portion 610b) represents a distance to the center of the guide rail 610. The "outer circumferential side" of the conveying path MR12 represents the opposite side of the curvature center CC11 and the "inner circumferential side" of the conveying path MR12 represents the curvature center CC11 side.

The distance (hereinafter referred to as a "second distance D22") from the curvature center CC11 to the curved portion 610b may be set so as to allow a track TR41 of the center of the mover 740 in the straight conveying path MR11 and a track TR42 of the center of the mover 740 in the curved conveying path MR12 to be smoothly connected with each other.

Note that allowing the tracks TR41 and TR42 to be connected smoothly means that the track TR41 is arranged along a tangent line of the track TR42 at the connecting portion of the tracks TR41 and TR42. In other words, the curved portion 610b may be arranged so as not to cause a deviation between the track TR41 in the straight conveying path MR11 and the track TR42 in the curved conveying path MR12. No deviation in the tracks TR41 and TR42 means that the distance from the curvature center CC11 to the track TR41 (hereinafter referred to as a "third distance D23") and the distance from the curvature center CC11 to the track TR42 (hereinafter referred to as a "fourth distance D24") match each other. The distances to the tracks TR41 and TR42 mean the distances to the centers of the tracks TR41 and TR42.

As illustrated in FIG. 40, in a case where the curved portion 610b is positioned on more outer circumferential side of the curved conveying path MR12 than the track TR41, the first distance D21 and the second distance D22 are calculated by the following expressions.

$$\text{First distance } D21 = \text{third distance } D23 + \text{first track interval } W11$$

$$\text{Second distance } D22 = \text{fourth distance } D24 + \text{second track interval } W12$$

First track interval W11: the interval between the track TR11 of the caster 710 in the straight conveying path MR11 and the track TR41 of the center of the mover 740 in the straight conveying path MR11 (interval between the center of the track TR11 and the center of the track TR41)

Second track interval W12: interval between the track TR12 of the caster 710 in the curved conveying path MR12 and the track TR42 of the center of the mover 740 in the curved conveying path MR12 (interval between the center of the track TR12 and the center of the track TR42)

In contrast, in a case where the curved portion 610b is positioned on more toward the inner circumferential side of the curved conveying path MR12 than the track TR41, the first distance D21 and the second distance D22 are calculated by the following expressions.

$$\text{First distance } D21 = \text{third distance } D23 - \text{first track interval } W11$$

$$\text{Second distance } D22 = \text{fourth distance } D24 - \text{second track interval } W12$$

The first track interval W11 and the second track interval W12 can be derived geometrically in accordance with the arrangement of the two wheels 713 and 713 and the center of the mover 740. In the curved conveying path MR12, in a case where the curved portion 610b is positioned on more outer circumferential side than the track TR42, the second track interval W12 is greater than the first track interval W11. In the curved conveying path MR12, in a case where the curved portion 610b is positioned on more inner circumferential side than the track TR42, the second track interval W12 is smaller than the first track interval W11.

In this manner, the guide rail 610 may include a means for reducing the deviation between the track TR41 at the center of the mover 740 in the straight conveying path MR11 and the track TR42 at the center of the mover 740 in the curved conveying path MR12.

Figure 44:
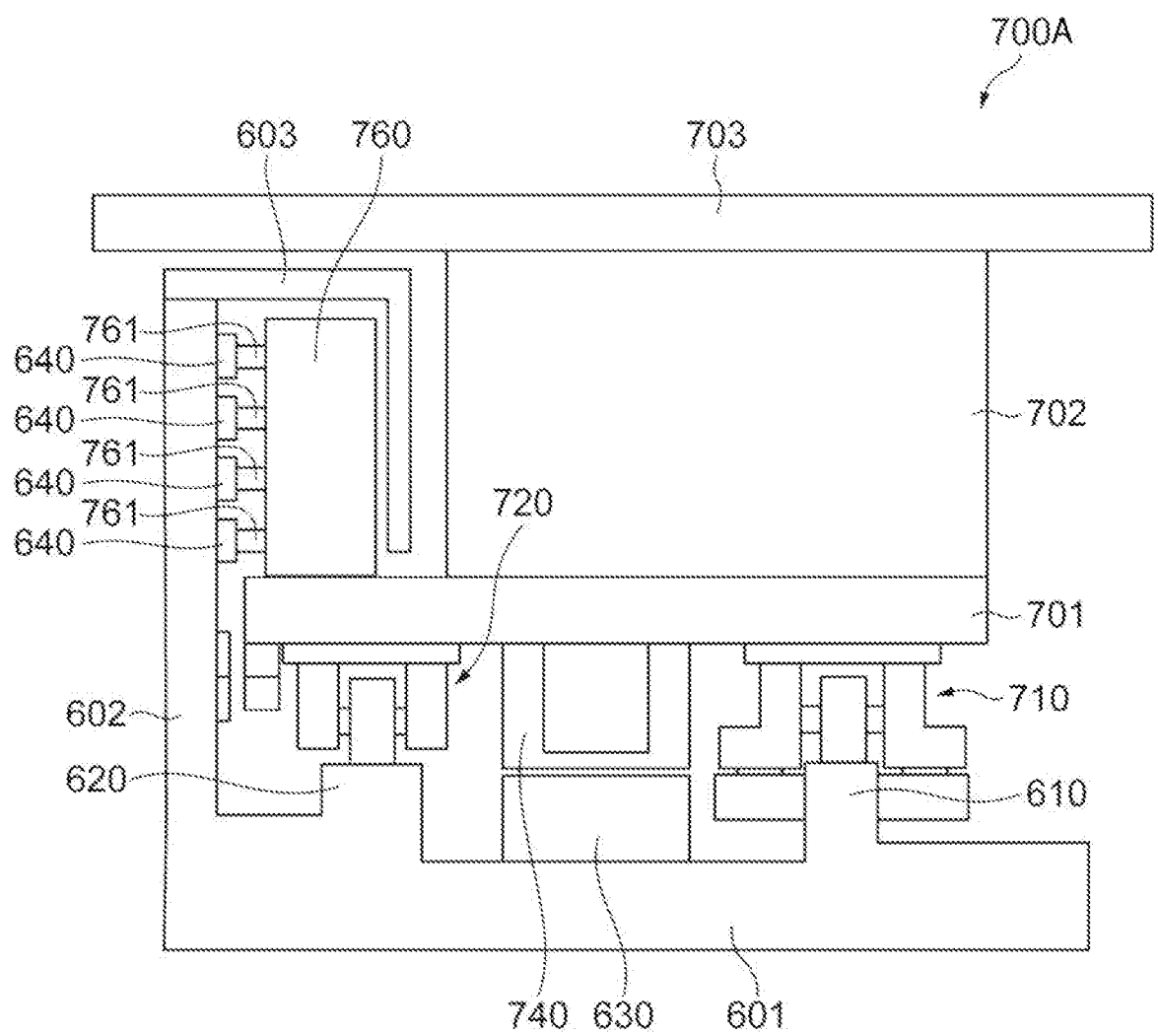
FIG. 44 is a cross-sectional view illustrating a modification of the conveying system in FIG. 39.

In the third embodiment, the side wall 602 and the plurality of first conductive rails 640 may also be arranged on the opposite side of the guide rail 610 (on the support rail 620 side) with respect to the stator 630 as a reference. For example, in the guide 600 exemplified in FIG. 44, the side wall 602 is arranged more outside (opposite side of the stator 630) than the support rail 620, and the first conductive rail 640 is attached on the side surface of the side wall 602 on the stator 630 side.

The plurality of first conductive rails 640 may be dispersedly arranged on both sides with respect to the stator 630 as a reference. Furthermore, the plurality of first conductive rails 640 may be provided on the upper surface of the guide 600, and the plurality of brushes 761 may protrude downward accordingly.

4. Effects of Embodiments

As described above, the conveying system 1 includes at least one guide unit 100 forming the conveying path MR and the carrier 200 moving along the conveying path MR. The guide unit 100 includes the traveling surface 121, at least one guide rail 110 provided along the conveying path MR, and a plurality of a magnetic members 131 formed of soft magnetic material and including the plurality of salient poles 132 aligned along the conveying path MR. The carrier 200 includes at least one roller 220 coming in contact with the guide rail 110 from a side direction, at least one wheel 210 coming in contact with the traveling surface 121, and a plurality of coils 243 provided so as to overlap with the magnetic member 131 in plan view, and configured to generate thrust along the conveying path MR and attraction toward the magnetic member 131 by generating a moving magnetic field acting on the magnetic member 131 in accordance with the supply of power.

According to this configuration, since there is no need to supply power to the magnetic member 131, the guide units 100 can be easily connected to each other. Moreover, the conveying path MR can be freely extended without increasing the amount of the permanent magnet to be used, making it possible to suppress an increase in cost due to extension of the conveying path MR. In each of the guide units 100, the movement of the carrier 200 in a direction orthogonal to the conveying path MR is restricted due to the contact of the roller 220 with the guide rail 110, the contact of the wheel 210 with the traveling surface 121, and the attraction generated by the coil 243 toward the magnetic member 131. This stabilizes the position of the coil 243 relative to the magnetic member 131, leading to achievement of stable thrust of the carrier 200. In addition, since the movement of the carrier 200 in the direction orthogonal to the conveying path MR is restricted by any of the restraint by the contact of and the restraint with non-contact of the rolling member, the carrier 200 is smoothly guided along the conveying path MR. These actions enable stable movement of the carrier 200. Accordingly, by selectively joining the guide units 100, it is possible to easily construct conveying equipment adapted to the installation environment.

The traveling surface 121 is provided on the two traveling lines ML sandwiching the magnetic member 131 in a direction orthogonal to the conveying path MR and running along the conveying path MR, and the carrier 200 may include a plurality of wheels 210 sandwiching the coil 243 in a direction orthogonal to the conveying path MR and being dispersedly arranged so as to correspond to the two traveling lines ML. The wheel 210 comes in contact with the traveling surface 121 on both sides of the magnetic member 131, thereby further stabilizing the interval between the coil 243 and the magnetic member 131. This makes it possible to move the carrier 200 more stably. Accordingly, it is possible to more reliably construct conveying equipment adapted to the installation environment.

The guide rail 110 may also be provided outside the two traveling lines ML. In this case, by arranging a contact portion between the wheel 210 and the traveling surface 121 at a portion near the magnetic member 131, it is possible to further stabilize the interval between the coil 243 and the magnetic member 131. This makes it possible to move the carrier 200 more stably. Accordingly, it is possible to more reliably construct conveying equipment adapted to the installation environment.

The magnetic member 131 may be embedded between the two traveling lines ML so as to decrease a height difference between the protruding end portion of the salient pole 132 and the traveling surface 121. In this case, the above-described reduced height difference enables simplification of the structure of the carrier unit 200 on the guide unit 100 side.

It is allowable to provide a plurality of guide units 100 that is continuous along the conveying path MR, and the joints J1 and J2 between the traveling surfaces 121 of the guide unit 100 may be inclined with respect to the conveying path MR in plan view. This would suppress the shaking of the carrier 200 at the time when the wheel 210 passes through the joints J1 and J2, leading to further stabilization of the interval between the coil 243 and the magnetic member 131. This makes it possible to move the carrier 200 more stably. Accordingly, it is possible to more reliably construct conveying equipment adapted to the installation environment.

The positions of the two joints J1 and J2 formed on the two traveling lines ML may be shifted from each other in a direction along the conveying path MR. This arrangement would further suppress the shaking of the carrier 200 at the time when the wheel 210 passes through the joints J1 and J2, leading to further stabilization of the interval between the coil 243 and the magnetic member 131. This makes it possible to move the carrier 200 more stably. Accordingly, it is possible to more reliably construct conveying equipment adapted to the installation environment.

The guide unit 600A may include the linear-type guide unit 600B constituting the straight conveying path MR11 and may include the curve-type guide unit 600C constituting the curved conveying path MR12. The carrier 700 may include two casters 710 aligned along the conveying path MR. The caster 710 may include wheels 713, two guide rollers 711 and 712 sandwiching the guide rail 610, and may include the base 714 holding the wheel 713 and two guide rollers 711, 712, and being turnable so as to change the orientation of the wheel 713.

In this case, the two guide rollers 711 and 712 sandwich the guide rail 610, whereby the turning angle of the base 714 is constrained against the guide rail 610. With this configuration, the base 714 turns in accordance with the orientation of the guide rail 610, thereby allowing the orientation of the wheel 713 to easily follow any of the straight conveying path MR1 and the curved conveying path MR2. This reduces the slippage due to the mismatch between the orientation of the wheel 713 and the conveying path MR, leading to reduction of frictional resistance due to the slipping of the wheel 713. This makes it possible to construct conveying equipment with higher energy efficiency.

The carrier 700A may further include the caster 720. The caster 720 may include the wheel 721 and the base 722 that holds the wheel 721 and is turnable to change the orientation the wheel 721. The turning center CL11 of the base 722 and the rotation center CL12 of the wheel 721 may be separated from each other as viewed from the direction along the turning center CL11.

As the caster 710 follows the guide rail 610, the track of the turning center CL11 of the caster 720 is constrained (hereinafter referred to as "the first track"). In the caster 720, the turning center CL11 of the base 722 and the rotation center CL12 of the wheel 721 are separated from each other as described above. This allows the orientation of the wheel 721 to easily follow the first track. More specifically, the rotation center CL12 is positioned behind the turning center CL11 in an advancing direction of the carrier 700A. Since the orientation of the wheel 721 (direction in which the wheel 721 advances by rolling) is always directed to the turning center CL11 side, making it easy to follow the track of the turning center CL11. This reduces friction generated in the caster 720. This makes it possible to construct conveying equipment with higher energy efficiency.

The carrier 700A may include two casters 720 aligned along the conveying path MR. In this case, the posture of the carrier 700A can be further stabilized.

The carrier 700 may further include the wheel 731 positioned between the two casters 710 in a direction along the conveying path MR and positioned away from the wheel 713 in a direction orthogonal to the conveying path MR. In this case, the posture of the carrier 700 is stabilized by the presence of the wheel 731. Since the wheel 731 is located between the two wheels 713, the deviation between the orientation of the wheel 731 and the conveying path MR becomes small even without a function of turning the wheel 731. Therefore, it is possible to achieve both stabilization of posture and reduction of friction with a simple structure.

The guide rail 610 of the linear-type guide unit 600B may be provided at a position of the first distance D1 from the curvature center CC11 of the curved conveying path MR12 and the guide rail 610 of the curve-type guide unit 600C may be provided at a position more toward the outer circumferential side of the conveying path MR as compared with the position of the first distance D1 from the curvature center CC11. This reduces the deviation between a center track of the carrier 700 in the straight conveying path MR11 and a center track of the carrier 700 in the curved conveying path MR12. Accordingly, it is expected that the posture of the carrier 700 during movement can be further stabilized.

The guide unit 600A may include the plurality of first conductive rails 640 along the conveying path MR. The carrier 700 may include the plurality of brushes 761 each coming in contact with each of the plurality of first conductive rails 640. The plurality of first conductive rails 640 may be arranged on one side with respect to the magnetic member 631 as a reference. In this case, noise attributed to the first conductive rail 640 can be reduced by bringing the plurality of first conductive rails 640 closer to each other. Arranging the plurality of first conductive rails 640 on one side of the magnetic member 631 would generate a moment attributed to the reaction force of the brush 761 on the carrier 700. Against this, attraction acts between the carrier 700 and the guide unit 600A, leading to prevention of floating of the carrier 700 attributed to the moment. Therefore, it is possible to achieve both stabilization of posture and reduction of noise with a simple structure.

By using the conveying system 1, it is possible to construct conveying equipment in roughly the following procedure. First, a plurality of guide units 100 is selected in accordance with installation environment. Next, the plurality of guide units 100 is connected to each other in accordance with the installation environment. Next, the carrier 200 is arranged such that the roller 220 comes in contact with the guide rail 110, the wheel 210 comes in contact with the traveling surface 121, and the coil 243 faces the magnetic member 131.

While the embodiments have been described above, the present invention is not necessarily limited to the above-described embodiments, and various modifications are possible without departing from the spirit and scope of the present invention.

Note that, as exemplified in the above embodiment, the present disclosure includes the following configuration in another aspect.

[A1]

A conveying system including: a plurality of guide units including a curve-type guide unit constituting a conveying path curved in plan view and including a linear-type guide unit constituting a conveying path straight in plan view; and a carrier configured to move along the conveying path, in which the guide unit includes:

a first guide rail and a second guide rail each being aligned in a direction orthogonal to the conveying path and being arranged along the conveying path; and a stator arranged along the conveying path, the carrier includes:

two first rollers coming in contact with one side surface of the first guide rail and being aligned along the conveying path;

two second rollers coming in contact with a side surface oriented opposite to the one side surface of the first guide rail among both side surfaces of the second guide rail and being aligned along the conveying path; and a mover configured to generate thrust along the conveying path in cooperation with the stator, the side surface with which the first roller or the second roller come in contact from an outer circumferential side of the conveying path in the curve-type guide unit bulges more toward the outer circumferential side as compared with an arc continuous to the side surface of the linear-type guide unit corresponding to the side surface, and the side surface with which the first roller or the second roller come in contact from an inner circumferential side of the conveying path in the curve-type guide unit is recessed more toward the outer circumferential side as compared with an arc continuous to the side surface of the linear-type guide unit corresponding to the side surface.

[A2]

The conveying system according to A1, in which the linear-type guide unit is configured such that both end portions on the side surface with which the first roller comes in contact and on the side surface with which the second roller comes in contact include a recessed portion continuous to the side surface recessed toward the outer circumferential side of the conveying path in the curve-type guide unit.

[A3]

The conveying system according to A1 or A2, in which the plurality of guide units includes the plurality of curve-type guide units, and the curve-type guide unit is configured such that both end portions on the side surface that bulges toward an outer circumferential side of the conveying path in the curve-type guide unit include a recessed portion continuous to the side surface recessed toward the outer circumferential side of the conveying path in another curve-type guide unit.

[A4]

The conveying system according to A2 or A3, in which the carrier further includes:

a third roller positioned between the two first rollers in a direction along the conveying path and coming in contact with the side surface of the first guide rail on the opposite side of the first roller; and a fourth roller positioned between the two second rollers in the direction along the conveying path and coming in contact with the side surface of the second guide rail on the opposite side of the second roller.

[A5]

The conveying system according to A4, in which the guide unit further includes a traveling surface, the carrier further includes a plurality of wheels coming in contact with the traveling surface between the first guide rail and the second guide rail, the first roller and the second roller are respectively provided outside the first guide rail and the second guide rail, and at least one of the third roller and the fourth roller is provided inside the first guide rail and the second guide rail and is positioned between the wheels.

[A6]

The conveying system according to any one of A1 to A5, in which an intermediate position of the two first rollers, an intermediate position of the two second rollers, and a center of the mover match with each other in the direction along the conveying path.

[A7]

The conveying system according to any one of A1 to A6, in which the stator includes a magnetic member, and the mover includes a plurality of coils configured to generate thrust along the conveying path by generating a moving magnetic field acting on the magnetic member in accordance with supply of power.

[A8]

The conveying system according to A7, in which the magnetic member is formed of a soft magnetic material and includes a plurality of salient poles aligned along the conveying path.

[A9]

A method for constructing conveying equipment, including executing, by using the conveying system according to any one of A1 to A8:

selecting the plurality of guide units in accordance with an installation environment;

connecting the plurality of guide units with each other in accordance with an installation environment; and arranging the carrier such that the two first roller come in contact with the side surface of the first guide rail, the two second rollers come in contact with the side surface of the second guide rail, and the mover faces the stator.

In another aspect, the present disclosure includes the following configurations.

[B1]

A conveying system including:

a plurality of guide units including a first guide unit, a second guide unit, and a third guide unit, and constituting a conveying path;

at least one carrier configured to move along the conveying path; and a branch unit interposed between the first guide unit and each of the second and third guide units, and configured to switch between a first state in which the first guide unit is connected to the second guide unit and a second state in which the first guide unit is connected to the third guide unit, in which each of the guide units includes:

a first guide rail and a second guide rail each being arranged to face each other in a direction orthogonal to the conveying path and being arranged along the conveying path; and a stator arranged along the conveying path, the carrier includes:

at least one first roller coming in contact with an outer side surface of the first guide rail;

at least one second roller arranged to face the first roller and coming in contact with the outer side surface of the second guide rail; and a mover configured to generate thrust along the conveying path in cooperation with the stator, and the branch unit is configured to connect any one of the first guide rails and the second guide rails to each other in any of the first state and the second state, and configured to not connect the other guide rails to each other.

[B2]

The conveying system according to B1, in which the branch unit includes: a movable platform; a first relay rail and a second relay rail fixed to the movable platform; and a drive section configured to slide the movable platform toward one side in the first state and to slide the movable platform toward the other side in the second state, the first relay rail is arranged so as to be interposed between the first guide rails of the first guide unit and the second guide unit when the drive section slides the movable platform toward the one side, and the second relay rail is arranged so as to be interposed between the second guide rails of the first guide unit and the third guide unit when the drive section slides the movable platform toward the other side.

[B3]

The conveying system according to B2, in which the branch unit includes a first relay stator and a second relay stator fixed to the movable platform, the first relay stator is arranged so as to be interposed between the stators of the first guide unit and the second guide unit when the drive section slides the movable platform to the one side, and the second relay stator is arranged so as to be interposed between the stators of the first guide unit and the third guide unit when the drive section slides the movable platform to the other side.

[B4]

The conveying system according to B2, in which the branch unit includes a relay stator, and the relay stator is connected to the stator of the first guide unit at one end side, and branches at the other end side so as to be connected to the stator of each of the second guide unit and the third guide unit.

[B5]

The conveying system according to any one of B2 to B4, in which the branch unit further includes:

a fixed platform interposed between the movable platform and each of the second guide unit and the third guide unit;

a third relay rail fixed to the fixed platform and being continuous to the first guide rail of the second guide unit; and a fourth relay rail fixed to the fixed platform and being continuous to the second guide rail of the third guide unit, the first relay rail is arranged so as to be interposed between the first guide rail and the third relay rail of the first guide unit when the drive section slides the movable platform to the one side, and the second relay rail is arranged so as to be interposed between the second guide rail and the fourth relay rail of the first guide unit when the drive section slides the movable platform to the other side.

[B6]

The conveying system according to B1, in which the branch unit includes:

a platform; a first relay rail interposed between the first guide rails of the first guide unit and the second guide unit; a second relay rail interposed between the second guide rails of the first guide unit and the third guide unit; and a drive section configured to cause the first relay rail and the second relay rail to appear/disappear onto/from the platform.

[B7]

The conveying system according to any one of B1 to B6, in which the carrier further includes: a third roller coming in contact with an inner side surface of the first guide rail; and a fourth roller coming in contact with an inner side surface of the second guide rail.

[B8]

The conveying system according to any one of B1 to B7, in which the stator includes a magnetic member, and the mover includes a plurality of coils configured to generate thrust along the conveying path by generating a moving magnetic field acting on the magnetic member in accordance with supply of power.

[B9]

The conveying system according to B8, in which the magnetic member is formed of a soft magnetic material and includes a plurality of salient poles aligned along the conveying path.

[B10]

The conveying system according to B3, in which the mover includes a plurality of coils configured to generate a moving magnetic field, and the stator, the first relay stator, and the second relay stator are each formed of a soft magnetic material and each configured to include a plurality of salient poles aligned along the conveying path and cause the mover to generate thrust in accordance with action of the moving magnetic field.

[B11]

A method for constructing conveying equipment, including executing, by using the conveying system according to any one of B1 to B10:

selecting the plurality of guide units and the branch unit in accordance with an installation environment;

connecting the plurality of guide units and the branch unit with each other in accordance with the installation environment; and arranging the carrier such that the first roller comes in contact with the outer side surface of the first guide rail, the second roller comes in contact with the outer side surface of the second guide rail, and the mover faces the stator.

In another aspect, the present disclosure includes the following configurations.

[C1]

A conveying system including:

a plurality of guide units including a curve-type guide unit constituting a conveying path curved in plan view and a linear-type guide unit constituting a conveying path straight in plan view; and a carrier configured to move along the conveying path, in which the guide unit includes a stator along the conveying path and an indicator section indicating information related to a position in the conveying path, the carrier includes: a mover configured to generate thrust along the conveying path in cooperation with the stator; and a position sensor configured to detect position information of the carrier on the basis of the information indicated by the indicator section, and the position sensor is configured such that a portion configured to obtain information indicated by the indicator section is positioned on a first straight line orthogonal to the conveying path and passing through a curvature center of the curved conveying path.

[C2]

The conveying system according to C1, in which the center of the mover is also positioned on the first straight line.

[C3]

The conveying system according to C1 or C2, in which the guide unit further includes at least one guide rail along the conveying path, and the carrier further includes a first roller positioned on the first straight line and comes in contact with a side surface of the guide rail.

[C4]

The conveying system according to C3, in which the indicator section is provided on the side surface of the guide rail.

[C5]

The conveying system according to C4, in which the carrier further includes two second rollers arranged to sandwich the first roller in a direction along the conveying path and coming in contact with the side surface of the guide rail from the opposite side of the first roller, the indicator section is provided on the second roller side, and the side surface coming in contact with the second roller in the curve-type guide unit is shifted to an outer circumferential side of the conveying path with respect to the side surface on which the indicator section is provided.

[C6]

The conveying system according to any one of C1 to C5, in which, the stator includes a magnetic member, and the mover includes a plurality of coils configured to generate thrust along the conveying path by generating a moving magnetic field acting on the magnetic member in accordance with supply of power.

[C7]

The conveying system according to C6, in which the magnetic member is formed of a soft magnetic material and includes a plurality of salient poles aligned along the conveying path.

[C8]

A method for constructing conveying equipment, including executing, by using the conveying system according to any one of C1 to C7:

selecting the plurality of guide units in accordance with an installation environment;

connecting the plurality of guide units with each other in accordance with an installation environment; and arranging the carrier such that the position sensor is configured such that a portion that obtains information indicated by the indicator section faces the indicator section and that the mover faces the stator.

In another aspect, the present disclosure includes the following configurations.

[D1]

A conveying system including: at least one guide unit constituting a conveying path and; a carrier configured to move along the conveying path, in which the guide unit includes: at least four conductive lines each provided along the conveying path and including two power supply lines and two communication lines; and a stator including a magnetic member and being arranged along the conveying path, the carrier includes: a mover configured to generate thrust along the conveying path by generating a moving magnetic field acting on the magnetic member in accordance with the power supply from the power supply line; and at least four brushes, the at least four brushes are arranged so as to come in contact with the two power supply lines, and include two power supply brushes configured to relay power to the carrier and two communication brushes provided so as to come in contact with the two communication lines and configured to relay an electric signal, and at least the four pairs of conductive lines and brushes are dispersedly arranged in equal number on both sides in a direction orthogonal to the conveying path.

[D2]

The conveying system according to D1, in which the guide unit is provided along the conveying path and includes two side walls facing each other, and the at least four conductive lines are provided on the inner surface of the side wall.

[D3]

The conveying system according to D2, in which the guide unit includes a traveling surface, the carrier includes a wheel coming in contact with the traveling surface, and the power supply line is positioned on the traveling surface side with respect to the communication line.

[D4]

The conveying system according to any one of D1 to D3, in which the guide unit includes the two communication lines and the one power supply line on each of both sides of the mover, and the carrier includes the two communication brushes and one power supply brush on each of both sides of the mover.

[D5]

The conveying system according to any one of D1 to D3, in which the guide unit includes the two communication lines and the two power supply lines on each of both sides of the mover, and the carrier includes the two power supply brushes and the two communication brushes and on each of both sides of the mover.

[D6]

The conveying system according to any one of D1 to D3, in which the guide unit includes the one communication line and the one power supply line on each of both sides of the mover, and the carrier includes the one power supply brush and the one communication brush on each of the both sides of the mover.

[D7]

The conveying system according to any one of D1 to D6, in which the magnetic member is formed of a soft magnetic material and includes a plurality of salient poles aligned along the conveying path.

[D8]

The conveying system according to any one of D1 to D7, in which the carrier includes a chassis and a driver circuit configured to convert power supplied to the power supply brush into power for driving and output the power to the mover, the at least four brushes are dispersedly arranged in equal number on both sides of the chassis in a direction orthogonal to the conveying path, the mover is arranged on the stator side on the chassis, and the driver circuit is arranged so as to sandwich the chassis with the mover, between the brushes.

[D9]

A method for constructing conveying equipment, including, by using the conveying system according to any one of D1 to D8:

selecting the guide unit in accordance with an installation environment;

connecting the guide units with each other in accordance with an installation environment; and arranging the carrier such that the mover is arranged to face the stator.

In another aspect, the present disclosure includes the following configurations.

[E1]

A conveying system including:

a guide configured to constitute a conveying path; and a carrier configured to move along the conveying path, in which the guide includes a guide rail provided along the conveying path, the carrier includes:

a first caster and a second caster configured to be aligned along the conveying path and to move along the guide rail; and a third caster positioned between the first caster and the second caster in a direction along the conveying path, the guide rail includes a straight portion along the straight conveying path and a curved portion along the curved conveying path, the straight portion is provided at a position of a first distance from a curvature center of the curved portion, and the curved portion is provided on more toward the outer circumferential side of the conveying path as compared with the position of the first distance from the curvature center.

[E2]

The conveying system according to E1, in which the guide is dividable into a plurality of guide units, and the plurality of guide units includes a linear-type guide unit constituting the straight conveying path and a curve-type guide unit constituting the curved conveying path.

[E3]

The conveying system according to E2, in which the guide rail of the curve-type guide unit includes: a curved portion; and a transition portion interposed between the curved portion and the guide rail of the linear-type guide unit and having a curvature smaller than the curvature of the curved portion.

[E4]

The conveying system according to any one of E1 to E3, in which the first caster includes:

a first wheel;

two first guide rollers sandwiching the guide rail; and a first base configured to hold the first wheel and the two first guide rollers and turnable so as to change the orientation of the first wheel, the second caster includes:
a second wheel;
two second guide rollers sandwiching the guide rail; and
a second base configured to hold the second wheel and the two second guide rollers and turnable so as to change the orientation of the second wheel, and
the third caster includes a third wheel.

[E5]
The conveying system according to E4,
in which a rotation center of the first wheel and rotation centers of the two first guide rollers are positioned in a same plane, and a rotation center of the second wheel and rotation center of the two second guide rollers are positioned within a same plane.

[E6]
The conveying system according to E4 or E5, in which the first caster does not include the first guide rollers having different rotation centers with respect to the two first guide rollers, and
the second caster does not include the second guide rollers having different rotation centers with respect to the two second guide rollers.

[E7]
The conveying system according to any one of E4 to E6,
in which surface hardness of the first wheel, the second wheel, and the third wheel is higher than surface hardness of the first guide roller and the second guide roller.

[E8]
The conveying system according to any one of E1 to E7,
in which the guide further includes a stator along the conveying path, and
the carrier further includes a mover configured to generate thrust along the conveying path in cooperation with the stator.

[E9]
The conveying system according to E8,
in which the stator includes a magnetic member having a plurality of salient poles aligned along the conveying path, and
the mover includes a plurality of coils configured to generate thrust along the conveying path and attraction toward the guide by generating a moving magnetic field acting on the magnetic member in accordance with supply of power.

[E10]
The conveying system according to E8 or E9,
in which the guide includes a plurality of conductive rails along the conveying path,
the carrier includes a plurality of brushes each coming in contact with each of the plurality of conductive rails, and
the plurality of conductive rails is arranged on the guide rail side with respect to the stator as a reference.

[E11]
The conveying system according to E8 or E9,
in which the guide includes a plurality of conductive rails along the conveying path,
the carrier includes a plurality of brushes each coming in contact with each of the plurality of conductive rails, and
the plurality of conductive rails is arranged on the opposite side of the guide rail with respect to the stator as a reference.

In another aspect, the present disclosure includes the following configurations.

[F1]
A conveying system including:
a plurality of guide units including a first conductive rail and constituting a conveying path along the first conductive rail;
a carrier including a power source for generating thrust in accordance with supply of power and an energization brush coming in contact with the first conductive rail, and being configured to move along the conveying path;
a switch unit including a movable platform, a plurality of second conductive rails provided on the movable platform, and an actuator configured to slide the movable platform so as to change the second conductive rail positioned on a same line as the first conductive rail, and configured to change a course of the carrier by being interposed between the guide units; and
a conducting line configured to electrically connect the first conductive rail to the second conductive rail and maintain the electrical connection between the first conductive rail and the second conductive rail even during sliding of the movable platform,
in which the second conductive rail is formed to have an interval from the first conductive rail in a state where the second conductive rail is positioned on the same line as the first conductive rail, the interval being greater than a length of an energized portion of the brush in a direction along the conveying path.

[F2]
The conveying system according to F1, in which the conducting line includes a cable connecting the first conductive rail to the second conductive rail, and a connector provided on the cable.

[F3]
The conveying system according to F1 or F2,
in which the guide unit further includes a stator along the conveying path, and
the power source further includes a mover configured to generate thrust along the conveying path in cooperation with the stator in accordance with supply of power.

[F4]
The conveying system according to any one of F1 to F3, further including:
a carrier controller mounted on the carrier; and
a system controller configured to communicate with the carrier controller via at least one of the first conductive rail and the second conductive rail,
in which at least one of the system controller and the carrier controller is configured to retry the communication in a case where the communication is unsuccessful, and a maximum period for executing the retry is performed is set to be equal to or longer than a period during which the contact of the brush with one of the first conductive rail and the second conductive rail is interrupted.

In another aspect, the present disclosure includes the following configurations.

[G1]
A conveying system including:
a guide constituting a conveying path;
a carrier configured to move along the conveying path;
a magnetic member provided on one of the guide and the carrier, so as to be arranged along the conveying path;
a plurality of coils provided on the other one of the guide and the carrier and configured to generate thrust along the conveying path by generating a moving magnetic field acting on the magnetic member in accordance with supply of power;

a magnetic sensor configured to detect magnetism varying with a movement of the carrier; and
a controller,
in which the controller is configured to execute:
position detection of a first method of obtaining a position of the carrier on the basis of inductance variation of the coil; and
position detection of a second method of obtaining a position of the carrier on the basis of an output of the magnetic sensor.

[G2]
The conveying system according to G1,
in which the magnetic member is provided in the guide, and
the plurality of coils and the magnetic sensor are provided in the carrier.

[G3]
The conveying system according to G2,
in which the magnetic member is formed of a soft magnetic material and includes a plurality of salient poles aligned in a direction along the conveying path, and
the controller obtains the position of the carrier on the basis of signal variation due to the salient poles in any of the first method and the second method.

[G4]
The conveying system according to any one of G1 to G3,
in which the controller is configured to execute:
position detection of the first method when power is supplied to the plurality of coils; and
position detection of the second method when power is not supplied to the plurality of coils.

[G5]
The conveying system according to any one of G1 to G4,
in which the controller is configured to execute position detection of both the first method and the second method in a case where power is supplied to the plurality of coils, and configure to further execute:
calculation of a difference between a position detection result of the first method and a position detection result of the second method;
adopting the position detection result of the first method in a case where the difference is within an allowable range; and adopting the position detection result of the second method in a case where the difference is outside the allowable range.

[G6]
The conveying system according to any one of G1 to G5,
in which the guide further includes a scale configured to hold position information,
the carrier further includes a position sensor configured to detect position information held by the scale, and
the controller further executes position detection of a third method for obtaining a position of the carrier on the basis of an output of the position sensor when the position sensor passes through a position at which the scale is arranged.

[G7]
The conveying system according to any one of G1 to G6, in which the guide is dividable into a plurality of guide units.

[G8]
A method for controlling a conveying system using the conveying system including: a guide constituting a conveying path; a carrier configured to move along the conveying path; a magnetic member provided on one of the guide and the carrier, so as to be arranged along the conveying path; a plurality of coils provided on the other one of the guide and the carrier and configured to generate thrust along the conveying path by generating a moving magnetic field acting on the magnetic member in accordance with supply of power; and a magnetic sensor configured to detect magnetism varying with a movement of the carrier, the method including:
obtaining a position of the carrier on the basis of inductance variation of the coil; and
obtaining a position of the carrier on the basis of an output of the magnetic sensor.

[G9]
A linear motor including:
a stator provided along a linear movement path;
a mover configured to move along the movement path;
a magnetic member provided on one of the guide and the carrier along the movement path;
a plurality of coils provided on the other one of the guide and the carrier and configured to generate thrust along the movement path by generating a moving magnetic field acting on the magnetic member in accordance with supply of power;
a magnetic sensor configured to detect magnetism varying with a movement of the mover; and
a controller,
in which the controller is configured to execute:
position detection of a first method of obtaining a position of the mover on the basis of inductance variation of the coil; and
position detection of a second method of obtaining a position of the mover on the basis of an output of the magnetic sensor.

In another aspect, the present disclosure includes the following configurations.

[H1]
A conveying system including:
a plurality of carriers having a power source generating thrust in accordance with supply of power and moving along a conveying path; and
a controller configured to execute detection of a collision between the carriers on the basis of an increase in the thrust in the carriers.

[H2]
The conveying system according to H1, further including:
a guide constituting the conveying path; and
a plurality of markers provided in the guide so as to be aligned along the conveying path, each of the markers holding initial position information,
in which the carrier further includes an initial position sensor configured to obtain the initial position information held by the marker, and
the controller is configured to further execute:
moving the carrier; and
obtaining the initial position information of the carrier including the initial position sensor when the initial position sensor has detected the marker.

[H3]
The conveying system according to H2,
in which detecting the collision between the carriers on the basis of the increase in the thrust on the carrier includes:
estimating that the carrier that has not obtained the initial position information has collided with the preceding carrier in a case where the thrust increases in the carrier that has not obtained the initial position information; and
estimating that the carrier being stopped or decelerated suffered rear-end collision by the subsequent carrier in a case where the thrust increases in the carrier being stopped or decelerated.

[H4]

The conveying system according to H3, in which the controller is configured to further execute moving the carrier estimated to have suffered rear-end collision by the subsequent carrier to the opposite side of the subsequent carrier.

[H5]

The conveying system according to any one of H2 to H4, in which the guide is dividable into a plurality of guide units, and the number of carriers mountable in one guide unit is equal to the number of markers provided in one guide unit.

[H6]

The conveying system according to any one of H2 to H5, in which the controller is configured to further execute moving the carrier such that a difference between the positions of the carriers adjacent to each other along the conveying path is greater than a difference between the positions of the markers adjacent to each other along the conveying path.

[H7]

A method for controlling a conveying system including a plurality of carriers having a power source generating thrust in accordance with supply of power, the method including:

controlling the plurality of carriers so as to move along a conveying path; and detecting a collision between the carriers on the basis of an increase in the thrust in the carriers.

In another aspect, the present disclosure includes the following configurations.

[I1]

A conveying system including:

a guide constituting a conveying path; and a carrier configured to move along the conveying path, in which the guide includes a guide rail provided along the conveying path, the carrier includes a first caster and a second caster, the second caster is configured to move along the guide rail, the first caster includes: a first wheel; and a first base configured to hold the first wheel and turnable to change the orientation of the first wheel, and a turning center of the first base and a rotation center of the first wheel are spaced apart from each other when viewed from a direction along the turning center of the first base.

[I2]

The conveying system according to I1, in which the second caster further includes:

two guide rollers sandwiching the guide rail;

a second wheel; and a second base configured to hold the second wheel and the two guide rollers and turnable so as to change the orientation of the second wheel, and rotation centers of the two guide rollers, a turning center of the second base, and a rotation center of the second wheel are positioned within a same plane.

[I3]

The conveying system according to I2, in which the carrier includes:

two first casters aligned along the conveying path; and two second casters arranged along the conveying path.

[I4]

The conveying system according to I3, in which an interval between the turning centers of the two first bases is smaller than an interval between the turning centers of the two second bases.

[I5]

The conveying system according to I3, in which an interval between the turning centers of the two first bases is greater than an interval between the turning centers of the two second bases.

[I6]

The conveying system according to any one of I3 to I5, in which the interval between the turning center of the first base and the rotation center of the first wheel held by the first base is less than half of an interval between the turning centers of the two first bases when viewed from a direction along the turning center of the first base.

[I7]

The conveying system according to any one of I1 to I6, in which the guide further includes a stator along the conveying path, and the carrier further includes a mover configured to generate thrust along the conveying path in cooperation with the stator.

[I8]

The conveying system according to I7, in which the stator includes a magnetic member having a plurality of salient poles aligned along the conveying path, and the mover includes a plurality of coils configured to generate thrust along the conveying path and attraction toward the guide by generating a moving magnetic field acting on the magnetic member in accordance with supply of power.

[I9]

The conveying system according to I7 or I8, in which the guide further includes a plurality of conductive rails along the conveying path, the carrier further includes a plurality of brushes each coming in contact with each of the plurality of conductive rails, and the plurality of conductive rails is arranged on the guide rail side with respect to the stator as a reference.

[I10]

The conveying system according to I7 or I8, in which the guide further includes a plurality of conductive rails along the conveying path, the carrier further includes a plurality of brushes each coming in contact with each of the plurality of conductive rails, and the plurality of conductive rails is arranged on the opposite side of the guide rail with respect to the stator as a reference.

[I11]

The conveying system according to any one of I1 to I10, in which the guide is dividable into a plurality of guide units arranged to be continuous along the conveying path, and the plurality of guide units includes a linear-type guide unit constituting a straight conveying path and a curve-type guide unit constituting a curved conveying path.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A conveying system comprising:
a plurality of carriers each having a power source generating thrust in accordance with a magnetic flux and moving along a conveying path; and
circuitry configured to execute detection of a collision between the carriers based on an increase in the thrust in the carriers.

2. The conveying system according to claim 1, further comprising:
a guide constituting the conveying path; and
a plurality of markers provided in the guide so as to be aligned along the conveying path, each of the markers holding initial position information,
wherein the carrier further includes an initial position sensor configured to obtain the initial position information held by the marker, and
the circuitry is configured to further execute:
moving the carrier; and
obtaining the initial position information of the carrier including the initial position sensor when the initial position sensor has detected the marker.

3. The conveying system according to claim 2,
wherein detecting the collision between the carriers based on the increase in the thrust on the carrier includes:
estimating that the carrier that has not obtained the initial position information has collided with the preceding carrier in a case where the thrust increases in the carrier that has not obtained the initial position information; and
estimating that the carrier being stopped or decelerated suffered rear-end collision by the subsequent carrier in a case where the thrust increases in the carrier being stopped or decelerated.

4. The conveying system according to claim 3,
wherein the circuitry is configured to further execute moving the carrier estimated to have suffered rear-end collision by the subsequent carrier to the opposite side of the subsequent carrier.

5. The conveying system according to claim 2,
wherein the guide is dividable into a plurality of guide units, and
the number of carriers mountable in one guide unit is equal to the number of markers provided in one guide unit.

6. The conveying system according to claim 3,
wherein the guide is dividable into a plurality of guide units, and
the number of carriers mountable in one guide unit is equal to the number of markers provided in one guide unit.

7. The conveying system according to claim 4,
wherein the guide is dividable into a plurality of guide units, and
the number of carriers mountable in one guide unit is equal to the number of markers provided in one guide unit.

8. The conveying system according to claim 2,
wherein the circuitry is configured to further execute moving the carrier such that a difference between the positions of the carriers adjacent to each other along the conveying path is greater than a difference between the positions of the markers adjacent to each other along the conveying path.

9. The conveying system according to claim 3,
wherein the circuitry is configured to further execute moving the carrier such that a difference between the positions of the carriers adjacent to each other along the conveying path is greater than a difference between the positions of the markers adjacent to each other along the conveying path.

10. The conveying system according to claim 4,
wherein the circuitry is configured to further execute moving the carrier such that a difference between the positions of the carriers adjacent to each other along the conveying path is greater than a difference between the positions of the markers adjacent to each other along the conveying path.

11. The conveying system according to claim 5,
wherein the circuitry is configured to further execute moving the carrier such that a difference between the positions of the carriers adjacent to each other along the conveying path is greater than a difference between the positions of the markers adjacent to each other along the conveying path.

12. The conveying system according to claim 6,
wherein the circuitry is configured to further execute moving the carrier such that a difference between the positions of the carriers adjacent to each other along the conveying path is greater than a difference between the positions of the markers adjacent to each other along the conveying path.

13. The conveying system according to claim 7,
wherein the circuitry is configured to further execute moving the carrier such that a difference between the positions of the carriers adjacent to each other along the conveying path is greater than a difference between the positions of the markers adjacent to each other along the conveying path.

14. A method for controlling a conveying system including a plurality of carriers each having a power source generating thrust in accordance with a magnetic flux, the method comprising:
controlling the plurality of carriers so as to move along a conveying path; and
detecting a collision between the carriers based on an increase in the thrust in the carriers.

* * * * *